US012718433B2

(12) United States Patent
Dyer

(10) Patent No.: US 12,718,433 B2
(45) Date of Patent: Aug. 25, 2026

(54) SYSTEM AND METHOD FOR VISUALIZATION AND ANALYSIS OF HUMAN INTERACTION DYNAMICS USING ARTIFICIAL INTELLIGENCE

(71) Applicant: SD Streams, LLC, Kansas City, MO (US)

(72) Inventor: Shannon S Dyer, Riverside, MO (US)

(73) Assignee: SD Streams, LLC, Kansas City, MO (US)

( * ) Notice: Subject to any disclaimer, the term of this patent is extended or adjusted under 35 U.S.C. 154(b) by 0 days.

(21) Appl. No.: 19/460,100

(22) Filed: Jan. 26, 2026

(65) Prior Publication Data

US 2026/0220839 A1 Jul. 30, 2026

Related U.S. Application Data

(60) Provisional application No. 63/749,973, filed on Jan. 27, 2025.

(51) Int. Cl.
*G06T 11/26* (2026.01)
*G06F 16/44* (2019.01)
(Continued)

(52) U.S. Cl.
CPC .............. *G06T 11/26* (2026.01); *G06F 16/44* (2019.01); *G06V 20/40* (2022.01); *G06V 40/10* (2022.01);
(Continued)

(58) Field of Classification Search
CPC ......... G06T 11/26; G06F 16/44; G06V 40/10; G10L 17/02; H04L 63/0428
See application file for complete search history.

(56) References Cited

U.S. PATENT DOCUMENTS 9,786,072 B2 * 10/2017 Matange ................. G06T 11/26
11,968,159 B2 * 4/2024 Sharma ................. H04L 51/043
(Continued)

FOREIGN PATENT DOCUMENTS

CN 108346116 A * 7/2018 ............. G06Q 50/18
CN 108763410 A * 11/2018 ............. G06Q 50/18
(Continued)

*Primary Examiner* — Cheng Yuan Tseng
(74) *Attorney, Agent, or Firm* — FP; Sikander M. Khan

(57) ABSTRACT

A computer-implemented system and method for generating a bidirectional stream-graph visualization of multi-participant deliberative interactions. The system receives input data from a deliberative interaction involving multiple participants discussing an issue with different positions. A speech recognition pipeline performs speaker diarization to assign speech segments to participant identifiers with start and end times, and automatic speech recognition generates text representations. A trained machine learning model classifies each text representation to determine a valence category indicating support for opposing positions. A contribution magnitude is determined for each speech segment. A stream-graph data structure maps time-indexed contribution magnitudes to an upper or lower side of a midline based on valence categories. A bidirectional stream-graph visualization is rendered comprising participant-specific stacked area bands positioned in upper or lower regions, with band thickness proportional to contribution magnitude along a temporal axis.

20 Claims, 23 Drawing Sheets

(51) Int. Cl.

| | |
|---|---|
| ***G06V 20/40*** | (2022.01) |
| ***G06V 40/10*** | (2022.01) |
| ***G10L 17/02*** | (2013.01) |
| ***G10L 25/57*** | (2013.01) |
| ***H04L 9/40*** | (2022.01) |

(52) U.S. Cl.
CPC .............. *G10L 17/02* (2013.01); *G10L 25/57* (2013.01); *H04L 63/0428* (2013.01)

(56) References Cited

U.S. PATENT DOCUMENTS

| | | | | | |
|---|---|---|---|---|---|
| 12,046,155 | B1 * | 7/2024 | Ghosh | G09B 7/02 |
| 12,488,201 | B2 * | 12/2025 | Petrauskas | G06F 40/40 |
| 12,489,955 | B2 * | 12/2025 | Underwood | G10L 25/51 |
| 2024/0403983 | A1 * | 12/2024 | Underwood | H04N 7/155 |
| 2025/0148558 | A1 * | 5/2025 | Worthington | G06Q 50/18 |

FOREIGN PATENT DOCUMENTS

| | | | | | |
|---|---|---|---|---|---|
| CN | 112651853 | A | * | 4/2021 | G06Q 50/18 |
| CN | 114490976 | A | * | 5/2022 | G06F 16/3329 |
| CN | 115034231 | A | * | 9/2022 | G06N 3/08 |
| CN | 118297045 | A | * | 7/2024 | G06Q 50/2057 |
| CN | 118378609 | A | * | 7/2024 | G06F 18/10 |
| CN | 119168059 | A | * | 12/2024 | G06F 40/35 |
| CN | 118780355 | B | * | 2/2025 | G06F 40/30 |
| KR | 102789434 | B1 | * | 4/2025 | G06F 40/258 |
| KR | 20260013728 | A | * | 1/2026 | G10L 25/63 |
| WO | WO-2025099541 | A1 | * | 5/2025 | G06F 40/56 |
| WO | WO-2025106745 | A1 | * | 5/2025 | G16H 50/20 |

* cited by examiner

400

800

900

Overview of an attention mechanism added to an RNN encoder-decoder architecture

Schematic representation of calculation of self-attention showing one attention head Inference Logic 1400

Z

+ x matmul$_V$ softmax dot-prod $e_2$ $e_3$ $e_4$

Value

Query

Key matmul^Q matmul^K $e_1$ $$Z = \text{softmax}\left(\frac{QK^T}{\sqrt{q_k}}\right)V$$

Schematic of several attention heads in a Transformer block

Example software code that implements a Transformer block

Inference Logic
1400

```
batch_size = tf.shape (x) [0]
x = self.rescale(x)
patches = self.extract_patches (x)
x = self.patch_proj (patches)

class_emb = tf.broadcast_to(
    self.class_emb, [batch_size, 1, self.d_model]
)
x = tf.concat([class_emb, x], axis=1)
x = x + self.pos_emb

for layer in self.enc_layers:
    x = layer (x, training)

return   self.mlp_head(x[:, 0])
```

FIG. 23

SYSTEM AND METHOD FOR VISUALIZATION AND ANALYSIS OF HUMAN INTERACTION DYNAMICS USING ARTIFICIAL INTELLIGENCE

This application claims the benefit of and priority to U.S. Provisional Patent Application No. 63/749,973, titled "System and Method for Visualization and Analysis of Human Interaction Dynamics using artificial intelligence," filed Jan. 27, 2025.

TECHNICAL FIELD

The present invention relates generally to systems for visualizing human interactions, particularly those involving the analysis of voice streams in conversational settings. Specifically, the invention relates to the development of methods and systems for representing human communication dynamics through visual stream graphs, utilizing artificial intelligence (AI) to enhance the analysis of complex conversational interactions.

BACKGROUND OF THE INVENTION

The "background" description provided herein is to generally present the context of the disclosure. Work of the presently named inventors, to the extent it is described in this background section, as well as aspects of the description which may not otherwise qualify as prior art at the time of filing, are neither expressly nor impliedly admitted as prior art against the present invention.

Human communication commonly occurs through multi party voice based interactions, including family discussions, organizational meetings, customer support engagements, medical consultations, and legal deliberations. In such interactions, participants may express differing viewpoints, speak with varying intensity, interrupt or respond to one another, and change positions as the discussion evolves. Observers and stakeholders often seek to understand not only the substantive content of these interactions, but also how the discussion unfolded over time, how influence emerged among participants, and how the balance between competing viewpoints shifted during the exchange.

A voice stream may comprise a continuous flow of speech generated during a conversation, and in certain environments may be associated with additional paralinguistic or nonverbal information, such as timing, pauses, overlap, prosody, facial expressions, gestures, and body posture. When considered together, such information can provide insight into participant intent, emotional tone, argument progression, topic transitions, and relative influence. The ability to interpret these elements in a unified and temporally coherent manner is increasingly relevant across professional, institutional, and analytical settings.

Early approaches to conversational analysis primarily emphasized speech to text conversion and basic natural language interaction with computing systems. These approaches typically yield transcripts or summary outputs that capture spoken content, but do not inherently convey the temporal structure or interactive nature of group discussions. As a result, aspects such as shifts in stance, evolving dominance patterns, and changes in collective alignment may be difficult to discern from static textual or aggregated representations alone.

In parallel, academic and professional communities have developed conceptual models for understanding group argumentation, influence, and decision making, including frameworks that consider opposing positions, temporal progression, and participant level contributions. These models underscore the value of examining conversational dynamics over time rather than relying solely on cumulative measures. Technological efforts have also explored artificial intelligence assisted deliberation platforms and structured decision support systems, which may organize or summarize discussion content. Such efforts reflect a broader interest in tools that can make complex conversational interactions more accessible and interpretable while respecting contextual constraints such as privacy and sensitivity.

Together, these developments illustrate an evolving landscape in which voice based interaction data is increasingly viewed as a rich source of insight, and in which there is growing emphasis on computational techniques capable of rendering conversational dynamics in forms that support understanding, analysis, and informed decision making across diverse application domains.

SUMMARY

In an exemplary embodiment, a computer implemented system for generating a bidirectional stream graph visualization of a multi participant deliberative interaction is described. The system comprises one or more processors and memory storing instructions that, when executed by the one or more processors, cause the system to receive audio data representing a deliberative interaction involving a plurality of participants, the deliberative interaction comprising discussion of at least one issue having a first position and a second position different than the first position. The system executes a speech recognition pipeline to generate, from the audio data, a plurality of speaker attributed speech segments, the speech recognition pipeline including performing speaker diarization to assign each speech segment to a participant identifier of the plurality of participants and to associate each speech segment with at least a start time and an end time, and performing automatic speech recognition to generate a text representation for each speech segment. For each speech segment, the system applies a machine learning model to the text representation to determine a valence category from a plurality of valence categories including at least a first position category and a second position category. The system determines a contribution magnitude for each speech segment. The system constructs, in memory, a stream graph data structure that maps, for each participant identifier, a time indexed series of contribution magnitudes to an upper side or a lower side of a midline based on the determined valence categories. The system renders, on a display device based on the stream graph data structure, a bidirectional stream graph visualization.

In another exemplary embodiment, a computer implemented method for generating a bidirectional stream graph visualization of deliberative dynamics among a plurality of participants is described. The method comprises receiving, by one or more processors, audio data of a deliberative interaction involving the plurality of participants, the deliberative interaction comprising discussion of a matter having a first position and a second position. The method comprises performing, by the one or more processors, speaker diarization on the audio data to generate a plurality of speaker attributed speech segments, each speaker attributed speech segment associated with a participant identifier and at least a start time and an end time. The method comprises generating, by the one or more processors, a text representation for each speaker attributed speech segment using automatic speech recognition. The method comprises classifying, by the one or more processors using a machine learning model, each text representation to determine a valence category indicating support for the first position or support for the second position. The method comprises determining, by the one or more processors, a contribution magnitude for each speaker attributed speech segment. The method comprises constructing, by the one or more processors, a stream graph data structure that, for each participant identifier, maps a time indexed series of the contribution magnitudes to an upper region or a lower region relative to a midline based on the valence category. The method comprises rendering, by the one or more processors on a display device based on the stream graph data structure, a bidirectional stream graph visualization comprising participant specific stacked area bands that vary in thickness along a temporal axis according to the contribution magnitudes. The method comprises maintaining, by the one or more processors, an association between the participant specific stacked area bands and corresponding ones of the speaker attributed speech segments.

In another exemplary embodiment, a non transitory computer readable medium storing instructions is described, wherein the instructions, when executed by one or more processors, cause the one or more processors to receive audio input representing a deliberative interaction involving a plurality of participants discussing a matter having a first position and a second position, perform speaker diarization on the audio input to generate a plurality of speaker attributed speech segments, each speaker attributed speech segment associated with a participant identifier and at least a start time and an end time, generate, using automatic speech recognition, a text representation for each speaker attributed speech segment, classify each text representation using a trained machine learning model to determine a valence category indicating support for the first position or support for the second position, determine a contribution magnitude for each speaker attributed speech segment, construct a stream graph data structure that maps, for each participant identifier, a time indexed series of contribution magnitudes to an upper region or a lower region relative to a midline based on the valence category, and cause display, on a display device based on the stream graph data structure, of a bidirectional stream graph visualization comprising participant specific stacked area bands that vary in thickness along a temporal axis according to the contribution magnitudes.

The foregoing general description of the illustrative embodiments and the following detailed description thereof are merely exemplary aspects of the teachings of this disclosure and are not restrictive.

BRIEF DESCRIPTION OF THE DRAWINGS

A more complete appreciation of this disclosure and many of the attendant advantages thereof will be readily obtained as the same becomes better understood by reference to the following detailed description when considered in connection with the accompanying drawings, wherein:

FIG. 23 shows example software code that implements a Transformer block.

DETAILED DESCRIPTION

Figure 1:
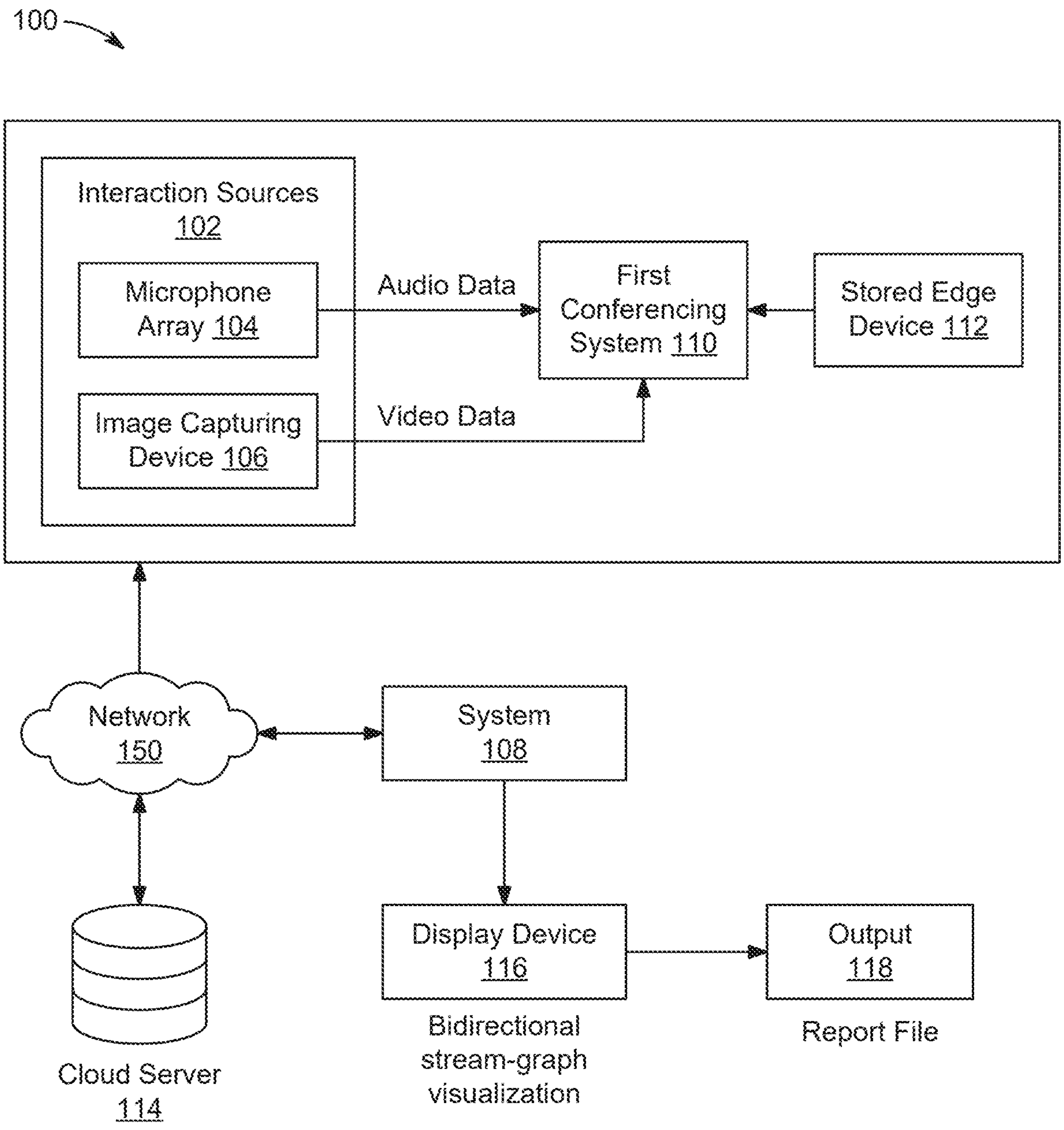
FIG. 1 illustrates a system environment for visualizing and analyzing human interactions according to certain embodiments.

In the drawings, like reference numerals designate identical or corresponding parts throughout the several views.

Further, as used herein, the words "a," "an" and the like generally carry a meaning of "one or more," unless stated otherwise.

Furthermore, the terms "approximately," "approximate," "about," and similar terms generally refer to ranges that include the identified value within a margin of 20%, 10%, or preferably 5%, and any values therebetween.

Indicia of Novelty, Inventiveness, Non-Obviousness, and Subject-Matter Eligibility Multi-participant deliberative interactions occur across diverse professional contexts, including jury deliberations, committee meetings, medical consultations, customer support calls, and legal proceedings. Participants express divergent viewpoints, shift positions over time, interrupt one another, and vary in speaking time and intensity. Stakeholders seek to understand not merely what participants said, but how interactions progressed temporally, which participants influenced discussion, when balance between competing viewpoints changed, and how argument dynamics evolved. Understanding these patterns requires capturing both speech content and temporal contribution structure in a manner revealing stance evolution, dominance patterns, and shifts in support for competing positions over time. The interaction being analyzed is not limited to arguments or debate where two vocal streams are measured on opposition sense only. Rather, in one implementation, the interaction may be a discussion of learning, such as question and answer session conducted in a university classroom, teaching recordings, classroom interaction, panel discussion held at academic conferences, and such. In another implementation, the interaction may be a debate discussion various scenarios related to a specific subject. In yet another implementation, the interaction may be a discussion, between a team of scientists, corresponding to a problem solving topic, exploring various aspects of the problem and solutions. In yet another implementation, the interaction may be a discussion at a medical center regarding clinical opinions. The present disclosure is configured to analyse multi-person interaction, regardless of a specific nature and scope of the interaction.

Voice streams comprise continuous flows of speech data generated during conversations. In certain settings, voice streams include or are paired with nonverbal or paralinguistic information, such as timing, pauses, overlap, prosody, facial expressions, gestures, and body posture. Analysts use such information to infer participant intent, emotional tone, argument progression, topic transitions, and relative influence. However, capturing and interpreting these features at scale remains challenging, particularly when discussions are lengthy, involve multiple speakers, and occur within complex social or institutional contexts requiring not just understanding of what was said, but visualization of how conversational dynamics evolved across temporal axes.

Existing conversational analysis systems exhibit technical limitations preventing effective visualization and analysis of multi-participant deliberative dynamics. Current technologies focus on converting speech to text and enabling basic natural language interactions, producing transcripts and simple summaries that fail to represent temporal evolution and interaction structure supporting meaningful assessment of stance shifts, dominance patterns, or changes in support for competing positions over time. Static representations, including plain transcripts and non-temporal aggregate statistics, obscure critical interaction events, such as moments when one faction gained momentum or when a particular participant's contribution altered group discussion trajectory. No existing technology provides time-indexed quantitative representation of multi-participant contribution magnitudes and opposing position dynamics visually inspectable across full conversation duration.

These limitations become particularly evident in high-stakes group decision making contexts. Scholarly work on group argument and influence emphasizes that aggregate counts or cumulative coding of conversational contributions omit temporal information revealing important group processes. Approaches considering argument valence as dichotomous exchange between opposing sides highlight that mapping supportive and opposing interaction over time exposes patterns of dominance, persistence, and consistency not apparent from totals alone. Despite availability of such conceptual frameworks, practical technological tools remain constrained. Existing systems emphasize transcript centric analytics reducing interactions to text without faithful temporal depiction of stance evolution. Current approaches rely on post hoc visualizations requiring extensive manual coding that do not scale to routine professional use. When video data is available, conventional systems treat visual signals as separate from speech analytics, resulting in fragmented representations failing to align verbal and nonverbal cues within common time-indexed frameworks. In sensitive environments subject to privacy requirements, additional mechanisms are needed to enforce privacy policies in verifiable manners during analysis and reporting.

Patent references reflect approaches to artificial intelligence facilitated deliberation and structured decision support. Certain systems describe large scale or asynchronous deliberation platforms in which AI agents observe discussions, exchange summaries, and present synthesized dialogue to participants. Other systems describe collaborative decision making frameworks organizing contributions into structured argument maps or tree based representations facilitating consensus building. However, these approaches do not provide standardized time-indexed quantitative representation of multi-participant contribution magnitudes and opposing position dynamics visually inspectable across full conversation duration. These systems focus on agent mediated dialogue management, content routing, or static structural representations rather than temporally continuous visualization of participant specific contribution patterns in opposed regions.

Current systems cannot generate time-indexed visualizations mapping participant contributions to opposing positions across temporal axes, represent contribution magnitudes through visual elements whose thickness varies proportionally along temporal axes, position participant specific stacked area bands in upper or lower regions based on valence categories indicating support for competing positions, integrate nonverbal communication cues from video data with speech segments in time-aligned visualizations, detect pivotal moments where aggregate valence balance transitions from favoring one position to favoring an opposing position, compute derived metrics such as dominance indicators and influence indicators from stream graph data structures, apply privacy management protocols that selectively retain, pseudonymize, or aggregate participant identifiers based on privacy classification levels, or perform sub-turn granularity analysis capturing sequential order of communication cues within individual conversational turns.

The technology disclosed introduces a system for generating bidirectional stream-graph visualizations of multi-participant deliberative interactions. The system receives audio data representing deliberative interactions involving a plurality of participants discussing at least one issue having a first position and a second position different than the first position. The system executes a speech recognition pipeline to generate, from audio data, a plurality of speaker-attributed speech segments. The speech recognition pipeline performs speaker diarization to assign each speech segment to a participant identifier and associate each speech segment with at least a start time and an end time. The speech recognition pipeline performs automatic speech recognition to generate a text representation for each speech segment.

The system applies a machine learning model to text representations to determine a valence category from a plurality of valence categories including at least a first-position category and a second-position category for each speech segment. The machine learning model comprises a generative AI model configured to output, for each text representation, a plurality of interaction labels comprising the valence category, an argument-type category selected from a predefined taxonomy of argument types, and an engagement measure indicating an extent of participation. The predefined taxonomy of argument types comprises at least opinions, questions, answers, suggestions, and rebuttals. The system determines a contribution magnitude for each speech segment based on at least one of a duration of the speech segment or an engagement measure indicating an extent of participation.

The system constructs, in memory, a stream-graph data structure that maps, for each participant identifier, a time-indexed series of contribution magnitudes to an upper side or a lower side of a midline based on determined valence categories. The system renders, on a display device based on the stream-graph data structure, a bidirectional stream-graph visualization comprising an upper region and a lower region separated by the midline, a temporal axis corresponding to time, and a plurality of participant-specific stacked area bands positioned in the upper region or the lower region according to determined valence categories. Along the temporal axis, a thickness of each participant-specific stacked area band is proportional to the contribution magnitude for that participant at a corresponding time. Each participant-specific stacked area band is rendered with a unique visual attribute selected from a predefined palette. The bidirectional stream-graph visualization further comprises a legend mapping unique visual attributes to corresponding participant identifiers.

The system received input data corresponding to an interaction being analysed. According to one aspect of the system. The input data may be an audio recording, a video recording, a transcript or a data file in any other format that preserves and renders the details of the interaction. In exemplary embodiment, the system receives video data corresponding to deliberative interactions and extracts, using a video processing module, non-verbal communication cues from video data comprising at least one of facial expressions, gestures, or body language indicators. The system temporally aligns non-verbal communication cues with corresponding speech segments based on time and renders at least a portion of non-verbal communication cues as secondary visual elements temporally aligned with participant-specific stacked area bands. The system computes, from stream-graph data structures, a plurality of derived metrics comprising a dominance indicator for each participant based on cumulative contribution magnitudes for that participant, and an influence indicator for each participant based on identified patterns of influence between that participant's contributions and contributions by other participants. The system generates at least one actionable recommendation based on derived metrics comprising at least one of identification of a dominant participant, identification of shifts in conversation dynamics, identification of a pivotal moment where an aggregate valence balance crosses the midline, or a predicted outcome for deliberative interaction based on detected conversational patterns. The system detects a pivotal moment at a time at which an aggregate valence balance transitions from favoring the first position to favoring the second position or from favoring the second position to favoring the first position, and renders a visual indicator of the pivotal moment on bidirectional stream-graph visualizations.

The system applies a privacy management protocol to at least one of participant identifiers or text representations based on a privacy classification level associated with deliberative interactions. The privacy management protocol comprises at least one of retaining participant identifiers in an unmodified form, replacing participant identifiers with pseudonymous identifiers while maintaining relational consistency within bidirectional stream-graph visualizations, or aggregating contributions across participants to suppress individual attribution. The system divides each speech segment into smaller time increments to capture a sequential order of communication cues within individual conversational turns, enabling sub-turn granularity analysis of micro-interactions including at least one of interruptions or simultaneous speaking events. The system identifies at least one position-shift event in which a predominant valence category for a participant changes between the first position and the second position over time within deliberative interactions.

The system maintains an association between participant-specific stacked area bands and corresponding ones of speaker-attributed speech segments. The system generates, using an AI based recommendation engine, at least one actionable insight based on stream-graph data structures comprising at least one of feedback for improving communication strategies, recommendations based on identified conversational patterns, or a predicted outcome based on detected conversational patterns. The system computes a dominance indicator for each participant based on cumulative contribution magnitudes for that participant, identifies patterns of influence among the plurality of participants based on stream-graph data structures, and generates an analytics summary that includes dominance indicators and identified patterns of influence.

This architecture provides technical benefits addressing visualization failures of prior art systems. First, the system enables temporal visualization of deliberative dynamics mapping contribution magnitudes to opposing positions across time axes rather than using static transcripts. Second, the system provides proportional visual representation through stacked area bands whose thickness varies according to contribution magnitude along temporal axes. Third, the system supports integrated multimodal analysis by temporally aligning nonverbal communication cues extracted from video data with speech segments in unified time-indexed visualizations. Fourth, the system enables derived metric computation including dominance indicators and influence indicators characterizing interaction patterns. Fifth, the system provides pivotal moment detection identifying transitions in aggregate valence balance across midlines. Sixth, the system supports privacy protection through configurable privacy management protocols that retain, pseudonymize, or aggregate participant identifiers based on privacy classification levels. Seventh, the system enables sub-turn granularity analysis capturing sequential order of communication cues within conversational turns to reveal micro-interactions such as interruptions and simultaneous speaking events.

The technology disclosed provides a technical implementation transforming deliberative interaction analysis from static transcript production into dynamic time-indexed visualization of multi-participant contribution patterns. The claimed system performs computational operations: receiving audio data representing deliberative interactions involving multiple participants discussing issues with opposing positions, executing speech recognition pipelines including speaker diarization and automatic speech recognition to generate speaker-attributed speech segments with temporal boundaries, applying machine learning models to text representations to determine valence categories indicating support for competing positions, determining contribution magnitudes for speech segments, constructing stream-graph data structures that map time-indexed contribution magnitude series to upper or lower regions relative to midlines based on valence categories, rendering bidirectional stream-graph visualizations comprising participant-specific stacked area bands with thickness proportional to contribution magnitude along temporal axes, receiving video data and extracting nonverbal communication cues, temporally aligning nonverbal cues with speech segments, computing derived metrics including dominance indicators and influence indicators, detecting pivotal moments where aggregate valence balance transitions between opposing positions, applying privacy management protocols based on privacy classification levels, and dividing speech segments into smaller time increments for sub-turn granularity analysis. These operations produce technical improvements over prior art systems: time-indexed visualization of deliberative dynamics mapping contributions to opposing positions, proportional visual representation through variable-thickness stacked area bands, integrated multimodal analysis through temporal alignment of verbal and nonverbal cues, derived metric computation characterizing interaction patterns, pivotal moment detection identifying valence balance transitions, privacy protection through configurable management protocols, sub-turn granularity analysis revealing micro-interactions, position-shift event identification detecting stance changes, actionable insight generation using AI based recommendation engines, and maintained associations between visual elements and underlying speech segments. The claims are directed to computational mechanisms implementing deliberative interaction visualization through audio data reception, speech recognition pipeline execution, machine learning classification, stream-graph data structure construction, bidirectional visualization rendering, video processing integration, derived metric computation, privacy protocol application, and temporal granularity analysis.

System Environment for Visualizing and Analyzing Human Interactions.

FIG. 1 illustrates a system environment 100 for visualizing and analyzing human interactions. The system environment 100 comprises a computing and communications arrangement configured to acquire, transmit, process, visualize, and output information derived from multi participant interactions. The system environment 100 is applicable to live interactions, recorded interactions, or combinations thereof, in which a plurality of participants generate voice based and optionally visual interaction data over a period of time.

As illustrated in FIG. 1, the system environment 100 includes interaction sources 102. The interaction sources 102 are configured to capture interaction input from an environment in which the plurality of participants are present or represented. The interaction sources 102 comprise a microphone array 104 and an image capturing device 106. The microphone array 104 is configured to capture acoustic signals produced by the plurality of participants and to output corresponding audio data. The microphone array 104 may include a plurality of spatially distributed microphones arranged in a linear configuration, a circular configuration, a ceiling mounted configuration, or a table mounted configuration. In certain embodiments, the microphone array 104 supports beamforming, spatial filtering, or source isolation to distinguish speech contributions from different participants or locations within the environment. The microphone array 104 may be implemented using condenser microphones, boundary microphones, micro electromechanical system microphones, or other acoustic sensing elements suitable for capturing conversational speech.

The image capturing device 106 is configured to capture visual information associated with the interaction environment and to output corresponding video data. The image capturing device 106 may be implemented as a single video camera, a multi camera array, a depth sensing device, or a stereo imaging device. The video data captured by the image capturing device 106 may represent nonverbal cues associated with participant behavior, including facial expressions, gestures, body posture, head movement, and other visually observable interaction characteristics. In illustrative embodiments, the image capturing device 106 is integrated into a conferencing endpoint, mounted within a meeting space, or incorporated into a computing device associated with the interaction.

The interaction sources 102 are communicatively coupled to a conferencing system 110. As depicted in FIG. 1, the conferencing system 110 receives the audio data from the microphone array 104 and the video data from the image capturing device 106. The conferencing system 110 is configured to handle communication of interaction data and may be implemented as a hardware based conferencing endpoint, a software based communications client executing on a computing device, or a unified communications platform. The conferencing system 110 may perform operations including synchronization of audio data and video data, encoding, decoding, packetization, and routing of interaction data for transmission or storage.

The conferencing system 110 is further coupled to a stored edge device 112. In the illustrated configuration, the stored edge device 112 is configured to provide data to the conferencing system 110. The stored edge device 112 may serve as a local repository for pre recorded interaction data, a buffering mechanism for temporarily storing audio data or video data, or an edge computing resource capable of performing preliminary processing operations. The stored edge device 112 may be implemented as a local server, a network attached storage device, an edge gateway, or an on premises computing appliance positioned in proximity to the interaction sources 102.

The system environment 100 further includes a network 150. The network 150 is communicatively coupled to the conferencing system 110 and is configured to facilitate transmission of the audio data and the video data. According to one implementation, the audio or video data is transmitted in real-time. In another implementation, the audio or video data is pre-recorded and then transmitted to the system. The network 150 may include one or more local area networks, wide area networks, wireless networks, or internet-based communication infrastructures. The network 150 supports data exchange between distributed components of the system environment 100.

A cloud server 114 is communicatively coupled to the network 150. The cloud server 114 includes storage media configured to store interaction logs, historical interaction data, processed analytics, visualization outputs, or combinations thereof. The cloud server 114 may be implemented using one or more physical servers, virtual machines, containers, or distributed cloud computing resources. In certain embodiments, the cloud server 114 provides scalable storage and computing capabilities for interaction data collected across multiple interaction environments or sessions.

A system 108 is communicatively coupled to the network 150 to receive interaction data originating from the conferencing system 110, the cloud server 114, or both. The system 108 represents a primary processing engine and may be implemented as a server, a workstation, a dedicated computing appliance, or a cloud based processing instance. The system 108 comprises one or more processors and memory storing instructions configured to analyze the received interaction data. The system 108 is configured to process the audio data and the video data to generate a visualization representing conversational dynamics among the plurality of participants over time.

The system 108 is operably coupled to a display device 116. The display device 116 is configured to present a bidirectional stream graph visualization generated by the system 108. The bidirectional stream graph visualization graphically represents participant contributions distributed along a temporal axis and arranged relative to opposing regions that correspond to different positions or valences expressed during the interaction. The display device 116 may be implemented as a computer monitor, a tablet display, a mobile device screen, a wall mounted display, or a projection system suitable for presenting the visualization to one or more viewers.

As further illustrated in FIG. 1, the display device 116 is coupled to an output 118. The output 118 is configured to generate a report file based on the visualized data. The report file may include a digital document, an exported image, a structured data file, or a summary dataset representing the bidirectional stream graph visualization and associated interaction information. The report file may be stored locally, transmitted over the network 150, or archived within the cloud server 114 for later access or review.

In operation, the microphone array 104 captures acoustic signals from the plurality of participants and outputs audio data to the conferencing system 110. The image capturing device 106 captures visual information from the interaction environment and outputs video data to the conferencing system 110. The conferencing system 110 communicates the interaction data through the network 150 to the system 108 and, in certain embodiments, to the cloud server 114 or the stored edge device 112. The system 108 processes the interaction data and provides visualization output to the display device 116 in the form of the bidirectional stream graph visualization, and the display device 116 provides the visualized data to the output 118 for generation of the report file.

Bidirectional Stream Graph Visualization Generation System

Figure 2:
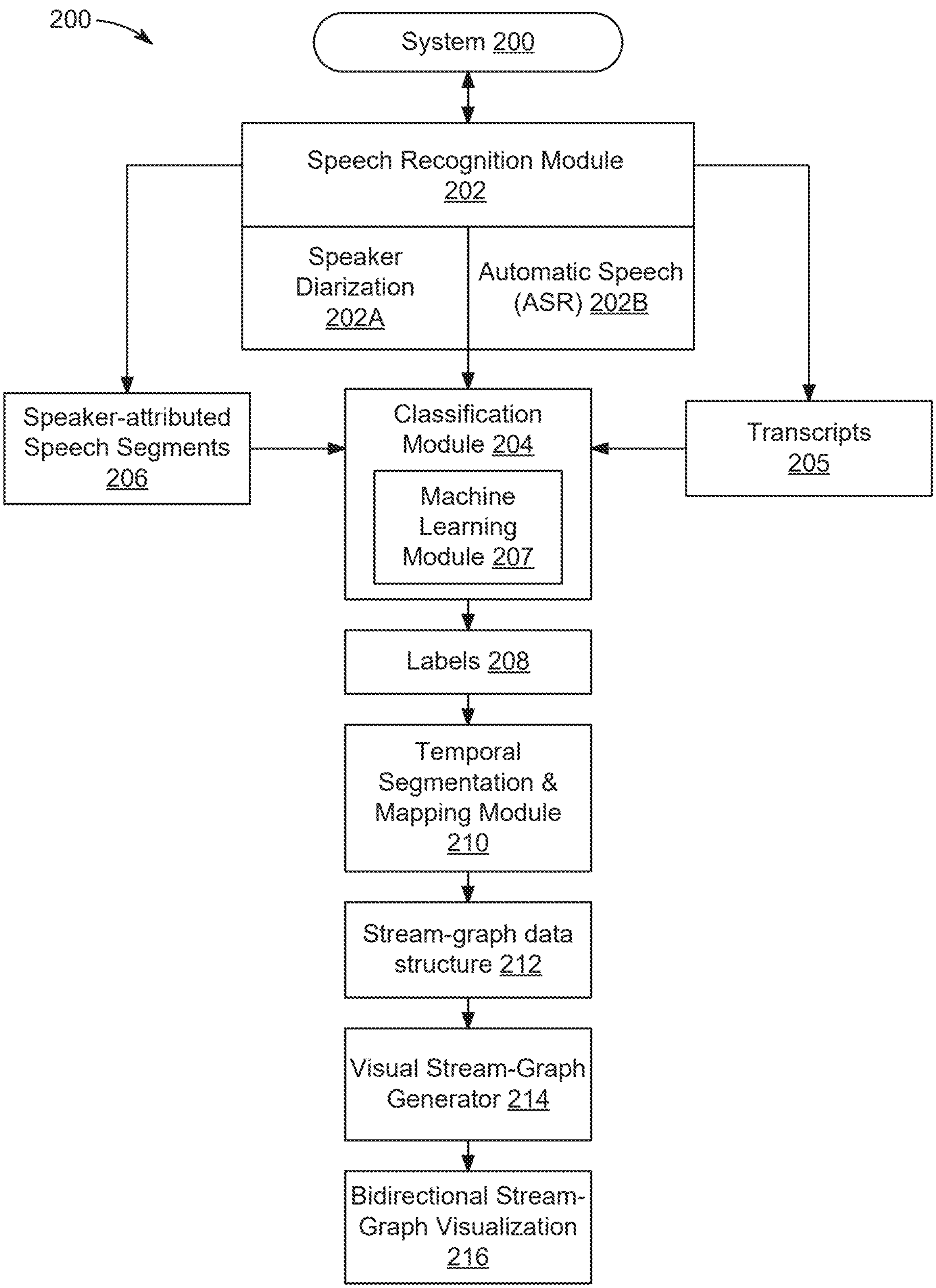
FIG. 2 illustrates a system architecture for generating bidirectional stream graph visualizations from audio-based deliberative interactions, according to certain embodiments.

FIG. 2 illustrates a system 200 for generating a bidirectional stream graph visualization of multi participant deliberative interactions. The system 200, also referred to as a deliberative interaction visualization system, is configured to process data corresponding to an interaction, extracted from audio data, video data, or transcripts, from conversations involving a plurality of participants and generate dynamic visual representations that map temporal contribution patterns to multiple positions. The system 200 implements an integrated architecture for enhanced conversational analysis, where input, such as an audio input, is computationally transformed through speech recognition, classification, and temporal mapping to produce bidirectional stream graph visualizations that reveal interaction dynamics. A deliberative interaction refers to a structured or semi structured conversation where multiple participants discuss issues having opposing positions, such as jury deliberations, committee meetings, medical consultations, classroom discussions, academic discussion, conferences, legal proceedings, or such multi-person interaction. The input to the system is the data representing the interaction. The input data can be captured in real time using audio recorders, video recorders, or such audio or video recording devices. The input data can be pre-recorded.

In some embodiments, the deliberative interaction comprises a dyadic interaction between two participants. In such embodiments, the system 200 is configured to analyze bidirectional communication dynamics between the two participants using the same speech recognition, classification, temporal mapping, and visualization pipeline described herein. Dyadic interactions are treated as a special case of multi-participant interactions, wherein participant-specific contributions are mapped relative to opposing positions, communication roles, or interactional stances.

The system is configured to receive the input data in a plurality of format that includes, but may not be limited to, audio, video, and transcripts. In one exemplary implementation of the embodiment, the input data corresponds to a recorded speech from a deliberative interaction, capturing both content and temporal structure of participant contributions. A bidirectional stream graph visualization corresponds to a graphical representation that positions participant specific stacked area bands in upper and lower regions based on valence categories, with band thickness proportional to contribution magnitude along a temporal axis. The system 200 can be conducted in various conversational settings, including in person meetings or remote communications, with data acquisition strategies ranging from single microphone recording, which provides combined audio capture, to distributed microphone arrays, which offer individual participant isolation with higher fidelity. The effectiveness of the system 200 depends on factors such as audio quality, speaker separation clarity, classification accuracy, temporal resolution, and the like. The system 200 can be implemented in various analytical applications, including legal deliberation assessment, conflict resolution support, healthcare communication analysis, and customer service evaluation.

The system 200 comprises a speech recognition module 202 structured to receive and process audio input from a deliberative interaction involving a plurality of participants. The speech recognition module 202 is configured to convert the audio input into text representations and identify distinct speaker contributions with associated temporal boundaries. Audio input refers to recorded speech data generated during a deliberative interaction, containing waveforms representative of participant utterances. The speech recognition module 202 is implemented using a plurality of speech processing mechanisms, including, but not limited to, automatic speech recognition engines, speaker diarization algorithms, natural language processing systems, and cloud based speech application programming interfaces (APIs). For example, in jury deliberation analysis, the speech recognition module 202 may process table mounted microphone recordings to generate text transcripts with speaker identification, whereas in applications requiring real time processing, edge based speech recognition systems may be deployed to minimize latency. In some examples, the speech recognition module 202 generates transcripts with word level timestamps ranging from millisecond precision to second level granularity, with speaker identification accuracy of approximately 85 percent to 95 percent depending on audio quality. Processing latency for cloud based systems may range from 100 milliseconds to 2 seconds per utterance. In contrast, edge based implementations typically achieve lower latency of 50 milliseconds to 500 milliseconds but may exhibit reduced accuracy of 75 percent to 90 percent. The speech recognition module 202 may be configured as a single integrated component or distributed across multiple processing nodes, wherein a single configuration consists of a unified speech engine handling both transcription and diarization, whereas a distributed configuration consists of specialized modules for different processing stages.

The speech recognition module 202 includes a speaker diarization module 202A and an automatic speech recognition (ASR) module 202B. The speaker diarization module 202A is configured to identify distinct speaker identities within the audio input and segment an audio stream according to speaker boundaries. Speaker diarization refers to a process of partitioning an audio stream into homogeneous segments according to speaker identity, thereby determining who spoke when in a multi speaker recording. The speaker diarization module 202A performs acoustic feature extraction, clustering analysis, and speaker boundary detection to assign each audio segment to a participant identifier. In one aspect, the speaker diarization module 202A achieves diarization accuracy in a range of about 80 percent to about 98 percent depending on a number of speakers and audio conditions. In a typical multi participant conversation, the speaker diarization module 202A is configured to distinguish between 2 to 20 distinct speakers, with optimal performance observed for conversations involving 3 to 8 participants. Accuracy of speaker diarization depends on factors such as speaker voice characteristics, acoustic environment quality, microphone configuration, and a degree of speaker overlap. High quality recordings with minimal background noise and distinct speaker voices generally result in significantly higher diarization accuracy compared to recordings with competing speech, environmental noise, or similar sounding speakers. The speaker diarization module 202A may be implemented using hidden markov models, gaussian mixture models, deep neural networks, or hybrid approaches combining multiple algorithms. Deep neural network based implementations are typically utilized for enhanced accuracy in challenging acoustic conditions. Temporal resolution of speaker boundaries may be configured based on analysis objectives, with fine grained segmentation at 100 millisecond intervals for detailed turn taking analysis and coarser segmentation at 500 millisecond to 1 second intervals for broader conversation flow assessment.

The automatic speech recognition (ASR) module 202B is configured to convert segmented audio into text representations for each identified speaker segment. Automatic speech recognition (ASR) refers to a computational process of converting spoken language into written text through acoustic modeling, language modeling, and decoding algorithms. The automatic speech recognition (ASR) module 202B processes audio segments produced by the speaker diarization module 202A and generates word level transcriptions with associated confidence scores. In certain embodiments, the automatic speech recognition (ASR) module 202B includes acoustic models trained on large scale speech corpora, language models incorporating domain specific vocabulary, and decoding algorithms optimized for conversational speech patterns. A word error rate of the automatic speech recognition (ASR) module 202B may range from 3 percent to 15 percent depending on factors such as speaker accent, speech rate, vocabulary complexity, and audio quality. For conversational speech with multiple speakers, typical word error rates range from 8 percent to 12 percent, whereas carefully articulated speech in quiet environments may achieve word error rates as low as 3 percent to 5 percent. The automatic speech recognition (ASR) module 202B may be configured to operate in batch mode for offline processing or streaming mode for real time transcription, with batch mode typically achieving higher accuracy through multi pass decoding and streaming mode providing lower latency at the cost of reduced accuracy.

The speech recognition module 202 generates a plurality of speaker attributed speech segments 206 as a first output. The speaker attributed speech segments 206 are data structures that combine text transcriptions with speaker identity information and temporal boundary markers. Each speaker attributed speech segment 206 includes at least a participant identifier indicating which participant spoke, a text representation of what was said, a start time indicating when a segment began, and an end time indicating when the segment concluded. The speaker attributed speech segments 206 serve as a foundation for subsequent classification and visualization processing. In one implementation, the speaker attributed speech segments 206 are stored as structured data records containing fields for participant identifier, start timestamp, end timestamp, transcribed text, confidence score, and audio quality metrics. Temporal precision of start times and end times may be in a range of about 10 milliseconds to about 100 milliseconds depending on sampling rate and diarization granularity. The speaker attributed speech segments 206 enable precise temporal alignment of participant contributions, allowing the system 200 to track who spoke, what was said, and when each utterance occurred throughout a deliberative interaction.

The speech recognition module 202 further generates transcripts 205 as a second output. The transcripts 205 are text documents containing complete conversational content with speaker labels and temporal markers. The transcripts 205 may be formatted as plain text files with speaker prefixes, structured documents with time coded entries, or rich text formats incorporating formatting elements. In certain embodiments, the transcripts 205 include metadata such as conversation duration, participant count, turn taking statistics, and speech rate measurements. The transcripts 205 provide a human readable representation of a deliberative interaction that can be reviewed independently or used in conjunction with a visual stream graph visualization. The transcripts 205 may be exported in various formats including text files, portable document format (PDF), word processing documents, or structured data formats such as extensible markup language (XML) or javascript object notation (JSON) for integration with external analysis tools. As depicted by directional arrows in FIG. 2, both the speaker attributed speech segments 206 and the transcripts 205 serve as inputs to subsequent processing stages, enabling multiple analytical pathways for conversational data.

The system 200 further comprises a classification module 204 operably connected to the speech recognition module 202. The classification module 204 is configured to receive both the speaker attributed speech segments 206 and the transcripts 205 as inputs, as indicated by directional arrows in FIG. 2. The classification module 204 is configured to categorize each speaker attributed speech segment 206 into predefined interaction categories that characterize conversational attributes. The classification module 204 is implemented for processing textual data to determine valence categories, argument types, engagement measures, and other conversational features that enable structured analysis of deliberative dynamics. The classification module 204 is configured to execute a series of computational operations, including text feature extraction, semantic analysis, category prediction, and confidence scoring, which collectively enable systematic characterization of participant contributions. The classification module 204 processes the speaker attributed speech segments 206 to extract segment level classifications, while utilizing the transcripts 205 to obtain contextual information that enhances classification accuracy through broader conversational understanding. For example, a classification decision for a particular segment may be informed by preceding and subsequent utterances visible in the transcripts 205, enabling the classification module 204 to resolve ambiguous statements through contextual interpretation. In dyadic embodiments, the predefined interaction categories further characterize interpersonal communication factors between the two participants, including alignment, opposition, responsiveness, escalation, or de-escalation patterns, without departing from the classification framework described herein.

The classification module 204 includes a machine learning module 207 configured to perform classification operations through trained predictive models. The machine learning module 207 encompasses neural networks, support vector machines, decision trees, ensemble methods, and other supervised learning algorithms that map text representations to categorical outputs. The machine learning module 207 may utilize pre trained language models fine tuned on domain specific datasets or custom trained classifiers developed for particular conversational contexts. The machine learning module 207 implements artificial intelligence (AI) based classification algorithms configured to analyze text representations and generate interaction labels.

The machine learning module 207 comprises computational components structured to support both training-phase operations and inference-phase operations. During training, the machine learning module 207 receives labeled training data comprising conversational segments annotated with ground truth categories, sourced from manually coded deliberations, expert-annotated transcripts, validated interaction records, or synthetically generated examples. Training dataset sizes may range from thousands to millions of labeled examples depending on model complexity and domain specificity. The machine learning module 207 applies supervised learning algorithms, including backpropagation, gradient-based optimization, and convex optimization techniques, to learn statistical associations between textual features and categorical labels, with training duration varying based on dataset size, model architecture, and available computational resources.

The machine learning module 207 may implement multiple model architectures selected according to task requirements and performance criteria. Such architectures may include feedforward neural networks, recurrent neural networks with long short-term memory (LSTM) or gated recurrent units (GRUs), convolutional neural networks, and transformer-based architectures. In some embodiments, the machine learning module 207 utilizes pre-trained transformer models, including BERT, ROBERTa, ALBERT, DistilBERT, GPT variants, T5, or domain-adapted variants fine-tuned on conversational data, thereby leveraging representations learned from large-scale text corpora.

Fine-tuning operations adapt pre-trained models to specific classification tasks. The machine learning module 207 adds task-specific classification heads that map contextualized text representations to categorical outputs. For valence classification, a classification head may output categories corresponding to a first position, a second position, or a neutral position. The first position may refer to a stance taken by a participant or a subset of participant from among the group involved in the interaction. For example, a set of juries in favour of plaintiffs, a professor teaching in a classroom, first group participating in a debate. The second position may refer to a stance, which is different than the stance taken by the participants at the first position, taken by a participant or a subset of participant from among the group involved in the interaction. For example, a set of juries not in favour of plaintiff, students attending a lecture in the classroom. The neutral position may refer to a position, where no specific stance is taken by the participants. The first, second and neutral positions thus demonstrate different facets of the interactions. For multi-label classification, the machine learning module 207 may implement multiple classification heads operating in parallel for valence, argument type, and engagement. Fine-tuning optimizes one or more loss functions and typically requires a limited number of labeled examples, completing within minutes to hours depending on model size and data volume.

Alternative machine learning approaches may be implemented within the machine learning module 207. In some embodiments, the machine learning module 207 implements support vector machines (SVMs) that separate classes in a high-dimensional feature space using text features derived from term-frequency/inverse-document-frequency (TF-IDF), bag-of-words, or n-gram representations. In some embodiments, the machine learning module 207 implements decision-tree ensemble models, including random forests, gradient-boosted trees, or extreme gradient boosting (XGBoost), to provide interpretable classification outputs. In further embodiments, the machine learning module 207 implements naïve Bayes classifiers or logistic regression models to provide computationally efficient probabilistic classification.

Hybrid architectures combining multiple modeling approaches may be implemented within the machine learning module 207. In one embodiment, the machine learning module 207 implements ensemble methods that combine outputs from neural networks, SVMs, and decision-tree models using voting, weighted averaging, or stacking in which a meta-learner combines base-model predictions. In another embodiment, the machine learning module 207 implements a multi-stage classification pipeline that applies rule-based filtering to segments before invoking one or more machine learning models. In yet another embodiment, the machine learning module 207 implements an active-learning framework that identifies low-confidence predictions and requests human annotations for ambiguous segments to improve model performance.

During an inference phase, the machine learning module 207 applies trained models to new conversational data received from the speech recognition module 202. The machine learning module 207 preprocesses input text representations using tokenization. For transformer-based models, tokenization may include WordPiece tokenization, conversion of tokens to numerical indices, and application of embeddings with positional encodings. The machine learning module 207 processes the embeddings through one or more transformer layers to generate contextualized representations and applies one or more classification heads to output categorical predictions with associated confidence scores. In some embodiments, the machine learning module 207 executes inference with per-segment latency in a range of about 10 milliseconds to about 500 milliseconds, and uses hardware acceleration including graphics processing units (GPUs), tensor processing units (TPUs), or inference accelerators.

The machine learning module 207 implements confidence scoring to quantify prediction reliability. In one embodiment, the machine learning module 207 derives confidence scores from softmax probabilities, where high-confidence predictions have probabilities exceeding about 0.8 to about 0.95 and low-confidence predictions have maximum probabilities below about 0.6. In some embodiments, low-confidence predictions trigger manual review or secondary classification. In further embodiments, the machine learning module 207 applies calibration techniques, including temperature scaling or Platt scaling. In yet further embodiments, the machine learning module 207 performs uncertainty quantification using Monte Carlo dropout or Bayesian neural network techniques.

Domain adaptation techniques may be implemented within the machine learning module 207 to address distribution shifts between training data and deployment data. In one embodiment, the machine learning module 207 implements transfer learning by using a pre-trained model as a feature extractor and fine-tuning upper layers on domain data. In another embodiment, the machine learning module 207 implements unsupervised domain adaptation using adversarial training to align source and target representations. In further embodiments, the machine learning module 207 implements few-shot learning or meta-learning techniques to adapt to new categories using limited labeled examples.

The machine learning module 207 may implement online learning for continuous model improvement. In one embodiment, the machine learning module 207 updates model parameters using incremental training when new annotated examples become available through user corrections or expert review. In some embodiments, the machine learning module 207 applies techniques to reduce catastrophic forgetting, including elastic weight consolidation, experience replay, or progressive neural network approaches. In further embodiments, the machine learning module 207 implements model versioning to track performance across model iterations and to enable rollback upon detecting performance degradation.

Feature engineering and representation learning may be implemented within the machine learning module 207 to enhance classification performance. In some embodiments, the machine learning module 207 extracts linguistic features including part-of-speech tags, syntactic parse features, named-entity recognition outputs, sentiment scores, discourse markers, or rhetorical structure features. In some embodiments, the machine learning module 207 extracts semantic features including topic distributions, semantic similarity metrics, or contextualized embeddings. In further embodiments, the machine learning module 207 uses temporal features derived from timestamps and participant features derived from historical speaking patterns or aggregate valence tendencies. In some embodiments, the machine learning module 207 applies feature selection using mutual information, chi-squared statistics, or recursive feature elimination, and applies dimensionality reduction using principal component analysis (PCA), linear discriminant analysis (LDA), autoencoders, or combinations thereof.

Regularization techniques may be implemented within the machine learning module 207 to reduce overfitting and improve generalization. In one embodiment, the machine learning module 207 applies L1 regularization or L2 regularization. In another embodiment, the machine learning module 207 applies dropout or batch normalization. In further embodiments, the machine learning module 207 applies early stopping. In some embodiments, the machine learning module 207 performs data augmentation using perturbations including synonym replacement, back-translation, or paraphrasing.

Model interpretability and explainability features may be implemented within the machine learning module 207. In one embodiment, the machine learning module 207 provides attention-weight visualizations to identify text spans that influence classification decisions. In another embodiment, the machine learning module 207 applies gradient-based saliency methods or layer-wise relevance propagation to generate token-level attribution scores. In further embodiments, the machine learning module 207 applies local interpretable model-agnostic explanations (LIME) or generates counterfactual explanations identifying minimal text modifications that change predicted categories.

Performance monitoring may be implemented within the machine learning module 207. In one embodiment, the machine learning module 207 tracks one or more of classification accuracy, precision, recall, F1 scores, or confusion matrices for one or more classification dimensions. In some embodiments, valence classification achieves accuracy in a range of about 80 percent to about 92 percent for polarized statements, argument-type classification achieves accuracy in a range of about 75 percent to about 88 percent, and engagement scoring achieves correlation coefficients in a range of about 0.7 to about 0.9 with human annotations. In some embodiments, the machine learning module 207 implements domain-specific models for different conversational contexts.

The machine learning module 207 outputs classification results as structured predictions including category labels, confidence scores, and optional metadata. For each input segment, the machine learning module 207 generates a valence category indicating whether the speech segment supports a first position, supports a second position opposed to the first position, or maintains a neutral stance. The machine learning module 207 further generates an argument-type category according to a predefined taxonomy comprising at least opinions, questions, answers, suggestions, and rebuttals. The machine learning module 207 further computes an engagement measure indicating an extent of participation, where the engagement measure is quantified based on at least one of speech-segment duration, word count, semantic complexity, or combinations thereof, and where engagement scores may be normalized to a scale of 0 to 100.

The classification module 204 applies the machine learning module 207 to each speaker attributed speech segment 206 to determine appropriate categorizations. A classification process involves tokenizing text representations, extracting linguistic features, computing semantic embeddings, and applying trained models to predict category memberships with associated confidence scores. The classification module 204 utilizes contextual information from the transcripts 205 to enhance classification accuracy through resolution of ambiguous references, pronoun disambiguation, topic continuity assessment, and coherence analysis across multiple segments. For example, a statement such as "I agree" may be classified as supporting a first position or a second position depending on which position was advocated in preceding utterances visible in the transcripts 205.

The classification module 204 generates labels 208 as output. The labels 208 are structured data representations containing classification results for each speaker attributed speech segment 206. Each label 208 includes at least a valence category, an argument type category, an engagement measure, and confidence scores for each classification decision. The labels 208 may further include secondary attributes such as emotional tone indicators, topic classifications, or discourse markers. In one implementation, the labels 208 are represented as multi dimensional feature vectors where each dimension corresponds to a specific conversational attribute. The labels 208 enable systematic analysis of conversational patterns by providing quantitative and categorical descriptors for each participant contribution. The labels 208 serve as input to a temporal segmentation and mapping module 210 for integration with temporal information.

The system 200 further includes the temporal segmentation and mapping module 210 operably connected to the classification module 204. The temporal segmentation and mapping module 210 is configured to organize the speaker attributed speech segments 206 and associated labels 208 according to temporal progression. The temporal segmentation and mapping module 210 is implemented for dividing a deliberative interaction into discrete time segments and mapping participant contributions to a temporal axis. The temporal segmentation and mapping module 210 is configured to execute computational operations including time interval definition, segment boundary determination, contribution aggregation, and temporal alignment, which collectively enable precise temporal representation of conversational dynamics. The temporal segmentation and mapping module 210 processes start times and end times from the speaker attributed speech segments 206 to establish a chronological sequence of conversational turns. In certain embodiments, the temporal segmentation and mapping module 210 implements adaptive segmentation strategies wherein segment boundaries are determined based on natural conversation breaks, speaker transitions, topic shifts, or fixed time intervals. Fixed time interval segmentation may divide a conversation into uniform segments of 30 seconds to 5 minutes duration, whereas adaptive segmentation may create variable length segments ranging from 10 seconds to 10 minutes based on conversational structure.

The temporal segmentation and mapping module 210 maps each conversational turn to a specific time increment along a temporal axis. A conversational turn refers to a continuous speech segment from a single participant, bounded by speaker transitions or extended pauses. A mapping process assigns each turn to its corresponding position on a temporal axis based on a start time of a speech segment. In one aspect, a temporal axis is divided into 8 to 20 discrete time increments for visualization purposes, with each increment representing a phase or segment of an overall deliberative interaction. For example, a 60 minute jury deliberation may be divided into 12 increments of 5 minutes each, allowing temporal tracking of argument evolution across a deliberation period. The temporal segmentation and mapping module 210 may implement sub turn granularity analysis by further dividing each speech segment into smaller time increments to capture a sequential order of communication cues within individual conversational turns. This fine grained temporal resolution enables detection of micro interactions including interruptions, overlapping speech, brief pauses, and rapid turn exchanges. Sub turn granularity may segment speech at intervals of 100 milliseconds to 1 second, capturing temporal patterns not visible at a turn level.

The temporal segmentation and mapping module 210 determines contribution magnitudes for each speech segment. A contribution magnitude refers to a quantitative measure of an extent or intensity of a participant's contribution during a specific time period. A contribution magnitude may be determined based on at least one of a duration of a speech segment, a word count of a text representation, an engagement measure from the labels 208, or combinations thereof. For example, a contribution magnitude may be calculated as a weighted sum of normalized duration, normalized word count, and engagement score. In one implementation, contribution magnitudes are normalized to a scale of 0 to 100 for consistent representation across different participants and time segments. The temporal segmentation and mapping module 210 aggregates contribution magnitudes for each participant across each time increment, enabling quantification of participant engagement patterns over time.

The temporal segmentation and mapping module 210 generates a stream graph data structure 212 as output. The stream graph data structure 212 is a computational representation that organizes participant contributions according to temporal progression and valence categories. The stream graph data structure 212 maps, for each participant identifier, a time indexed series of contribution magnitudes to an upper region or a lower region relative to a midline based on determined valence categories. An upper region corresponds to contributions supporting a first position, whereas a lower region corresponds to contributions supporting a second position opposed to the first position. A midline serves as a visual separator between two opposed regions. The stream graph data structure 212 may be implemented as a multi dimensional data array, a relational database table, a graph structure, or an object oriented data model. In one embodiment, the stream graph data structure 212 includes fields for time increment identifier, participant identifier, contribution magnitude, valence category, spatial coordinates for visualization, and metadata attributes. The stream graph data structure 212 enables efficient computation of aggregate statistics such as total contribution by position, dominant participant identification, temporal trend analysis, and pivotal moment detection.

The system 200 further comprises a visual stream graph generator 214 operably connected to the temporal segmentation and mapping module 210. The visual stream graph generator 214 is configured to create graphical representations from the stream graph data structure 212. The visual stream graph generator 214 is implemented for rendering bidirectional stream graph visualizations that display temporal progression of multi participant deliberative interactions. The visual stream graph generator 214 is configured to execute graphical rendering operations including coordinate transformation, area calculation, color mapping, layer stacking, and visual element composition, which collectively produce intuitive visual representations of conversational dynamics. The visual stream graph generator 214 processes the stream graph data structure 212 to determine spatial positioning, thickness, and color attributes for each participant specific stacked area band. In certain embodiments, the visual stream graph generator 214 implements smoothing algorithms to create visually continuous area bands that transition smoothly between time increments, rather than displaying discrete rectangular blocks. Smoothing may be achieved through spline interpolation, bezier curve fitting, or polynomial regression applied to a contribution magnitude series.

The visual stream graph generator 214 renders each participant's contribution as a distinct participant specific stacked area band. A participant specific stacked area band refers to a graphical element representing a contribution magnitude of a single participant over time, visualized as a colored or patterned area whose thickness varies proportionally to contribution magnitude. A stacking approach positions multiple participant bands adjacently within each region, with cumulative height representing total contribution for that position during each time increment. The visual stream graph generator 214 assigns unique visual attributes to each participant identifier from a predefined palette. Visual attributes may include distinct colors, patterns, textures, or combinations thereof. For example, in an 8 participant conversation, each participant may be assigned a distinct color such as blue, red, green, yellow, purple, orange, brown, and pink. The visual stream graph generator 214 further generates a legend mapping unique visual attributes to corresponding participant identifiers, enabling viewers to identify which visual element represents which participant.

The visual stream graph generator 214 positions participant specific stacked area bands in an upper region or a lower region based on valence categories determined by the classification module 204. Contributions classified with a first position valence category are positioned in the upper region, whereas contributions classified with a second position valence category are positioned in the lower region. Neutral contributions may be positioned adjacent to a midline or distributed proportionally between regions. Along a temporal axis corresponding to time, a thickness of each participant specific stacked area band is proportional to a contribution magnitude for that participant at a corresponding time. For example, if participant A contributes 30 units of magnitude supporting a first position during time increment 3, a vertical extent of participant A's band in the upper region during increment 3 will be proportional to 30 units. A proportionality relationship ensures that visual prominence directly reflects contribution intensity.

The visual stream graph generator 214 generates a bidirectional stream graph visualization 216 as output. The bidirectional stream graph visualization 216 comprises an upper region and a lower region separated by a midline, a temporal axis corresponding to time, and a plurality of participant specific stacked area bands positioned in the upper region or the lower region according to determined valence categories. The bidirectional stream graph visualization 216 provides an intuitive visual representation where relative dominance of each position can be assessed by comparing cumulative area in the upper region versus the lower region at any given time increment. The visualization enables identification of pivotal moments where aggregate valence balance transitions from favoring one position to favoring an opposing position. A pivotal moment refers to a time point where cumulative contribution magnitude for one position exceeds cumulative contribution magnitude for an opposing position, indicating a shift in conversational momentum. The visual stream graph generator 214 may render visual indicators of pivotal moments, such as vertical lines, annotations, or highlighting, to draw attention to these significant transition points.

In dyadic interaction embodiments, the bidirectional stream graph visualization 216 visually represents the relative contribution patterns of the two participants over time, enabling assessment of conversational balance, dominance, reciprocity, and conflict dynamics. In such cases, stacked area bands correspond to the two participants, and relative area thickness and temporal variation reveal shifts in conversational control, alignment, or opposition between the participants.

The bidirectional stream graph visualization 216 may be rendered on various display devices including computer monitors, tablet screens, projection systems, or printed media. In certain embodiments, the bidirectional stream graph visualization 216 is interactive, allowing users to hover over specific regions to view detailed information about individual contributions, click on participant bands to highlight or filter specific participants, or adjust temporal resolution to zoom into specific time periods. The visual stream graph generator 214 may export the bidirectional stream graph visualization 216 in various formats including portable network graphics (PNG), scalable vector graphics (SVG), portable document format (PDF), or interactive web formats such as hypertext markup language (HTML) with javascript. The bidirectional stream graph visualization 216 facilitates rapid comprehension of complex multi participant conversational dynamics by transforming temporal contribution data into an accessible visual format that reveals patterns, trends, and critical moments that would be difficult to discern from text transcripts alone.

The system 200 enables comprehensive analysis of deliberative interactions by integrating speech recognition, classification, temporal mapping, and visualization components into a unified workflow. The speech recognition module 202 converts audio input into structured speaker attributed speech segments 206 and transcripts 205 with temporal boundaries. The classification module 204 applies the machine learning module 207 to categorize each segment according to valence, argument type, and engagement, utilizing both the speaker attributed speech segments 206 and the transcripts 205 as inputs to produce labels 208 that characterize conversational attributes. The temporal segmentation and mapping module 210 organizes contributions along a temporal axis, computes contribution magnitudes, and constructs the stream graph data structure 212 that maps time indexed contribution series to upper and lower regions based on valence. The visual stream graph generator 214 transforms the stream graph data structure 212 into the bidirectional stream graph visualization 216, rendering participant specific stacked area bands whose thickness varies proportionally with contribution magnitude along a temporal axis. This integrated architecture provides concrete technical capabilities for temporal visualization of deliberative dynamics, proportional visual representation through variable thickness stacked area bands, systematic classification of conversational attributes through advanced machine learning techniques, and intuitive identification of argument evolution patterns, dominant participants, and pivotal moments in multi participant deliberative interactions.

Methodological Framework for Observational Interaction Analysis

The system architecture illustrated in FIG. 2, an operational and analytical framework is employed to demonstrate how the outputs generated by the system are applied to structured observational analysis of real multi participant interactions. In particular, the speech recognition, classification, labeling, temporal segmentation, and stream graph data construction operations performed by the system of FIG. 2 provide the foundational inputs required for implementing a formal methodology for coding, measuring, and analyzing deliberative interaction behavior. The methodological framework described herein is an exemplary experiment that utilizes pre-recorded interaction data acquired, processed, and structured by the system of FIG. 2 to conduct turn level analysis, valence assignment, contribution aggregation, and influence modeling across recorded group deliberations. Subsequent discussion, in view of FIG. 3, demonstrate an exemplary method, and should not be construed as a limitation to various embodiments and implementation described in the present disclosure.

A methodological framework is employed for studying multi participant deliberative interactions using recorded audiovisual data and structured observational coding. A plurality of deliberative groups is recruited from multiple geographic regions, including northeastern, southern, and midwestern regions. A total of seventeen groups are included. Each group comprises between six and ten members. Across the plurality of groups, eight distinct court cases are used as deliberation scenarios. The overall participant sample is approximately balanced with respect to sex, with female participants comprising approximately fifty five point eight percent of the total group members. Certain groups exhibit less balanced sex distributions. Sex is treated as a controlled variable in subsequent statistical modeling.

Participant ages range from eighteen years to sixty six years. Education levels vary across participants, with some participants having not completed high school and others having completed portions of graduate level education. Race varies across the groups, with Caucasian participants comprising approximately sixty five point three percent, African american participants comprising approximately twenty nine point nine percent, Asian participants comprising approximately zero point seven percent, and Hispanic participants comprising approximately four point one percent of the sample. Race is controlled as a variable in statistical modeling.

Participants are recruited by a trial consulting firm. All group interactions are captured as recorded video data for coding and analysis. Observational analysis is selected as the coding methodology. Video recordings provide access to paralinguistic information for coding decisions, including timing, overlap, sarcasm, and other nonverbal cues that affect assignment of argument valence. Transcription errors present a risk of misattributing turns to incorrect participants, which is detrimental where participant specific turn counts are evaluated relative to post deliberation change. Video observation allows coders to assess turns from a perspective consistent with that of group members. Observational coding aligns with the method by which group members exchange information, as group members derive meaning through observation of one another.

The mock jury design and video collection originate from a midwestern trial consulting firm. Participants listen to an overview of a case, followed by arguments presented for both sides. Participants provide a pre-deliberation decision preference. Following deliberation, a jury verdict form is completed by a foreman in the case of unanimous decisions or by individual jurors where unanimity is not achieved.

The unit of analysis is defined as the turn. Four coding teams are employed to code argument turns across all seventeen groups. The coding teams include a valence coding team, a content coding team, a communication interaction categories coding team, and a content analysis team. Eighteen student coders participate. Coders meet weekly for a quarter until coding agreement exceeds ninety five percent. Coders then independently observe deliberations and assign codes to each turn by mapping codes onto a jury interaction grid. The grid comprises juror identifiers arranged along one axis and time code intervals arranged along another axis. Coders assign a pro plaintiff symbol to turns favoring the plaintiff and a pro defendant symbol to turns favoring the defendant.

To assess reliability, a video is coded in common by all coders. Guetzkow's U values are computed. Coder set A yields a U value of 0.007. Coder set B yields a U value of 0.000. Between coder set A and coder set B, reliability is measured at 0.007. Guetzkow's U measures whether a turn occurred and does not account for speaker initiation. Because speaker attribution is critical, total turns by each participant are summed and compared across coders.

Table 1 presents Spearman's rho correlations of summed turns among valence coders, including pairwise correlations among coder one, coder two, coder three, and coder four, with significance levels at 0.05 and 0.01.

Further analysis reveals that a single coder miscoded a highly verbal juror, resulting in turn assignment error. An additional independent coder is used across all seventeen groups to resolve discrepancies regarding turn initiation. Percent agreement of valence assignments among coders is then computed to establish reliability.

Change is operationalized using pre-test and post-test survey questions specific to each court case. Change is measured dichotomously based on whether a participant's response differs between pre-deliberation and post deliberation. Change is measured at both the individual level and the group level. Groups are distributed across high change, low change, and no change categories.

The variable IND represents individual level change and is measured as the presence or absence of difference between pre-deliberation and post deliberation preferences. AVGRVAL represents the mean valence of group members. Individual valence scores are computed as the total number of defense supporting turns minus the total number of plaintiff supporting turns for each participant. Group valence is computed as the total number of plaintiff turns minus the total number of defense turns divided by the number of jurors.

LOMAJ represents a majority margin below sixty six percent. HIMAJ represents a majority margin of sixty six percent or greater. PREPROP represents the initial proportion of pre-deliberation preferences and is used as a predictor variable. PREPROPSQ represents the squared pre-deliberation preference proportion and is used to test for a quadratic relationship.

Results are evaluated using hierarchical linear modeling. Individual decision change serves as the outcome variable nested within groups. Group identifiers serve as level identification variables. Demographic variables including race, education, age, and sex are controlled in the models.

Hypothesis one evaluates whether pre-deliberation preference proportion influences change under high majority conditions. Table 1 presents fixed effect coefficients, standard errors, t ratios, degrees of freedom, and p values for this model, along with variance components.

Due to limited group level sample size, statistical power is insufficient to reliably accept or reject the null hypothesis. Removal of a unanimous group that deliberated civil awards yields increased majority effects, as presented in Table 2.

TABLE 1

| High Majority and Pre-deliberation Preference | | | | | |
|---|---|---|---|---|---|
| Fixed Effect | Coefficient | Standard error | t-ratio | Approx. d.f. | p-value |
| For INTRCPT1, $\beta_0$ | | | | | |
| INTRCPT2, $\gamma_{00}$ | 0.240347 | 0.037080 | 6.482 | 14 | <0.001 |
| HIMAJ, $\gamma_{01}$ | 0.079698 | 0.102793 | 0.775 | 14 | 0.451 |
| PREPROP, $\gamma_{02}$ | 0.030325 | 0.244907 | 0.124 | 14 | 0.903 |
| For MALE slope, $\beta_1$ | | | | | |
| INTRCPT2, $\gamma_{10}$ | −0.024141 | 0.073941 | −0.326 | 114 | 0.745 |
| For AFRAMER slope, $\beta_2$ | | | | | |
| INTRCPT2, $\gamma_{20}$ | −1.076957 | 0.452036 | −2.382 | 114 | 0.019 |
| For CAUCASIO slope, $\beta_3$ | | | | | |
| INTRCPT2, $\gamma_{30}$ | −1.008185 | 0.449560 | −2.243 | 114 | 0.027 |
| For HISPANIC slope, $\beta_4$ | | | | | |
| INTRCPT2, $\gamma_{40}$ | −0.889459 | 0.483384 | −1.840 | 114 | 0.068 |
| For HS slope, $\beta_5$ | | | | | |
| INTRCPT2, $\gamma_{50}$ | −0.187357 | 0.181977 | −1.030 | 114 | 0.305 |
| For TRADE slope, $\beta_6$ | | | | | |
| INTRCPT2, $\gamma_{60}$ | 0.030258 | 0.221692 | 0.136 | 114 | 0.892 |
| For SOMECOLL slope, $\beta_7$ | | | | | |
| INTRCPT2, $\gamma_{70}$ | −0.027618 | 0.174790 | −0.158 | 114 | 0.875 |
| For COLLEGE slope, $\beta_8$ | | | | | |
| INTRCPT2, $\gamma_{80}$ | −0.064041 | 0.188302 | −0.340 | 114 | 0.734 |
| For GRAD slope, $\beta_9$ | | | | | |
| INTRCPT2, $\gamma_{90}$ | −0.151757 | 0.233248 | −0.651 | 114 | 0.517 |
| For A18_24 slope, $\beta_{10}$ | | | | | |
| INTRCPT2, $\gamma_{100}$ | 0.132008 | 0.112990 | 1.168 | 114 | 0.245 |
| For A25_34 slope, $\beta_{11}$ | | | | | |
| INTRCPT2, $\gamma_{110}$ | 0.090565 | 0.118616 | 0.764 | 114 | 0.447 |
| For A35_44 slope, $\beta_{12}$ | | | | | |
| INTRCPT2, $\gamma_{120}$ | 0.157304 | 0.120435 | 1.306 | 114 | 0.194 |
| For A45_54 slope, $\beta_3$ | | | | | |
| INTRCPT2, $\gamma_{130}$ | 0.092830 | 0.117932 | 0.787 | 114 | 0.433 |

The robust standard errors cannot be computed for this model.
Final estimation of variance components

| Random Effect | Standard Deviation | Variance Component | d.f. | $\chi^2$ | p-value |
|---|---|---|---|---|---|
| INTRCPT1, $u_0$ | 0.03582 | 0.00128 | 14 | 14.29796 | 0.428 |
| level-1, r | 0.43004 | 0.18494 | | | |

TABLE 2

| Explanatory Test of Majority Influence | | | | | |
|---|---|---|---|---|---|
| Fixed Effect | Coefficient | Standard error | t-ratio | Approx. d.f. | p-value |
| For INTRCPT1, $\beta_0$ | | | | | |
| INTRCPT2, $\gamma_{00}$ | 0.253332 | 0.038082 | 6.652 | 13 | <0.001 |
| HIMAJ, $\gamma_{01}$ | 0.254462 | 0.129247 | 1.969 | 13 | 0.071 |
| PREPROP, $\gamma_{02}$ | −1.174634 | 0.578499 | −2.030 | 13 | 0.063 |

TABLE 2-continued

| Explanatory Test of Majority Influence | | | | | |
|---|---|---|---|---|---|
| Final estimation of variance components | | | | | |
| Random Effect | Standard Deviation | Variance Component | d.f. | $\chi^2$ | p-value |
| INTRCPT1, $u_0$ | 0.00743 | 0.00006 | 13 | 9.80987 | >0.500 |
| level-1, r | 0.43805 | 0.19189 | | | |

Hypothesis two evaluates whether argument valence influences change under low majority conditions. Table 3 presents coefficients and variance components for this model. Results indicate low effect and insufficient power.

TABLE 3

| Argument Valence in Low Majority | | | | | |
|---|---|---|---|---|---|
| Fixed Effect | Coefficient | Standard error | t-ratio | Approx. d.f. | p-value |
| For INTRCPT1, $\beta_0$ | | | | | |
| INTRCPT2, $\gamma_{00}$ | 0.235141 | 0.038615 | 6.089 | 14 | <0.001 |
| AVGRPVAL, $\gamma_{01}$ | 0.007930 | 0.008142 | 0.974 | 14 | 0.347 |
| LOMAJ, $\gamma_{02}$ | −0.058803 | 0.091522 | −0.643 | 14 | 0.531 |
| The robust standard errors cannot be computed for this model. Final estimation of variance components | | | | | |
| Random Effect | Standard Deviation | Variance Component | d.f. | $\chi^2$ | p-value |
| INTRCPT1, $u_0$ | 0.05885 | 0.00346 | 14 | 15.66699 | 0.334 |
| level-1, r | 0.42768 | 0.18291 | | | |

Figure 3:
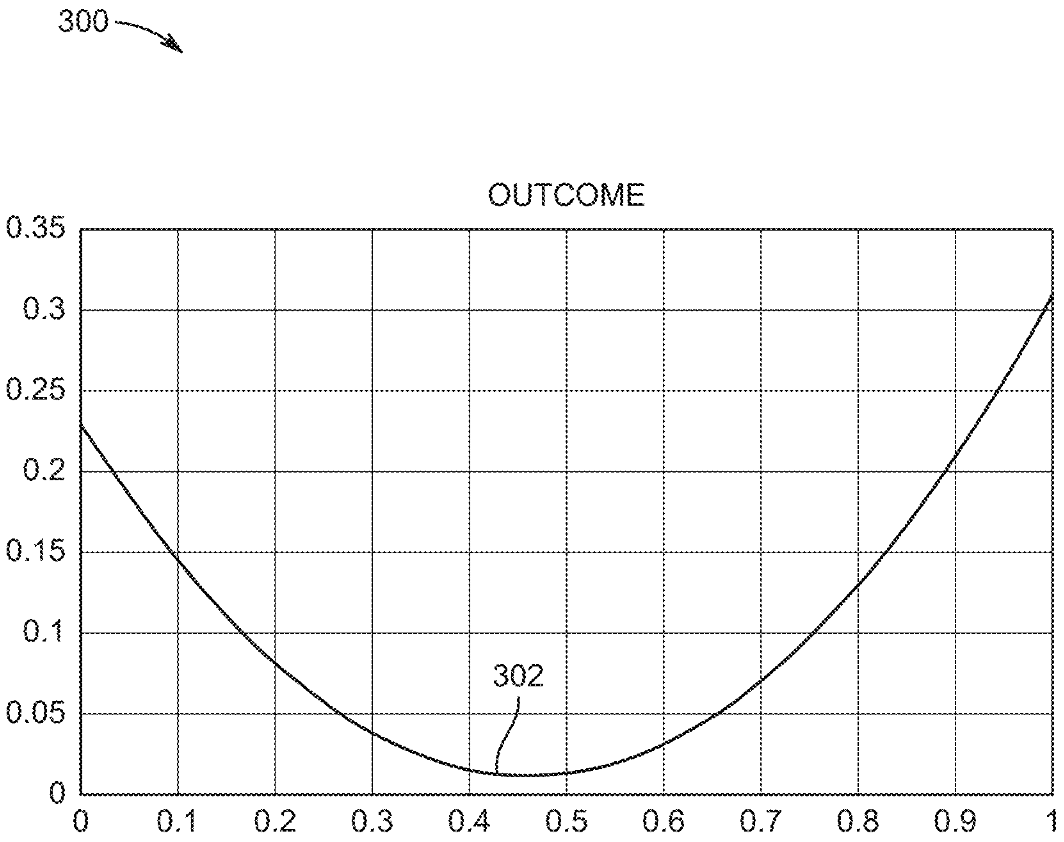
FIG. 3 illustrates an observational coding and analytical modeling framework, according to certain embodiments.

Hypothesis three evaluates whether a curvilinear relationship provides a better fit than a linear model. Table 4 presents coefficients for linear and quadratic predictors. FIG. 3 presents a graphical representation of the quadratic relationship between group preference proportion and likelihood of change. Results indicate trends consistent with the hypothesis but insufficient statistical power for reliable estimation.

TABLE 4

| The Argument Valence Model | | | | | |
|---|---|---|---|---|---|
| Fixed Effect | Coefficient | Standard error | t-ratio | Approx. d.f. | p-value |
| For INTRCPT1, $\beta_0$ | | | | | |
| INTRCPT2, $\gamma_{00}$ | 0.235512 | 0.035803 | 6.578 | 14 | <0.001 |
| PREPROPS, $\gamma_{01}$ | −0.945925 | 0.566103 | −1.671 | 14 | 0.117 |
| PREPROP, $\gamma_{02}$ | 1.022512 | 0.537711 | 1.902 | 14 | 0.078 |
| The robust standard errors cannot be computed for this model. Final estimation of variance components | | | | | |
| Random Effect | Standard Deviation | Variance Component | d.f. | $\chi^2$ | p-value |
| INTRCPT1, $u_0$ | 0.00742 | 0.00006 | 14 | 11.53027 | >0.500 |
| level-1, r | 0.42681 | 0.18217 | | | |

The method further defines a plurality of evaluative hypotheses corresponding to distinct influence mechanisms within deliberative interactions.

A first hypothesis defines that, under a high majority condition, the proportion of pre-deliberation preferences influences individual level decision change. In this construct, individual decision change serves as a dependent outcome variable nested within group structures. Group identifiers serve as level identification variables. Pre-deliberation preference proportion and a high majority indicator variable are incorporated as group level predictors. Participant demographic variables are incorporated as control variables.

A second hypothesis defines that, under a low majority condition, argument valence influences individual level decision change. In this construct, mean group valence and a low majority indicator variable are incorporated as group level predictors, while individual decision change serves as the dependent outcome variable. Participant demographic variables are incorporated as control variables.

A third hypothesis defines that, in the absence of strong majority divisions, a curvilinear relationship between pre-deliberation preference proportion and individual decision change provides a better explanatory model than a linear relationship. In this construct, pre-deliberation preference proportion and a squared pre-deliberation preference proportion term are incorporated as group level predictors.

Change is operationalized through comparison of pre-deliberation and post deliberation decision preferences. Change is measured dichotomously based on the presence or absence of difference between the two preferences. Change is measured at both the individual participant level and the group level.

Individual valence scores are computed as the total number of turns supporting one position minus the total number of turns supporting the opposing position for each participant. Group valence is computed by aggregating individual valence scores and normalizing by the number of participants in the group.

Majority margin variables are computed based on the proportion of pre-deliberation preferences supporting a given position. Groups are classified into high majority and low majority conditions based on predetermined threshold proportions. Additional predictor variables include squared pre-deliberation preference proportion values.

Tables are defined to represent coder agreement metrics, distribution of majority faction and group change, individual and group valence computations, and hierarchical linear modeling results. The tables further represent fixed effect coefficients, variance components, and model estimation parameters corresponding to each hypothesis evaluation. Graphical tables represent modeled relationships between majority proportion and likelihood of individual decision change.

FIG. 3 illustrates an observational coding and analytical modeling framework 300 configured to transform recorded multi-participant deliberative interactions into structured, time-indexed, and participant-attributed analytical representations.

As illustrated in FIG. 3, recorded interaction data is processed through an observational coding stage of the framework 300 in which each interaction turn is identified, temporally indexed, and attributed to a specific participant. Each interaction turn is assigned a valence code corresponding to support for a first position or a second position. The coded interaction turns are mapped onto an interaction grid defined over participant identifiers and time indices within the framework 300.

The framework 300 further computes individual valence scores by aggregating valence-coded turns on a per-participant basis and computes group-level valence values by aggregating individual valence scores across the group. Pre-deliberation decision preferences and post-deliberation decision preferences are recorded and compared to determine individual-level and group-level decision change.

Majority margin values are computed by the framework 300 based on pre-deliberation preference distributions. Based on the computed majority margin values, deliberative groups are classified into high-majority conditions or low-majority conditions. Squared preference-proportion values are computed to support non-linear analytical modeling.

The framework 300 applies hierarchical linear modeling to the structured interaction data. Individual decision change is modeled as an outcome variable nested within group-level structures. Group identifiers, majority-margin variables, aggregated valence variables, and optional demographic control variables are incorporated into the hierarchical model. Model outputs include fixed-effect estimates, variance components, and modeled relationships corresponding to defined analytical hypotheses.

As illustrated in FIG. 3, the outcome relationship 302 represents a modeled non-linear relationship between group-level parameters and decision-change outcomes produced by the hierarchical linear modeling executed by the framework 300. The outcome relationship 302 visually depicts how outcome values vary as a function of modeled parameters derived from the coded deliberative interaction data.

Temporal Distribution of Arguments

Figure 4:
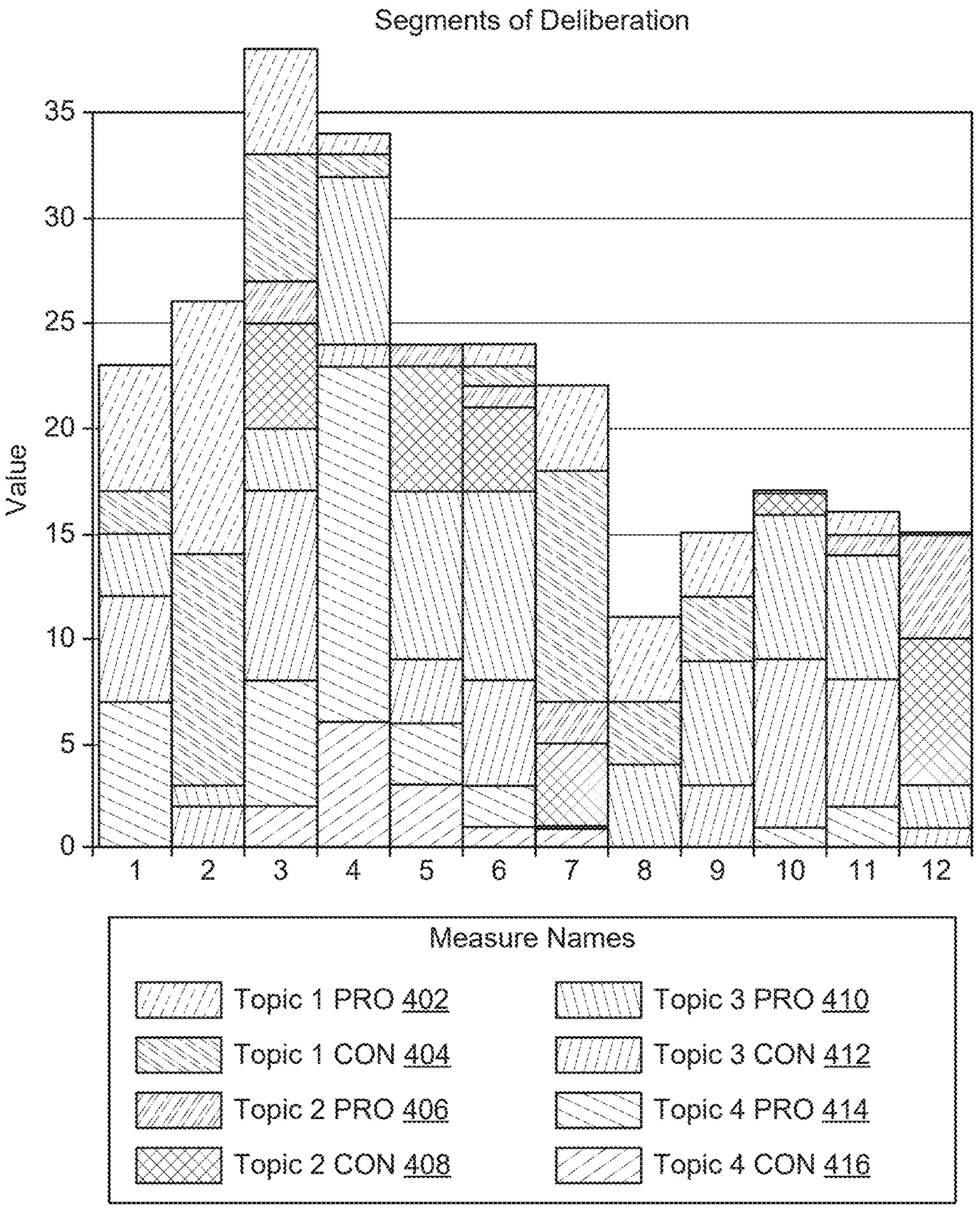
FIG. 4 illustrates a graphical representation of temporal distribution of arguments across segments of deliberation in a multi participant deliberative interaction, according to certain embodiments.

FIG. 4 illustrates a graphical representation 400 of temporal distribution of arguments across segments of deliberation in a multi participant deliberative interaction. The graphical representation 400, also referred to as a temporal argument distribution visualization, is configured to depict how different argument topics recur and persist throughout discrete time segments of a deliberation by aggregating argument occurrences and rendering the aggregated argument occurrences in a stacked bar chart format. An argument occurrence refers to an instance where a participant articulates a position supporting or opposing a particular topic during a conversational turn. Temporal distribution corresponds to a pattern of how argument occurrences are spread across discrete time increments throughout a deliberation period. The stacked bar chart format corresponds to a graphical format in which multiple data series are displayed as vertically stacked segments within bars positioned along a horizontal temporal axis, with segment heights proportional to aggregated values.

The graphical representation 400 comprises a horizontal axis representing segments of deliberation. The horizontal axis is divided into twelve discrete segments numbered sequentially from 1 through 12, each segment corresponding to an equal increment of time within an overall deliberation period. In one implementation, a deliberation period is divided into twelve equal increments of time, wherein each time increment represents approximately one twelfth of a total deliberation duration, such that a 60 minute deliberation corresponds to 5 minute segments, a 72 minute deliberation corresponds to 6 minute segments, and an 84 minute deliberation corresponds to 7 minute segments. The segmentation enables time indexed tracking of whether particular topics persist across an entire deliberation or concentrate in particular temporal phases.

The graphical representation 400 comprises a vertical axis representing value measurements. The vertical axis is scaled from 0 to 35 in increments of 5. Value refers to a numerical quantity representing a sum of argument turns assigned to particular topics within a specific segment. A conversational turn refers to a continuous speech contribution from a single participant addressing a particular topic with a particular position. During each segment, arguments made by participants are assigned to conversational turns and summed to produce an aggregated value for each topic position combination during that segment. The scale accommodates peak values observed in deliberative data, with a maximum of 35 representing a highest observed aggregation of argument turns in a segment.

The graphical representation 400 displays a plurality of stacked bar elements positioned at each of the twelve segment locations along the horizontal axis. Each stacked bar element comprises multiple vertically arranged segments corresponding to different topic position combinations that coexist within a same segment of deliberation. A height of each stacked bar element represents a cumulative total of all argument occurrences across all topic position combinations during the corresponding segment. Variation in stack height across segments indicates variation in overall deliberation activity across time.

The graphical representation 400 represents eight distinct topic position combinations through differentially patterned segments within the stacked bar elements. The eight topic position combinations comprise topic 1 pro 402, topic 1 con 404, topic 2 pro 406, topic 2 con 408, topic 3 pro 410, topic 3 con 412, topic 4 pro 414, and topic 4 con 416. A topic refers to a substantive issue or argument category discussed during a deliberative interaction, such as a legal issue, factual dispute, liability assessment, or damages consideration in a jury deliberation context. A pro position refers to arguments supporting a particular determination, while a con position refers to arguments opposing that determination. The pro and con classification for each topic enables tracking of both sides of an argument exchange within a same visualization.

Topic 1 pro 402 represents arguments supporting a first position regarding a first substantive issue and is visually encoded using a first diagonal stripe pattern. Topic 1 con 404 represents arguments opposing the first position regarding the first substantive issue and is visually encoded using a second diagonal stripe pattern distinct from the first. Topic 2 pro 406 represents arguments supporting a second position regarding a second substantive issue and is encoded using a third diagonal stripe pattern. Topic 2 con 408 represents arguments opposing the second position regarding the second substantive issue and is encoded using a cross hatch pattern. Topic 3 pro 410 represents arguments supporting a third position regarding a third substantive issue and is encoded using a vertical stripe pattern. Topic 3 con 412 represents arguments opposing the third position regarding the third substantive issue and is encoded using a diagonal stripe pattern distinct from the other diagonal encodings. Topic 4 pro 414 represents arguments supporting a fourth position regarding a fourth substantive issue and is encoded using a further distinct diagonal stripe pattern. Topic 4 con 416 represents arguments opposing the fourth position regarding the fourth substantive issue and is encoded using a dense distinct pattern.

The graphical representation 400 includes a legend positioned below the stacked bar chart. The legend provides a mapping between the visual patterns and corresponding topic position combinations, including textual labels and reference numerals 402, 404, 406, 408, 410, 412, 414, and 416. The legend enables decoding of the stacked bar elements and facilitates comparison between pro and con positions for each topic.

Examination of the stacked bar elements reveals temporal distribution patterns of argument occurrences across the twelve segments. Early segments show presence of multiple topics from both supporting and opposing perspectives, indicating broad issue exploration during initial deliberation phases. Middle segments exhibit higher cumulative values, indicating increased deliberative activity and sustained engagement across several topics. Later segments continue to show recurrence of multiple topics, demonstrating that substantive issues reappear throughout the deliberation rather than being confined to early discussion.

The graphical representation 400 reveals patterns of topic consistency and persistence. Consistency, as derived from literature, refers to a topic appearing in both earlier and later portions of a deliberation. Persistence refers to the frequency with which a topic recurs across multiple segments from beginning to end. As illustrated, most topics recur across multiple segments, indicating sustained consideration over time. Certain topic position combinations appear in a majority of segments, while others appear less frequently and are concentrated in later phases, illustrating differential persistence across topics.

The graphical representation 400 further demonstrates limitations of defining consistency solely based on dividing a deliberation into halves, as most topics appear in both halves when context rich deliberations are examined. The visualization supports alternative operationalizations of consistency and persistence, including finer temporal segmentation or continuous measures of topic recurrence.

The data represented in the graphical representation 400 is derived from pre deliberation and post deliberation survey measures associated with multiple court cases. Differences between pre-test and post-test responses indicate whether participants changed or maintained positions on particular issues. By mapping argument occurrences across time, the graphical representation 400 provides a visual framework for analyzing how deliberative interactions contribute to opinion stability, opinion change, and group decision outcomes.

Bidirectional Stream-Graph Visualization

Figure 5:
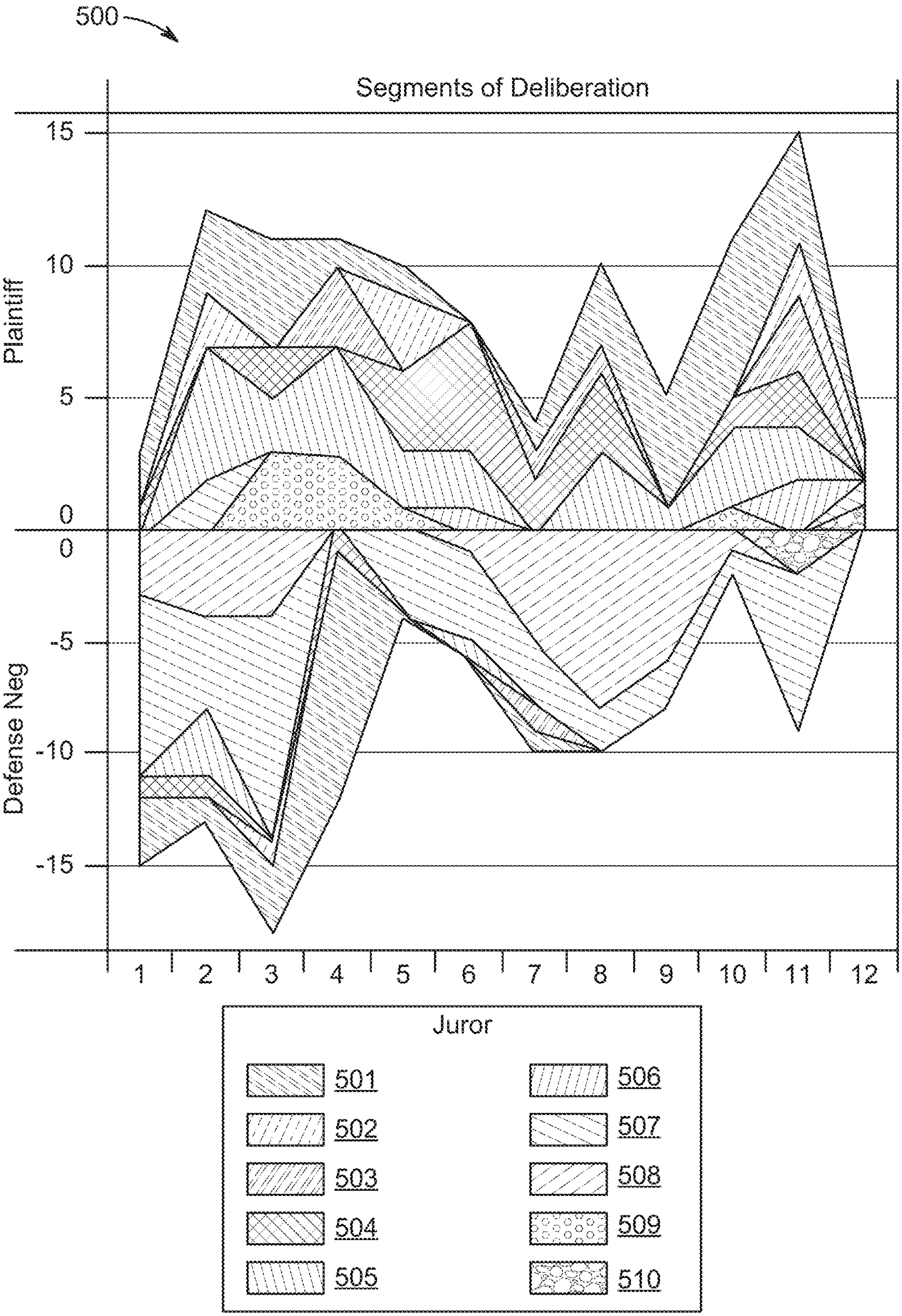
FIG. 5 illustrates an exemplary bidirectional stream-graph visualization representing mapping of argument valence over time for a single deliberative interaction involving multiple participants, according to certain embodiments.

FIG. 5 illustrates an exemplary bidirectional stream-graph visualization 500 representing mapping of argument valence over time for a single deliberative interaction involving multiple participants, also referred to as jurors. The bidirectional stream-graph visualization 500 is generated by the system described with reference to FIG. 2 using interaction data that is temporally segmented, classified, mapped, and aggregated by the modules and operations described with reference to FIG. 3. The visualization constitutes an output of a visual stream-graph generator and visualization rendering engine operating on coded interaction data produced by a temporal segmentation and mapping module and a classification module.

Mapping, as used herein, refers to assigning each conversational turn, or each time-indexed segment of a deliberation, to one or more codes and arranging the coded data along a temporal axis so that patterns in group arguments become visually apparent. In the argument valence model, a single conversational turn may hold multiple codes, and the bidirectional stream-graph visualization 500 provides a graphical structure capable of accommodating and visually presenting such multi-coded data. By graphing argument valence over time, the visualization reveals layers of interaction that are less readily discernible when underlying data is examined solely as numeric values.

The bidirectional stream-graph visualization 500 includes a horizontal axis representing segments of deliberation. The horizontal axis is divided into twelve discrete segments numbered sequentially from 1 through 12, each segment corresponding to a defined interval of time within an overall deliberation period. In one implementation, the temporal segmentation and mapping module divides the deliberative interaction into the twelve segments and assigns each conversational turn to at least one segment based on an associated time code.

The bidirectional stream-graph visualization 500 further includes a vertical axis representing contribution magnitude. Contribution magnitude refers to a quantitative measure attributable to a participant within a given segment and may be derived from metrics including turn count, speech duration, engagement level, or expressive intensity. The vertical axis is bisected by a central reference line at zero, thereby defining an upper region and a lower region corresponding to opposing argument valence. In one implementation, contribution magnitude values are computed by a contribution magnitude computation module and provided to a stream-graph data structure constructor for rendering participant-specific stream areas.

The upper region, labeled Plaintiff, corresponds to pro-plaintiff remarks, which are conversational contributions favoring a first side of a dichotomous debate. In a jury deliberation context, pro-plaintiff remarks include statements supporting liability, damages, or other plaintiff-favoring propositions. The lower region, labeled Defense Neg, corresponds to pro-defense turns rendered below the central reference line using negative ordinate values. The term Defense Neg denotes that defense-side contributions are positioned below the midline to preserve a bidirectional coordinate system in which opposing positions occupy opposing regions relative to the central reference line. In one implementation, the classification module assigns a pro-plaintiff code or a pro-defense code to each conversational turn, and the mapping operation positions corresponding magnitudes in the upper or lower region accordingly.

The bidirectional stream-graph visualization 500 includes a plurality of participant-specific stacked area bands rendered as stream areas extending above and below the central reference line. Each stream area corresponds to a distinct juror and is rendered with a thickness proportional to the contribution magnitude for that juror within each segment. A legend positioned beneath the graph associates distinct visual patterns with ten juror identifiers, namely Juror 501, Juror 502, Juror 503, Juror 504, Juror 505, Juror 506, Juror 507, Juror 508, Juror 509, and Juror 510. The stacked area architecture enables simultaneous visualization of multiple jurors while preserving individual attribution.

Juror 501 is associated with a first pattern, such as dense diagonal hatching. The stream area corresponding to Juror 501 appears in both the Plaintiff region and the Defense Neg region during earlier segments and appears exclusively in the Plaintiff region during later segments, visually indicating a shift in expressed stance over time. Juror 502 is associated with a second pattern, such as wide diagonal hatching, and exhibits variation in stream thickness across segments, indicating fluctuating engagement levels. Juror 503 is associated with a third pattern and contributes at differing magnitudes during different phases of the deliberation. Juror 504 is associated with a fourth pattern, such as cross-hatching, and shows segment-specific expansion and contraction reflecting changes in contribution magnitude.

Juror 505 is associated with a fifth pattern, such as vertical stripes, and Juror 506 is associated with a sixth pattern, such as slanted vertical stripes, each serving as participant identification attributes rendered consistently across segments. Juror 507 is associated with a seventh pattern and appears in one or both regions across segments, indicating contributions that may support different sides at different times or sustain alignment with a single side over extended intervals. Juror 508 is associated with an eighth pattern and appears predominantly in the Defense Neg region, with limited corresponding presence in the Plaintiff region, indicating primarily defense-aligned participation with minimal pro-plaintiff contribution.

Juror 509 is associated with a ninth pattern, such as stippling or dots, and remains visibly present in the Defense Neg region during later segments, indicating persistent defense-aligned participation. Juror 510 is associated with a tenth pattern, such as irregular stone-like shapes, and also appears in the Defense Neg region in later segments, further illustrating persistence of a minority defense-aligned faction.

The bidirectional stream-graph visualization 500 illustrates that jurors speak at differing lengths on different sides of the debate and that contribution patterns evolve over time. When considered alongside initial preference data, the visualization depicts a shift from an initial majority preference to a stronger majority outcome, including recruitment of influential participants to the plaintiff side in later segments while a limited subset of jurors remains consistently pro-defense. Accordingly, FIG. 5 provides a time-indexed, visually interpretable depiction of argument valence, participant-specific contribution allocation, majority shift, and minority persistence across the duration of a deliberation, as produced by the system architecture of FIG. 2 and the segmentation, classification, mapping, and aggregation operations described with reference to FIG. 3.

Juror-Specific Valence Tracking Visualization

Figure 6:
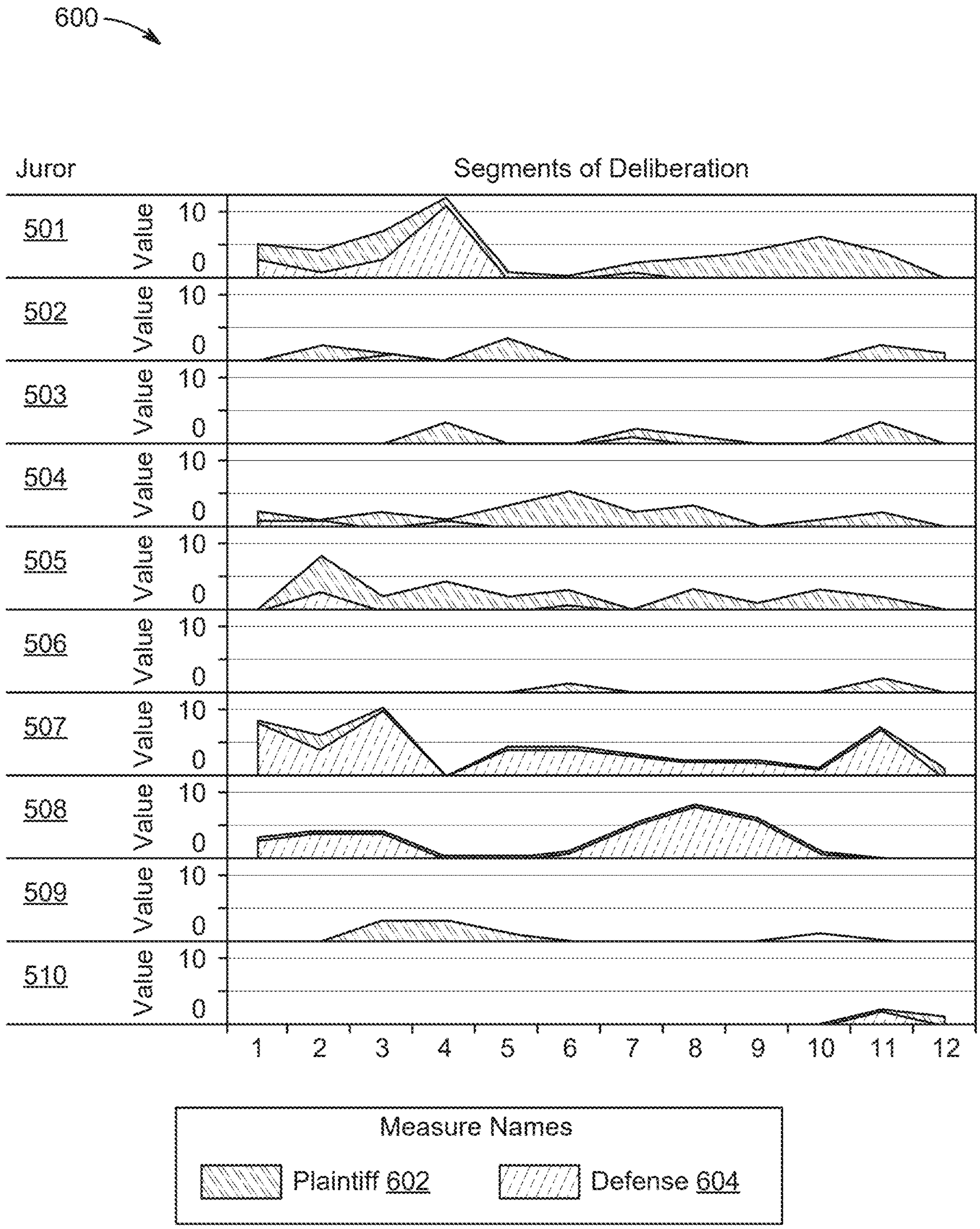
FIG. 6 illustrates an exemplary juror-specific valence tracking visualization for displaying valence distribution mapped by individual jurors over temporal segments of a deliberative interaction, according to certain embodiments.

FIG. 6 illustrates an exemplary juror-specific valence tracking visualization 600 for displaying valence distribution mapped by individual jurors over temporal segments of a deliberative interaction. The visualization 600 is generated by the system of FIG. 2 using interaction data that is segmented, speaker-attributed, and valence-classified by the modules of FIG. 3, and the visualization 600 is configured to make the ebb and flow of each juror's support visually apparent over time. In this context, "valence" refers to a polarity of a conversational contribution, including a plaintiff-favoring polarity and a defense-favoring polarity, as determined by a classification module of FIG. 3 based on coded turns that may include one or more codes per turn The visualization 600 includes a plurality of horizontal panels arranged vertically, with each horizontal panel corresponding to a respective juror identifier, including juror 501, juror 502, juror 503, juror 504, juror 505, juror 506, juror 507, juror 508, juror 509, and juror 510. Each panel provides a separate, juror-isolated view of that juror's contributions so that juror-to-juror differences in engagement, dominance, and social loafing become discernible without aggregation. "Dominance" refers to a proportion of total group arguments attributable to an individual juror, and "social loafing" refers to reduced individual participation in a group setting.

Each panel includes a horizontal axis representing segments of deliberation and a vertical axis representing value. The horizontal axis is divided into twelve discrete segments numbered 1 through 12, corresponding to time-indexed segments produced by a temporal segmentation and mapping module of FIG. 3. The vertical axis is labeled "Value" and is scaled from 0 to 10 for each juror panel, where the value represents an aggregated measure of that juror's coded turns within the corresponding segment. In one implementation, the value is computed as a count of turns, a cumulative speech duration, or a contribution magnitude determined using the contribution magnitude computation operations described with respect to FIG. 11.

The visualization 600 includes a legend labeled "Measure Names" identifying position-specific encodings. Plaintiff contributions 602 correspond to pro-plaintiff turns, meaning conversational contributions favoring a plaintiff side of a dichotomous debate, such as statements supporting liability, damages, or other plaintiff-favoring propositions. Defense contributions 604 correspond to pro-defense turns, meaning conversational contributions favoring a defense side of the dichotomous debate, such as statements opposing liability, challenging damages, or otherwise favoring a defense position. The legend indicates that plaintiff contributions 602 and defense contributions 604 are rendered using distinct patterns so that the visualization 600 remains interpretable in monochrome reproduction.

Within each juror panel, one or more patterned area bands depict that juror's plaintiff contributions 602 and defense contributions 604 across the twelve segments, where band height within a segment is proportional to the value for that juror and that valence category in that segment. In an exemplary interpretation consistent with the disclosure, the visualization 600 makes it clear that there is relatively stronger defense support in earlier segments and a gradual erosion of that support toward a stronger pro-plaintiff stance by the end of deliberation. The penalization further makes it easy to see that some jurors exhibit minimal participation even when their side is being argued, which is consistent with low engagement and may indicate social loafing.

The panel for juror 501 illustrates a pronounced temporal change in juror-specific support across the segments, and the visualization 600 is configured to permit identification of juror 501 as a juror who changes position between a pre-test preference and a post-test preference, based on the mapped pattern of valence-coded turns across time. This capability aligns with a pre-test/post-test operationalization of change, where a participant's response to a pre-deliberation question is compared to the participant's response to a post-deliberation question and the difference is dichotomously measured. In one implementation, the system stores the pre-test and post-test preference for each juror and correlates preference change with the juror-specific valence distribution rendered in the visualization 600.

The panel for juror 502 illustrates intermittent participation, wherein contributions appear in selected segments rather than persistently across all segments, thereby enabling visual separation of sporadic engagement from sustained engagement. The panels for juror 503, juror 506, juror 509, and juror 510 illustrate comparatively low activity, thereby supporting identification of jurors who speak minimally. The panel for juror 507 illustrates sustained engagement across the deliberation timeline and may include both plaintiff contributions 602 and defense contributions 604, thereby supporting identification of jurors who speak to both sides of the debate across segments. The panel for juror 508 illustrates concentrated engagement within a subset of segments, including a sustained band that supports identification of periods of heightened advocacy or attention. Accordingly, FIG. 6 provides a juror-by-juror visualization that supports assessment of individual influence, dominance, sharedness, and participation distribution in a deliberative interaction, as generated by the segmentation, speaker attribution, and valence classification modules of FIGS. 2-3.

Topic-by-Juror Contribution Visualization

Figure 7:
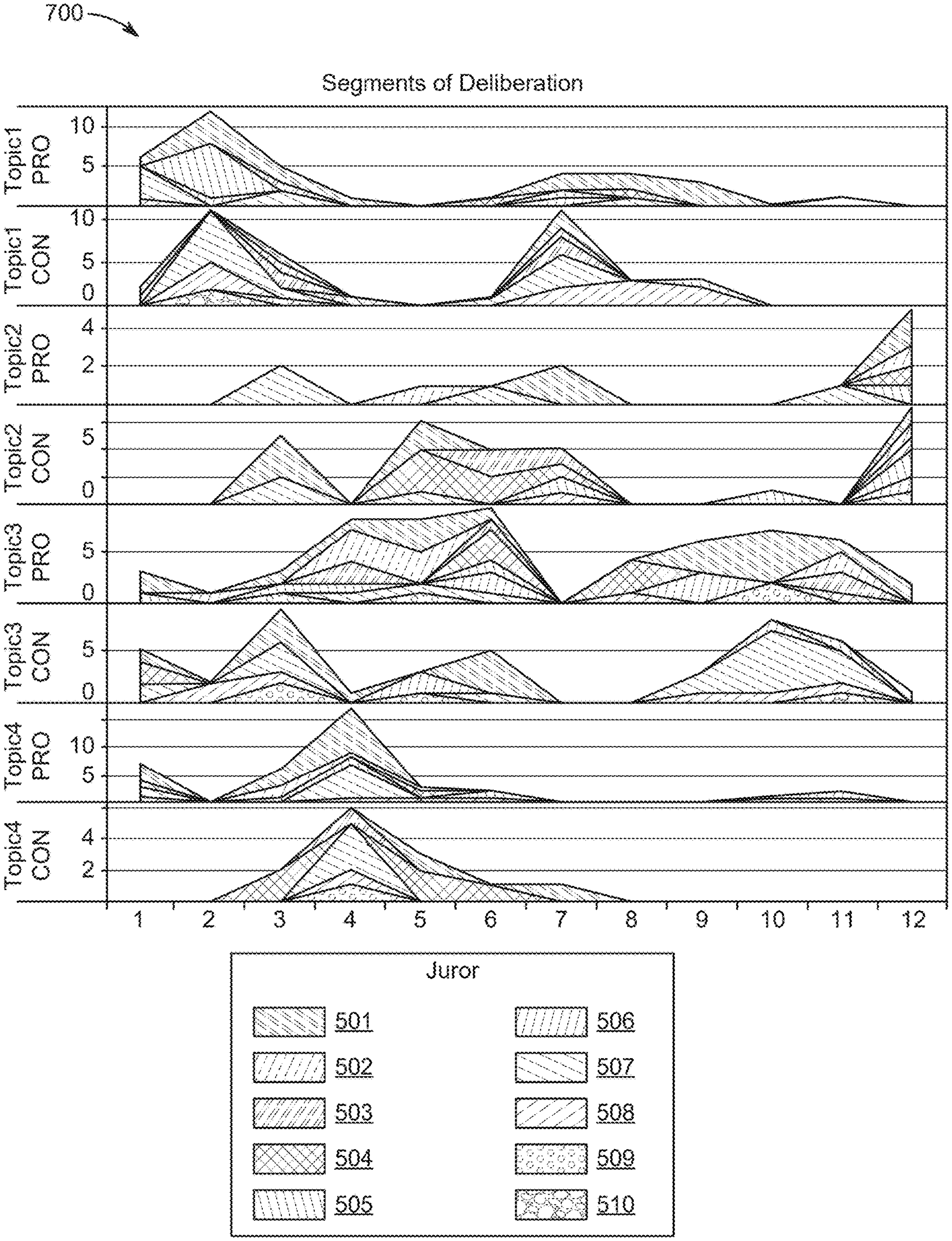
FIG. 7 illustrates an exemplary topic-by-juror contribution visualization for displaying topic-specific contributions mapped by individual jurors over temporal segments of a deliberative interaction, according to certain embodiments.

FIG. 7 illustrates an exemplary topic-by-juror contribution visualization 700 for displaying topic-specific contributions mapped by individual jurors over temporal segments of a deliberative interaction. The visualization 700 is generated by the system of FIG. 2 based on coded interaction data produced by the modules of FIG. 3, including topic classification and valence classification, and the visualization 700 is configured to reveal, for each topic and each side of the topic, which jurors provide turns of support, for how long, and in which segments of deliberation. In this context, "sharedness of topic" refers to how many jurors engage with a particular topic (regardless of side), and "distributed valence" refers to how many jurors support a particular side of a topic.

The visualization 700 includes a plurality of horizontal panels arranged vertically, with each panel corresponding to a topic-position combination. The panels include, in order, Topic 1 PRO, Topic 1 CON, Topic 2 PRO, Topic 2 CON, Topic 3 PRO, Topic 3 CON, Topic 4 PRO, and Topic 4 CON. Each panel includes a horizontal axis divided into twelve segments numbered 1 through 12, corresponding to the same temporal segmentation scheme used by the temporal segmentation and mapping module of FIG. 3. Each panel also includes a vertical axis labeled "Value," where the value represents an aggregated measure of coded turns associated with that topic-position combination in that segment. The panels use adaptive vertical scaling to preserve readability across topics, including, by way of example as illustrated, scales such as 0-10 for Topic 1 PRO and Topic 1 CON, 0-4 for Topic 2 PRO, 0-5 for Topic 2 CON, 0-5 for Topic 3 PRO, 0-5 for Topic 3 CON, 0-10 for Topic 4 PRO, and 0-4 for Topic 4 CON.

Each panel displays a stacked area representation in which individual juror contributions are layered to form a cumulative area for the topic-position combination within each segment. Each stacked band corresponds to a distinct juror and uses a distinct pattern assigned to that juror, as shown by the legend labeled "Juror." The legend identifies juror 501, juror 502, juror 503, juror 504, juror 505, juror 506, juror 507, juror 508, juror 509, and juror 510, thereby enabling attribution of topic support to specific jurors at specific segments. In one implementation, the system of FIG. 2 assigns and stores juror-pattern mappings as rendering attributes, and a visualization rendering engine renders the stacked bands using those attributes.

Topic 1 PRO and Topic 1 CON panels enable direct comparison of juror support for opposing sides of Topic 1 across the same time segments. When a same juror pattern appears in both the Topic 1 PRO panel and the Topic 1 CON panel within a same segment, the visualization 700 indicates that the juror spoke to both sides of the issue within that segment. This behavior aligns with the disclosure's observation that some jurors spend time on each side of most topics of argument. Similarly, the Topic 2 PRO and Topic 2 CON panels enable juror attribution for Topic 2 support and opposition, including identification of topics that receive more attention on one side than the other, and identification of which jurors provide that attention.

The Topic 3 PRO and Topic 3 CON panels illustrate that Topic 3 receives sustained attention across multiple segments, and the stacked structure enables a viewer to determine whether that attention is broadly shared among multiple jurors or concentrated among a limited subset of jurors. The Topic 4 PRO and Topic 4 CON panels provide analogous attribution for Topic 4, including whether opposition appears sparsely or concentrates in particular segments. In this manner, the visualization 700 is configured to reveal both dominance and social loafing in a topic-specific manner, because a juror with a large stacked presence across many topic panels may be dominant, while a juror whose pattern rarely appears may exhibit minimal participation.

The visualization 700 further supports analysis of sharedness and distributed valence. Topic sharedness increases as more distinct juror patterns appear within a topic's PRO and CON panels across segments, and distributed valence increases as more distinct juror patterns appear within a given PRO panel or a given CON panel. This distinction supports a more nuanced understanding than simply identifying whether a side is supported, because the visualization 700 indicates whether support is broadly distributed across jurors or driven by one or two jurors.

Aggregated Argument Valence Measures

Figure 8:
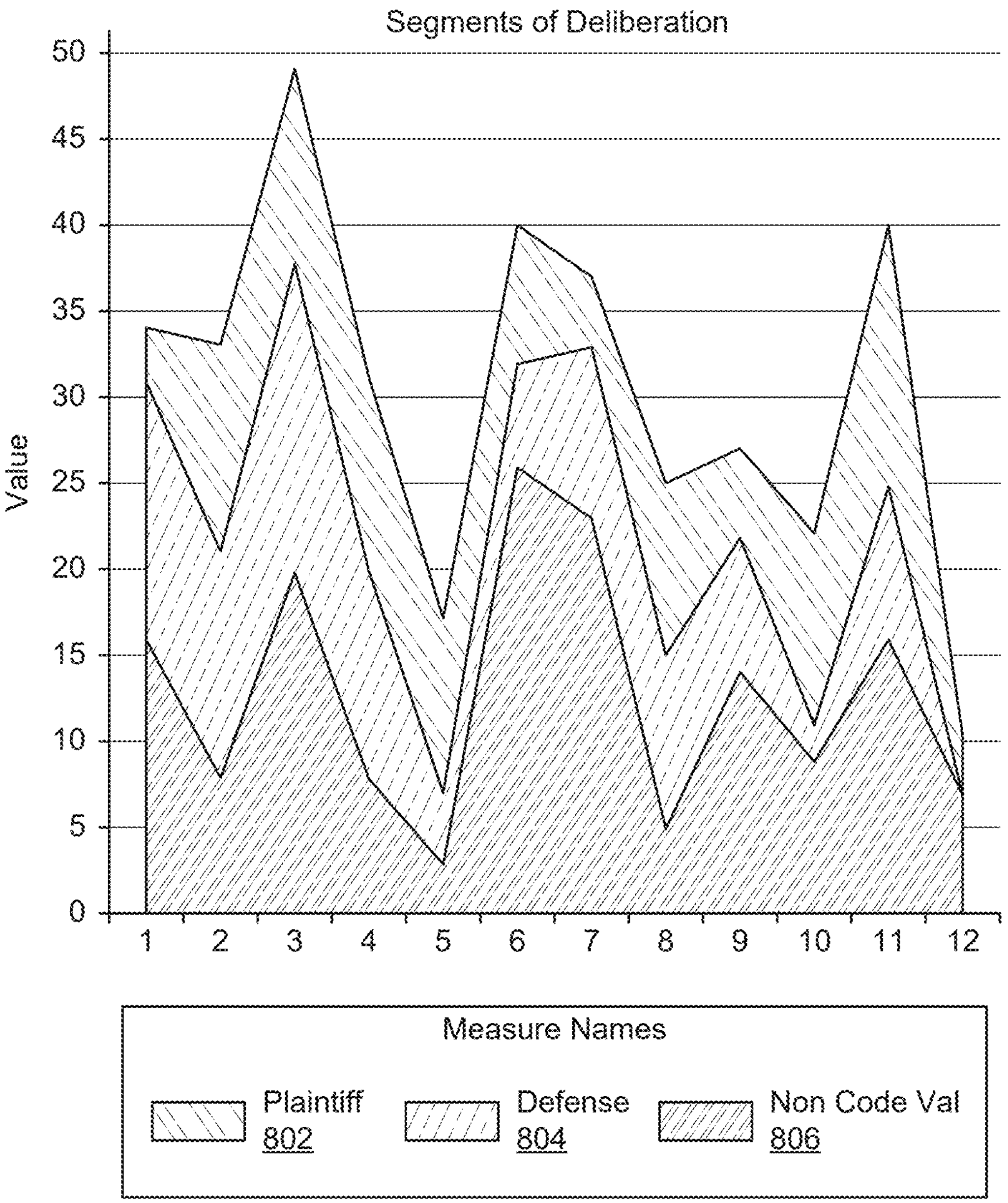
FIG. 8 illustrates a graphical representation depicting aggregated argument valence measures across segments of deliberation in a multi participant deliberative interaction, according to certain embodiments.

FIG. 8 illustrates a graphical representation 800 depicting aggregated argument valence measures across segments of deliberation in a multi participant deliberative interaction. FIG. 8 provides a cumulative visualization of argument-related measures derived from conversational turns segmented over time. The visualization is configured to present how different categories of valence-coded and non-coded conversational contributions accumulate and vary across discrete segments of a deliberation. FIG. 8 functions as a quantitative summary view derived from the argument valence framework and complements participant-level and stream-based visualizations by emphasizing cumulative group-level measures.

As illustrated in FIG. 8, the graphical representation 800 comprises a horizontal axis representing segments of deliberation. The horizontal axis is divided into twelve discrete segments numbered sequentially from 1 through 12. Each segment corresponds to a defined temporal interval within an overall deliberation period, consistent with the temporal segmentation methodology described throughout the disclosure. The segmentation enables aggregation of conversational turns occurring within each interval, thereby facilitating temporal comparison of deliberative activity across the full duration of an interaction.

FIG. 8 further comprises a vertical axis representing a value metric. The vertical axis quantifies aggregated counts of conversational turns assigned to different measure categories within each segment of deliberation. The value metric represents the cumulative magnitude of coded and non-coded turns rather than individual participant contributions. The vertical axis is scaled to accommodate peak aggregate values observed within the dataset, thereby enabling direct visual comparison of total conversational activity across segments.

The graphical representation 800 includes a stacked area visualization wherein multiple measure categories are aggregated and displayed concurrently within each segment. The stacked configuration enables simultaneous visualization of multiple categories of conversational turns and illustrates how different types of contributions collectively shape the deliberative process. Each stacked area corresponds to a distinct measure category defined in a legend positioned below the graph.

As shown in the legend of FIG. 8, the stacked areas represent plaintiff measure 802, defense measure 804, and non code valence measure 806. Plaintiff measure 802 corresponds to conversational turns coded as supporting a plaintiff side of a deliberation. In a jury deliberation context, plaintiff-supporting turns include statements favoring liability, damages, or other plaintiff-aligned propositions. Defense measure 804 corresponds to conversational turns coded as supporting a defense side of the deliberation. Defense-supporting turns include statements opposing liability or favoring a defendant-aligned position. Non code valence measure 806 corresponds to conversational turns that were not assigned a plaintiff or defense valence classification.

The inclusion of non code valence measure 806 directly reflects the disclosure observation that a significant number of conversational turns were not used in the argument valence analysis. These non-codable turns may include procedural statements, clarifying questions, expressions of uncertainty, social interactions, or other utterances that do not clearly support either side of the dichotomous argument structure. FIG. 8 visually demonstrates that non-coded turns constitute a substantial portion of deliberative interaction and therefore represent an important component of conversational flow even when excluded from valence-based influence modeling.

The stacked area configuration of FIG. 8 enables rapid visual assessment of cumulative group-level valence. By examining the relative areas of plaintiff measure 802 and defense measure 804 across segments, an observer can determine which side of the debate dominates at various points in time. The visualization thus provides a fingerprint-like representation of group interaction patterns, revealing how deliberative emphasis shifts across segments and how coded argument activity compares with uncoded conversational activity.

FIG. 8 further supports the disclosure's conclusion that data visualization provides a vivid method for capturing the turns and flow of debate. The aggregated visualization allows consultants, researchers, and analysts to view cumulative argument dynamics at a glance, revealing the direction in which the group is leaning and the relative intensity of engagement over time. The visualization also serves as a bridge between granular turn-level coding and higher-level interpretation of group behavior.

Aggregated Conversational Measures

Figure 9:
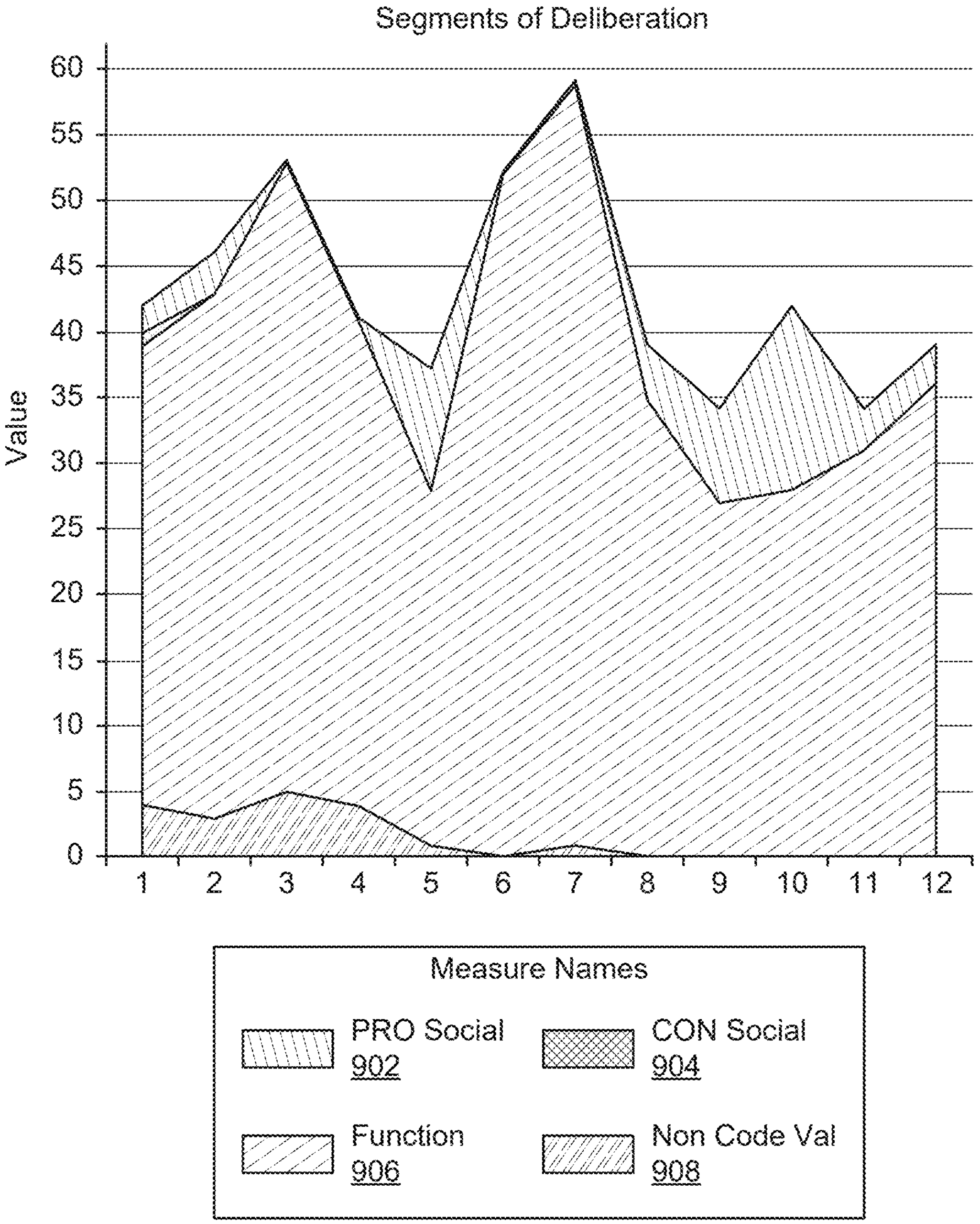
FIG. 9 illustrates a graphical representation depicting aggregated conversational measures across segments of deliberation with further differentiation among coded argument types, according to certain embodiments.

FIG. 9 illustrates a graphical representation 900 depicting aggregated conversational measures across segments of deliberation with further differentiation among coded argument types. FIG. 9 extends the cumulative visualization approach by separating argument-related measures into more granular functional and social categories while retaining representation of non-coded conversational activity. The visualization emphasizes the internal composition of deliberative discourse beyond simple plaintiff and defense polarity.

As illustrated in FIG. 9, the graphical representation 900 comprises a horizontal axis representing segments of deliberation divided into twelve sequential segments corresponding to uniform temporal intervals. The horizontal axis mirrors the segmentation employed in FIG. 8, thereby enabling direct comparison across visualizations. Each segment aggregates conversational turns occurring within a defined time window of the deliberation.

FIG. 9 further comprises a vertical axis representing an aggregated value metric. The vertical axis quantifies cumulative counts of conversational turns assigned to multiple coding categories within each segment. The value scale is configured to accommodate higher cumulative totals observed when multiple coding dimensions are considered simultaneously.

The stacked area visualization of FIG. 9 includes multiple measure categories, each represented by a distinct visual pattern as identified in the legend. As shown, the measure categories include pro social measure 902, con social measure 904, function measure 906, and non code valence measure 908.

Pro social measure 902 corresponds to conversational turns coded as socially supportive, cooperative, or relationship-maintaining contributions. Such turns may include agreement statements, affirmations, encouragement, or efforts to maintain group cohesion. Con social measure 904 corresponds to conversational turns coded as socially oppositional, confrontational, or disruptive. These may include interruptions, dismissive remarks, or socially negative interactions that influence group dynamics independently of argument content.

Function measure 906 corresponds to conversational turns serving procedural or functional roles within the deliberation. Functional turns may include agenda-setting statements, requests for clarification, instructions regarding process, or logistical coordination among participants. Non code valence measure 908 corresponds to conversational turns not assigned to a specific argument valence or social or functional category, consistent with the disclosure's identification of uncoded interaction segments.

The stacked visualization in FIG. 9 demonstrates that deliberative interactions comprise a complex mixture of argument content, social interaction, functional coordination, and uncodable conversational activity. The visualization enables observation of how these components vary over time and how non-argument contributions coexist with argument-related discourse.

Consistent with the disclosure, FIG. 9 highlights that a substantial number of turns were not used in the argument valence analysis. The visual prominence of non code valence measure 908 underscores the limitation of models that focus exclusively on valence-coded turns and supports the disclosure's conclusion that future studies should find methods to incorporate non-codable turns into broader analytical frameworks.

FIG. 9 further reinforces the metaphoric strength described in the disclosure. The flowing stacked areas resemble a sound wave, providing an implicit visual metaphor aligned with the auditory nature of conversational interaction. This metaphor enhances interpretability and appropriateness of the visualization format for analyzing spoken deliberations.

Figure 10:
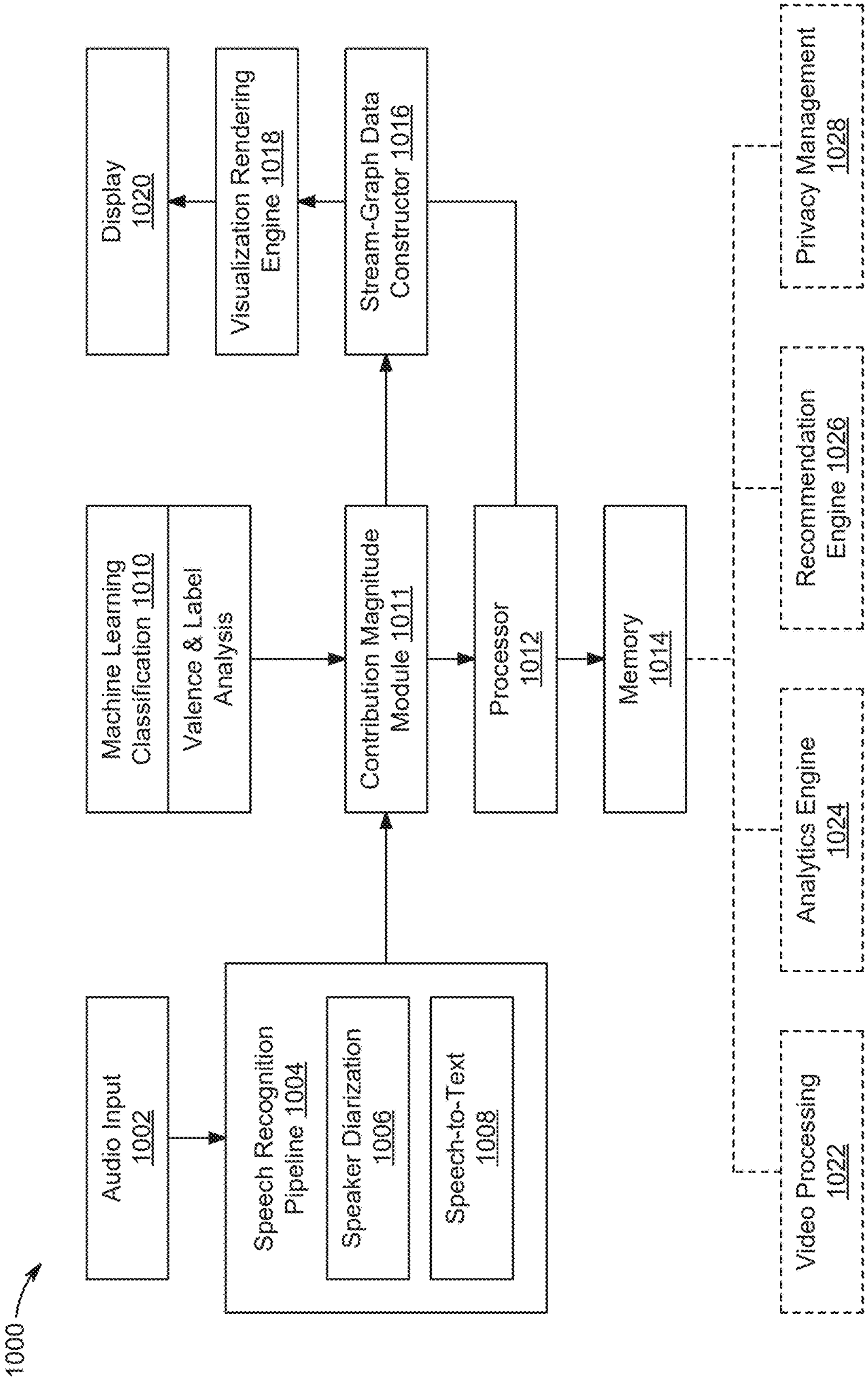
FIG. 10 illustrates an exemplary block diagram of a system for generating bidirectional stream-graph visualizations of multi-participant deliberative interactions, according to certain embodiments.

Bidirectional Stream-Graph Visualizations of Multi-Participant Deliberative Interactions FIG. 10 illustrates an exemplary block diagram of a system 1000 for generating bidirectional stream-graph visualizations of multi-participant deliberative interactions. The system 1000, also referred to as a deliberative interaction visualization system, provides an end-to-end computational architecture configured to transform raw conversational audio into structured, time-indexed visual representations that reveal participant-specific contribution patterns, argument valence dynamics, and deliberative evolution. As illustrated, the system 1000 comprises a plurality of interconnected functional components that operate in a coordinated sequence, where outputs of upstream components serve as inputs to downstream components to enable systematic analysis and visualization of conversational dynamics.

In this context, a deliberative interaction refers to a structured or semi-structured conversation in which multiple participants articulate, contest, or refine positions on issues having opposing viewpoints, such as jury deliberations, committee meetings, arbitration sessions, medical consultations, or legal proceedings. A bidirectional stream-graph visualization refers to a graphical representation in which participant-specific area bands are rendered above and below a central reference line based on argument valence, with band thickness varying proportionally over time according to computed contribution magnitude.

The system 1000 includes an audio input 1002 configured to receive audio data associated with a multi-participant conversation. The audio input 1002 functions as an interface for capturing spoken communication from participants engaged in a deliberative exchange. Audio data refers to digitized representations of acoustic signals containing speech information. The audio input 1002 may be implemented using one or more microphones, microphone arrays, telecommunication interfaces, audio file readers, streaming audio receivers, or digital audio recording devices. In live interaction scenarios, the audio input 1002 may capture real-time speech using table-mounted or distributed microphones, whereas in retrospective analysis scenarios, the audio input 1002 may access pre-recorded audio files stored in standard formats. In exemplary implementations, the audio input 1002 includes analog-to-digital conversion circuitry, pre-amplification circuitry, and noise filtering circuitry, and may support single-channel or multi-channel recording to facilitate subsequent speaker separation.

The audio input 1002 is operably coupled to a speech recognition pipeline 1004. The speech recognition pipeline 1004 is configured to process incoming audio data and convert it into structured linguistic representations annotated with temporal and speaker information. The speech recognition pipeline 1004 implements a sequence of computational stages that transform raw audio signals into transcribed text suitable for downstream analysis. The pipeline may operate in batch mode, streaming mode, or a hybrid mode depending on latency and deployment requirements.

As illustrated, the speech recognition pipeline 1004 includes a speaker diarization component 1006 and a speech-to-text component 1008. The speaker diarization component 1006 is configured to segment the audio stream into speaker-specific segments and assign speaker identifiers to those segments. Speaker diarization refers to identifying who spoke when within a conversation. The speaker diarization component 1006 extracts acoustic features from the audio data and applies clustering or embedding-based techniques to group segments originating from the same speaker, producing time-stamped speaker-attributed speech segments. Speaker identifiers may be anonymous labels or linked to known participants when such information is available.

The speech-to-text component 1008 is configured to transcribe the content of the speaker-attributed audio segments into textual representations. The speech-to-text component 1008 applies acoustic models, language models, and decoding algorithms to convert audio signals into word sequences. The resulting transcripts may include word-level confidence scores and temporal alignments, enabling synchronization between textual content and original audio signals. The speech-to-text component 1008 thereby produces structured text data associated with both speaker identity and time.

The system 1000 further includes a machine learning classification module 1010 operably coupled to the speech recognition pipeline 1004. The machine learning classification module 1010 is configured to analyze textual representations generated by the speech-to-text component 1008 and to classify speech segments into a plurality of analytical categories. In one implementation, the machine learning classification module 1010 utilizes generative artificial intelligence models to perform natural language understanding tasks on the transcribed text. The classification module determines argument valence, such as whether a speech segment supports a plaintiff position, supports a defense position, or is neutral, and may further determine argument types, rhetorical functions, or engagement indicators. The machine learning classification module 1010 outputs classification labels and associated confidence values for each speech segment.

The system 1000 includes a contribution magnitude module 1011 operably coupled to the speech recognition pipeline 1004 and the machine learning classification module 1010. The contribution magnitude module 1011 is configured to compute quantitative measures representing the intensity or extent of each participant's contribution within defined temporal segments. Contribution magnitude refers to a numerical value capturing degree of participation, which may be derived from metrics including speech duration, turn frequency, word count, intensity measures, or weighted combinations thereof. The contribution magnitude module 1011 aggregates temporal data from the speaker diarization component 1006 with classification outputs from the machine learning classification module 1010 to compute magnitude values for each participant, for each time segment, and for each valence category.

Output from the contribution magnitude module 1011 is provided to a stream-graph data constructor 1016. The stream-graph data constructor 1016 functions as a temporal segmentation and mapping module that organizes contribution magnitude data into a structured representation suitable for bidirectional visualization. The stream-graph data constructor 1016 assigns contribution magnitudes to discrete time segments, associates each magnitude with a participant identifier and a valence category, and allocates magnitudes to upper or lower regions relative to a central reference line based on valence. The stream-graph data constructor 1016 further computes spatial parameters, including vertical positions and stacked heights for participant-specific area bands, and may apply smoothing or interpolation techniques to ensure visual continuity across segments.

The stream-graph data constructor 1016 is operably coupled to a visualization rendering engine 1018. The visualization rendering engine 1018 is configured to generate graphical representations from the structured stream-graph data. The visualization rendering engine 1018 translates abstract data structures into rendered visual elements, including area bands, axes, labels, legends, and reference lines. Rendering operations may include drawing paths for area boundaries, applying visual attributes such as color or pattern, and placing textual annotations. The visualization rendering engine 1018 may further support interactive operations, including zooming, panning, filtering, and participant or topic highlighting.

Rendered visualizations produced by the visualization rendering engine 1018 are transmitted to a display 1020. The display 1020 is configured to present the generated visualizations to users for review and analysis. The display 1020 may comprise any suitable display device, including desktop monitors, large-format displays, projection systems, or mobile devices, and may support touch or pointer-based interaction.

The system 1000 is implemented using computing resources including a processor 1012 and a memory 1014. The processor 1012 is configured to execute instructions that implement the speech recognition pipeline 1004, the machine learning classification module 1010, the contribution magnitude module 1011, the stream-graph data constructor 1016, and the visualization rendering engine 1018. The memory 1014 stores executable instructions, intermediate data structures, trained model parameters, and visualization outputs. The processor 1012 and memory 1014 may be implemented using one or more general-purpose processors, specialized accelerators, or distributed computing resources.

As further illustrated, the system 1000 may include optional modules executed by the processor 1012 or stored in the memory 1014. The optional modules include a video processing module configured to extract non-verbal cues from video data, an analytics engine 1024 configured to compute derived metrics such as dominance and influence, a recommendation engine 1026 configured to generate guidance based on detected interaction patterns, and a privacy management module 1028 configured to enforce anonymization, aggregation, or access control policies.

Contribution Magnitude Determination and Normalization Architecture

Figure 11:
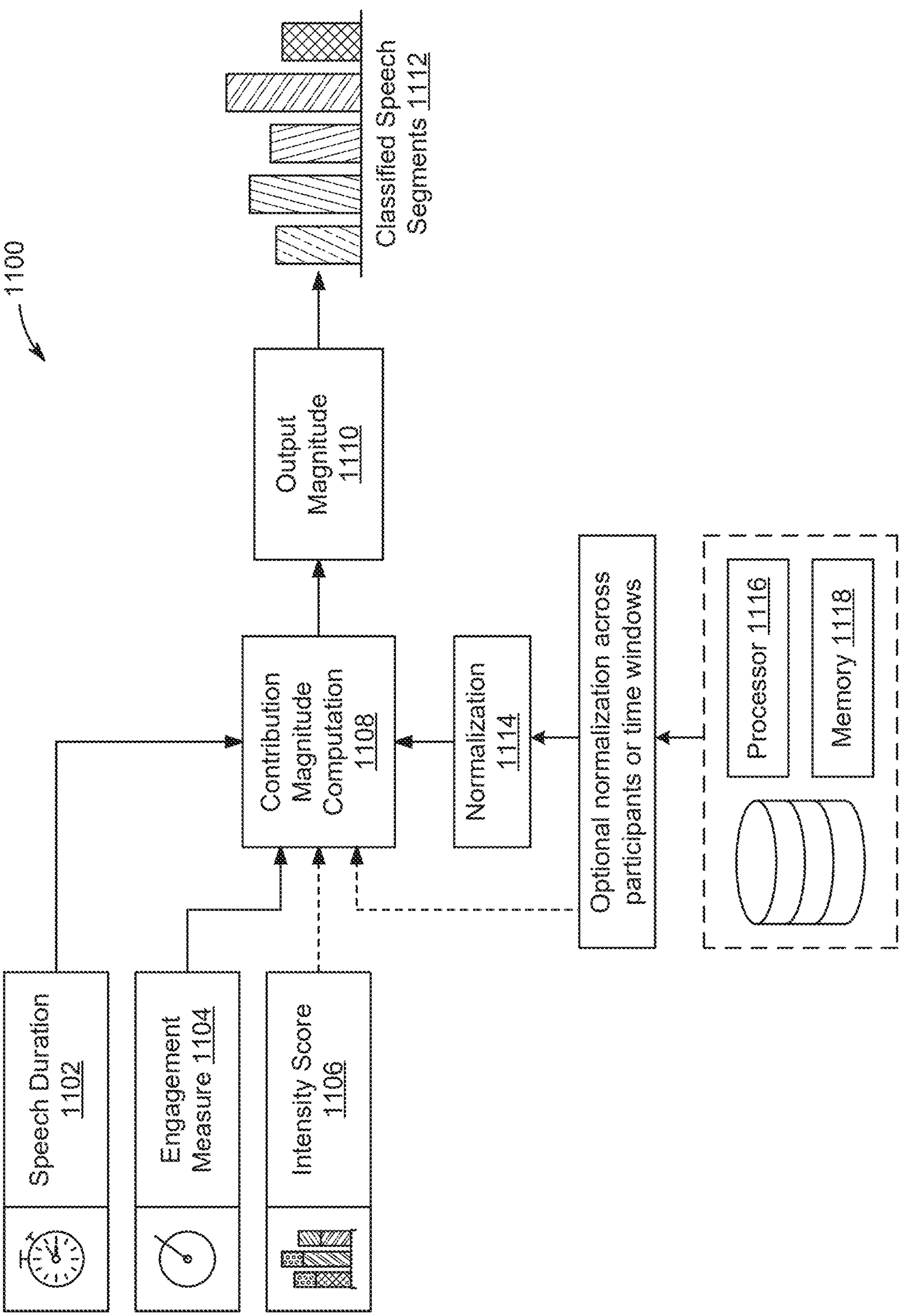
FIG. 11 illustrates an exemplary contribution magnitude determination and normalization architecture, according to certain embodiments.

FIG. 11 illustrates an exemplary contribution magnitude determination and normalization architecture 1100. The contribution magnitude determination and normalization architecture 1100 is configured to compute quantitative contribution values associated with classified speech segments 1112 generated during a multi-participant interaction. The architecture 1100 provides a formal and explicit depiction of how contribution magnitude is derived from multiple measurable inputs, how such magnitude may be normalized, and how the resulting quantitative values are produced for downstream visualization and rendering operations, including proportional band thickness rendering as illustrated in FIG. 5.

The contribution magnitude determination and normalization architecture 1100 is implemented as part of a processing pipeline executed by the system 108 described with reference to FIG. 2. The architecture 1100 operates on classified speech segments 1112 generated by a classification module and a temporal segmentation and mapping module described with reference to FIG. 3. Each classified speech segment 1112 corresponds to a discrete portion of a participant's conversational contribution that has been temporally bounded and assigned one or more classification labels prior to contribution magnitude computation.

As illustrated in FIG. 11, the architecture 1100 is configured to receive multiple quantitative input measures associated with participant speech activity. These input measures include speech duration 1102, engagement measure 1104, and intensity score 1106. Each input measure represents a distinct and independently derived quantitative characteristic of a speech contribution.

Speech duration 1102 represents a temporal measure corresponding to a length of time during which a participant produces a speech contribution within a defined conversational turn or temporal segment. Speech duration 1102 is derived from audio signal processing performed by speech recognition components of the system of FIG. 2. In exemplary implementations, speech duration 1102 may be measured in seconds, milliseconds, frame counts, or other time-based units computed from detected speech onset and offset boundaries. Speech duration 1102 provides a direct measure of how long a participant speaks during a particular classified segment.

Engagement measure 1104 represents a quantitative indicator of participant engagement associated with a classified speech segment 1112. Engagement measure 1104 captures interaction-level characteristics beyond raw speaking time. Engagement measure 1104 may be derived from one or more metrics including turn frequency, overlap participation, interruption behavior, response latency, conversational adjacency, or interaction centrality within a deliberative exchange. Engagement measure 1104 may be computed by aggregating interaction features extracted during temporal segmentation and mapping operations described with reference to FIG. 3. Engagement measure 1104 provides an indication of how actively a participant participates in the interaction structure.

Intensity score 1106 represents a quantitative measure of expressive intensity associated with a classified speech segment 1112. Intensity score 1106 is derived from acoustic features extracted from audio data and may further incorporate nonverbal cues when available. Acoustic features contributing to intensity score 1106 may include amplitude, pitch variation, spectral energy distribution, rate of speech, or prosodic emphasis. Where image data is available, intensity score 1106 may further incorporate visual indicators such as facial expression intensity or gesture amplitude processed by image analysis components of the system of FIG. 2. Intensity score 1106 reflects how forcefully or emphatically a participant delivers a contribution.

The speech duration 1102, engagement measure 1104, and intensity score 1106 are each provided as separate inputs to a contribution magnitude computation module 1108. The contribution magnitude computation module 1108 is configured to compute a composite contribution magnitude value for each classified speech segment 1112 by applying one or more mathematical operations to the received input measures. In exemplary embodiments, the contribution magnitude computation module 1108 computes a weighted combination of speech duration 1102, engagement measure 1104, and intensity score 1106. Weighting coefficients applied within the computation may be predefined, configurable, learned, or dynamically adjusted based on system parameters.

The contribution magnitude computation module 1108 outputs an output magnitude value 1110. The output magnitude value 1110 represents a quantitative contribution magnitude associated with a specific classified speech segment 1112. The output magnitude value 1110 serves as a numerical representation of the relative contribution of a participant within a defined temporal segment. The output magnitude value 1110 is used by visualization generation components to determine proportional visual thickness of participant-specific stream areas in bidirectional stream-graph visualizations as illustrated in FIG. 5.

FIG. 11 further illustrates an optional normalization module 1114 positioned in the contribution processing pipeline. The normalization module 1114 is configured to normalize computed contribution magnitude values prior to output. Normalization may be applied across participants, across time windows, or across both participants and time windows. The normalization module 1114 ensures that contribution magnitudes are rendered on a consistent comparative scale despite differences in speaking styles, participation rates, or interaction duration.

In one exemplary configuration, normalization across participants adjusts contribution magnitude values so that each participant's contributions are scaled relative to a participant-specific baseline. In another configuration, normalization across time windows adjusts contribution magnitude values relative to aggregate activity within a defined temporal interval. In further configurations, normalization may be selectively applied or bypassed based on system settings, analytical objectives, or privacy requirements.

FIG. 11 further depicts that the contribution magnitude determination and normalization architecture 1100 is implemented using computing resources comprising a processor 1116 and a memory 1118. The processor 1116 executes instructions stored in the memory 1118 to perform contribution magnitude computation, normalization, and output generation. The memory 1118 stores intermediate values, weighting parameters, normalization parameters, and output magnitude values for subsequent use by visualization rendering modules described with reference to FIG. 2.

Privacy Management Protocols and Visualization

Figures 12A, 12B, 12C:
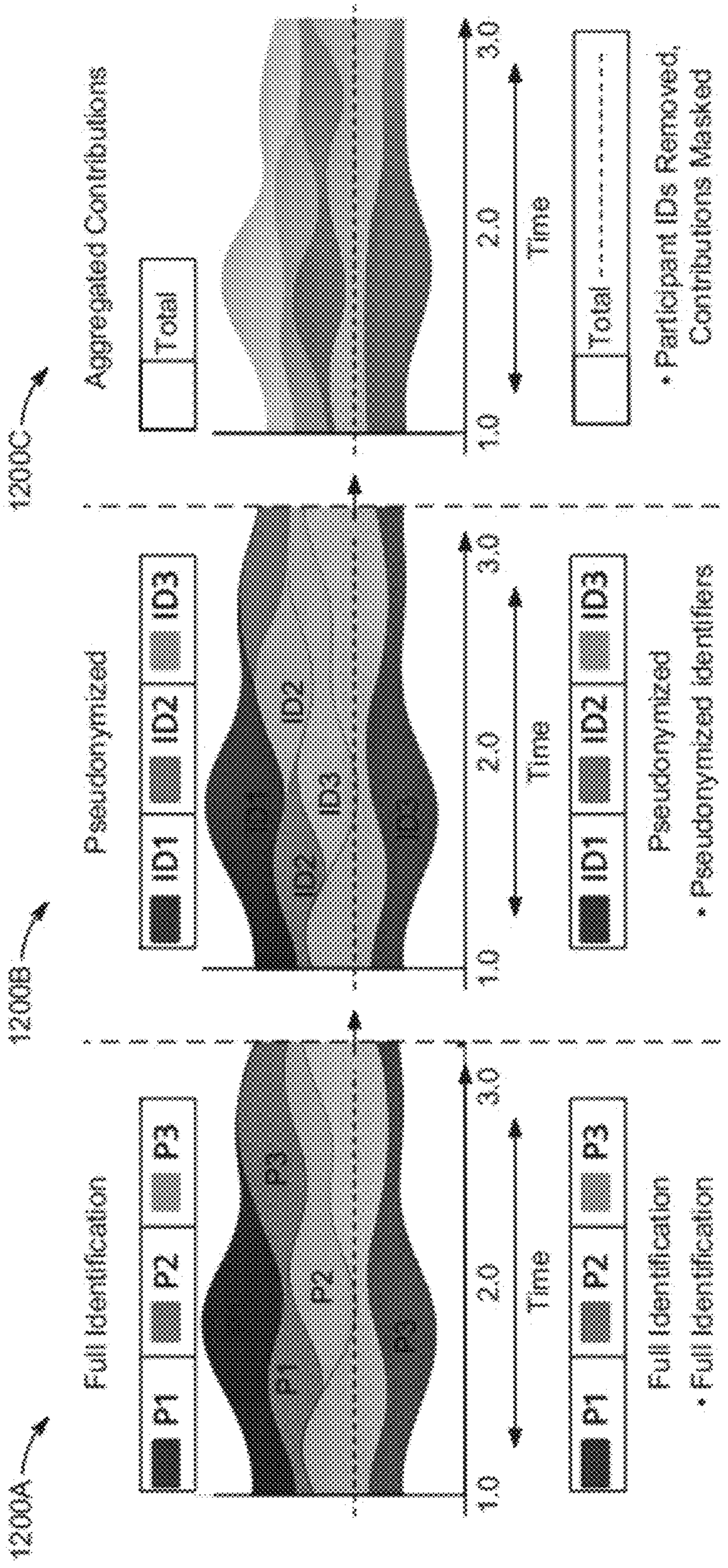
FIG. 12A illustrates a full identification visualization, according to certain embodiments.
FIG. 12B illustrates a pseudonymized visualization, according to certain embodiments.
FIG. 12C illustrates an aggregated contributions visualization, according to certain embodiments.

FIG. 12A-FIG. 12C illustrate exemplary privacy management protocols and visualization variants applied to bidirectional stream-graph visualizations generated by the system. FIG. 12A-FIG. 12C demonstrate how privacy logic is enforced at a visualization output stage to produce alternative visual representations corresponding to different privacy configurations while preserving underlying analytical structure.

FIG. 12A-FIG. 12C comprise three distinct visualization variants generated from a same underlying stream-graph data structure described with reference to FIG. 3. Each visualization variant is rendered using contribution magnitude values computed by the contribution magnitude determination and normalization architecture described with reference to FIG. 11.

FIG. 12A illustrates a full identification visualization 1200A. In the full identification visualization 1200A, participant identifiers are fully displayed within the bidirectional stream-graph visualization. Participants are labeled using identifiers P1, P2, and P3, each corresponding to a distinct participant in the interaction. Each participant-specific stream area is rendered with proportional thickness based on contribution magnitude and is directly associated with a visible participant identifier. The full identification visualization 1200A enables complete attribution of contributions to individual participants and is suitable for analytical environments where participant identification is permitted.

FIG. 12B illustrates a pseudonymized visualization 1200B. In the pseudonymized visualization 1200B, participant identifiers are replaced with pseudonymized identifiers ID1, ID2, and ID3. The underlying stream-graph geometry, contribution magnitudes, temporal segmentation, and bidirectional positioning remain unchanged relative to the full identification visualization 1200A. Only the representation of participant identity is modified. The pseudonymized visualization 1200B enables analysis of interaction dynamics while reducing exposure of personally identifiable information.

FIG. 12C illustrates an aggregated contributions visualization 1200C. In the aggregated contributions visualization 1200C, individual participant identifiers are removed entirely. Participant-specific stream areas are aggregated into a single combined stream labeled Total. The aggregated stream represents cumulative contribution magnitude across all participants for each temporal segment. Individual attribution is masked, and only overall interaction dynamics are displayed. The aggregated contributions visualization 1200C is suitable for high-privacy contexts where individual-level disclosure is not permitted.

The privacy management protocols illustrated in FIG. 12A-FIG. 12C are applied by a privacy management module described with reference to FIG. 3. The privacy management module controls whether full identification, pseudonymization, or aggregation is applied prior to rendering. The module may operate based on predefined privacy policies, user selection, regulatory requirements, or contextual sensitivity associated with a particular interaction domain.

Across FIGS. 12A, 12B, and 12C, the horizontal axis represents time, and the vertical displacement of stream areas represents contribution magnitude as computed by the architecture of FIG. 11. The visual structure of the stream-graph remains consistent across privacy variants, thereby preserving analytical integrity while enforcing privacy constraints.

Computer System

Figure 13:
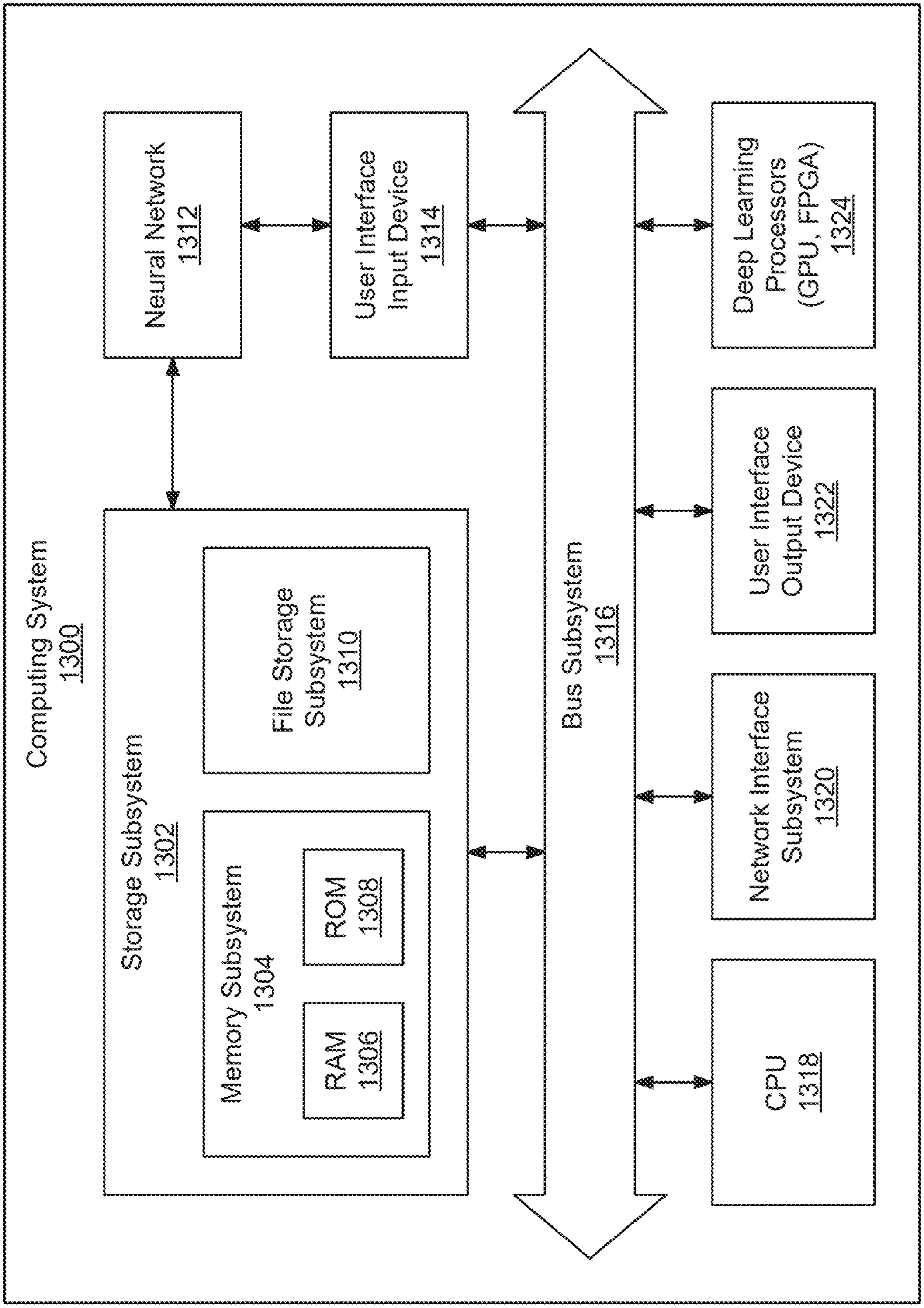
FIG. 13 illustrates an example configuration of a computing device that can be used to implement the systems and techniques described herein

FIG. 13 shows an example computer system 1300 that can be used to implement the technology disclosed. The computer system 1300 is a representation of the system 108, as described in FIG. 1. The computer system 1300 includes at least one central processing unit (CPU) 1318 that communicates with a number of peripheral devices via bus subsystem 1316. These peripheral devices can include a storage subsystem 1302 including, for example, memory devices and a file storage subsystem 1310, user interface input devices 1314, user interface output devices 1322, and a network interface subsystem 1320. The input and output devices allow user interaction with computer system 1300. Network interface subsystem 1320 provides an interface to outside networks, including an interface to corresponding interface devices in other computer systems.

In one implementation, a neural network 1312 is communicably linked to the storage subsystem 1302 and the user interface input devices 1314.

User interface input devices 1314 can include a keyboard; pointing devices such as a mouse, trackball, touchpad, or graphics tablet; a scanner; a touch screen incorporated into the display; audio input devices such as voice recognition systems and microphones; and other types of input devices. In general, use of the term "input device" is intended to include all possible types of devices and ways to input information into computer system 1300.

User interface output devices 1322 can include a display subsystem, a printer, a fax machine, or non-visual displays such as audio output devices. The display subsystem can include an LED display, a cathode ray tube (CRT), a flat-panel device such as a liquid crystal display (LCD), a projection device, or some other mechanism for creating a visible image. The display subsystem can also provide a non-visual display such as audio output devices. In general, use of the term "output device" is intended to include all possible types of devices and ways to output information from computer system 1300 to the user or to another machine or computer system.

Storage subsystem 1302 stores programming and data constructs that provide the functionality of some or all of the modules and methods described herein. These software modules are generally executed by deep learning processors 1324.

Deep learning processors 1324 can be graphics processing units (GPUs), field-programmable gate arrays (FPGAs), application-specific integrated circuits (ASICs), and/or coarse-grained reconfigurable architectures (CGRAs). Processors 1324 can be hosted by a deep learning cloud platform such as Google Cloud Platform™, Xilinx™, and Cirrascale™ Examples of processors 1324 include Google's Tensor Processing Unit (TPU)™, rackmount solutions like GX4 Rackmount Series™, GX6 Rackmount Series™, NVIDIA DGX-1™, Microsoft's Stratix V FPGA™, Graphcore's Intelligent Processor Unit (IPU)™, Qualcomm's Zeroth Platform™ with Snapdragon Processors™, NVIDIA's Volta™, NVIDIA's DRIVE PX™, NVIDIA's JETSON TX1/TX2 MODULE™, Intel's Nirvana™, Movidius VPU™, Fujitsu DPI™, ARM's DynamicIQ™, IBM TrueNorth™, Lambda GPU Server with Testa V100s™, and others.

Memory subsystem 1304 used in the storage subsystem 1302 can include a number of memories including a main random-access memory (RAM) 1306 for storage of instructions and data during program execution and a read only memory (ROM) 1308 in which fixed instructions are stored. A file storage subsystem 1310 can provide persistent storage for program and data files, and can include a hard disk drive, a floppy disk drive along with associated removable media, a CD-ROM drive, an optical drive, or removable media cartridges. The modules implementing the functionality of certain implementations can be stored by file storage subsystem 1310 in the storage subsystem 1302, or in other machines accessible by the processor.

Bus subsystem 1316 provides a mechanism for letting the various components and subsystems of computer system 1300 communicate with each other as intended. Although bus subsystem 1316 is shown schematically as a single bus, alternative implementations of the bus subsystem can use multiple buses.

Computer system 1300 itself can be of varying types including a personal computer, a portable computer, a workstation, a computer terminal, a network computer, a television, a mainframe, a server farm, a widely distributed set of loosely networked computers, or any other data processing system or user device. Due to the ever-changing nature of computers and networks, the description of computer system 1300 depicted in FIG. 13 is intended only as a specific example for the purpose of illustrating the preferred implementations of the present technology disclosed. Many other configurations of computer system 1300 are possible having more or fewer components than the computer system depicted in FIG. 13.

In various implementations, a learning system is provided. In some implementations, a feature vector is provided to a learning system. Based on the input features, the learning system generates one or more outputs. In some implementations, the output of the learning system is a feature vector. In some implementations, the learning system comprises an SVM. In other implementations, the learning system comprises an artificial neural network. In some implementations, the learning system is pre-trained using training data. In some implementations training data is retrospective data. In some implementations, the retrospective data is stored in a data store. In some implementations, the learning system may be additionally trained through manual curation of previously generated outputs.

In some implementations, an object detection pipeline is a trained classifier. In some implementations, the trained classifier is a random decision forest. However, it will be appreciated that a variety of other classifiers are suitable for use according to the present disclosure, including linear classifiers, support vector machines (SVM), or neural networks such as recurrent neural networks (RNN).

Suitable artificial neural networks include but are not limited to a feedforward neural network, a radial basis function network, a self-organizing map, learning vector quantization, a recurrent neural network, a Hopfield network, a Boltzmann machine, an echo state network, long short term memory, a bi-directional recurrent neural network, a hierarchical recurrent neural network, a stochastic neural network, a modular neural network, an associative neural network, a deep neural network, a deep belief network, a convolutional neural networks, a convolutional deep belief network, a large memory storage and retrieval neural network, a deep Boltzmann machine, a deep stacking network, a tensor deep stacking network, a spike and slab restricted Boltzmann machine, a compound hierarchical-deep model, a deep coding network, a multilayer kernel machine, or a deep Q-network.

The present disclosure may be embodied as a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer system/server may be described in the general context of computer system-executable instructions, such as program modules, being executed by a computer system. Generally, program modules may include routines, programs, objects, components, logic, data structures, and so on that perform particular tasks or implement particular abstract data types. Computer system/server may be practiced in distributed computing environments where tasks are performed by remote processing devices that are linked through a communications network. In a distributed computing environment, program modules may be located in both local and remote computer system storage media including memory storage devices.

As shown in FIG. 13, computer system/server in computing node is shown in the form of a general-purpose computing device. The components of computer system/server may include, but are not limited to, one or more processors or processing units, a system memory, and a bus that couples various system components including system memory to processor.

The bus represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, Peripheral Component Interconnect (PCI) bus, Peripheral Component Interconnect Express (PCIe), and Advanced Microcontroller Bus Architecture (AMBA).

Computer system/server typically includes a variety of computer system readable media. Such media may be any available media that is accessible by computer system/server, and it includes both volatile and non-volatile media, removable and non-removable media.

System memory can include computer system readable media in the form of volatile memory, such as random access memory (RAM) and/or cache memory. Algorithm Computer system/server may further include other removable/non-removable, volatile/non-volatile computer system storage media. By way of example only, storage system can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to the bus by one or more data media interfaces. As will be further depicted and described below, memory may include at least one program product having a set (e.g., at least one) of program modules that are configured to carry out the functions of embodiments of the disclosure.

Program/utility, having a set (at least one) of program modules, may be stored in memory by way of example, and not limitation, as well as an operating system, one or more application programs, other program modules, and program data. Each of the operating system, one or more application programs, other program modules, and program data or some combination thereof, may include an implementation of a networking environment. Program modules generally carry out the functions and/or methodologies of embodiments as described herein.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some implementations, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to implementations of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various implementations of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Machine Learning Techniques

Some implementations of the technology disclosed relate to using a Transformer model to provide an AI system. In particular, the technology disclosed proposes an AI management system based on the Transformer architecture. The Transformer model relies on a self-attention mechanism to compute a series of context-informed vector-space representations of elements in the input sequence and the output sequence, which are then used to predict distributions over subsequent elements as the model predicts the output sequence element-by-element. Not only is this mechanism straightforward to parallelize, but as each input's representation is also directly informed by all other inputs' representations, this results in an effectively global receptive field across the whole input sequence. This stands in contrast to, e.g., convolutional architectures which typically only have a limited receptive field.

In one implementation, the disclosed AI system is a multilayer perceptron (MLP). In another implementation, the disclosed AI system is a feedforward neural network. In yet another implementation, the disclosed AI system is a fully connected neural network. In a further implementation, the disclosed AI system is a fully convolution neural network. In a yet further implementation, the disclosed AI system is a semantic segmentation neural network. In a yet another further implementation, the disclosed AI system is a generative adversarial network (GAN) (e.g., CycleGAN, StyleGAN, pixelRNN, text-2-image, DiscoGAN, IsGAN). In a yet another implementation, the disclosed AI system includes self-attention mechanisms like Transformer, Vision Transformer (ViT), Bidirectional Transformer (BERT), Detection Transformer (DETR), Deformable DETR, UP-DETR, DeiT, Swin, GPT, iGPT, GPT-2, GPT-3, various ChatGPT versions, various LLAMA versions, BERT, SpanBERT, ROBERTa, XLNet, ELECTRA, UniLM, BART, T5, ERNIE (THU), KnowBERT, DeiT-Ti, DeiT-S, DeiT-B, T2T-ViT-14, T2T-VIT-19, T2T-VIT-24, PVT-Small, PVT-Medium, PVT-Large, TNT-S, TNT-B, CPVT-S, CPVT-S-GAP, CPVT-B, Swin-T, Swin-S, Swin-B, Twins-SVT-S, Twins-SVT-B, Twins-SVT-L, Shuffle-T, Shuffle-S, Shuffle-B, XCiT-S12/16, CMT-S, CMT-B, VOLO-D1, VOLO-D2, VOLO-D3, VOLO-D4, MoCo v3, ACT, TSP, Max-DeepLab, VisTR, SETR, Hand-Transformer, HOT-Net, METRO, Image Transformer, Taming transformer, TransGAN, IPT, TTSR, STTN, Masked Transformer, CLIP, DALL-E, Cogview, UniT, ASH, TinyBert, FullyQT, ConvBert, FCOS, Faster R-CNN+FPN, DETR-DC5, TSP-FCOS, TSP-RCNN, ACT+MKDD (L=32), ACT+MKDD (L=16), SMCA, Efficient DETR, UP-DETR, UP-DETR, VITB/16-FRCNN, VIT-B/16-FRCNN, PVT-Small+RetinaNet, Swin-T+RetinaNet, Swin-T+ATSS, PVT-Small+DETR, TNT-S+DETR, YOLOS-Ti, YOLOS-S, and YOLOS-B.

In one implementation, the disclosed AI system is a convolution neural network (CNN) with a plurality of convolution layers. In another implementation, the disclosed AI system is a recurrent neural network (RNN) such as a long short-term memory network (LSTM), bi-directional LSTM (Bi-LSTM), or a gated recurrent unit (GRU). In yet another implementation, the disclosed AI system includes both a CNN and an RNN.

In yet other implementations, the disclosed AI system can use 1D convolutions, 2D convolutions, 3D convolutions, 4D convolutions, 5D convolutions, dilated or atrous convolutions, transpose convolutions, depthwise separable convolutions, pointwise convolutions, 1×1 convolutions, group convolutions, flattened convolutions, spatial and cross-channel convolutions, shuffled grouped convolutions, spatial separable convolutions, and deconvolutions. The disclosed AI system can use one or more loss functions such as logistic regression/log loss, multi-class cross-entropy/softmax loss, binary cross-entropy loss, mean-squared error loss, L1 loss, L2 loss, smooth L1 loss, and Huber loss. The disclosed AI system can use any parallelism, efficiency, and compression schemes such TFRecords, compressed encoding (e.g., PNG), sharding, parallel calls for map transformation, batching, prefetching, model parallelism, data parallelism, and synchronous/asynchronous stochastic gradient descent (SGD). The disclosed AI system can include upsampling layers, downsampling layers, recurrent connections, gates and gated memory units (like an LSTM or GRU), residual blocks, residual connections, highway connections, skip connections, peephole connections, activation functions (e.g., non-linear transformation functions like rectifying linear unit (ReLU), leaky ReLU, exponential liner unit (ELU), sigmoid and hyperbolic tangent (tanh)), batch normalization layers, regularization layers, dropout, pooling layers (e.g., max or average pooling), global average pooling layers, and attention mechanisms.

The disclosed AI system can be a linear regression model, a logistic regression model, an Elastic Net model, a support vector machine (SVM), a random forest (RF), a decision tree, and a boosted decision tree (e.g., XGBoost), or some other tree-based logic (e.g., metric trees, kd-trees, R-trees, universal B-trees, X-trees, ball trees, locality sensitive hashes, and inverted indexes). The disclosed AI system can be an ensemble of multiple models, in some implementations.

In some implementations, the disclosed AI system can be trained using backpropagation-based gradient update techniques. Example gradient descent techniques that can be used for training the disclosed AI system include stochastic gradient descent, batch gradient descent, and mini-batch gradient descent. Some examples of gradient descent optimization algorithms that can be used to train the disclosed AI system are Momentum, Nesterov accelerated gradient, Adagrad, Adadelta, RMSprop, Adam, AdaMax, Nadam, and AMSGrad.

Transformer Logic

Machine learning is the use and development of computer systems that can learn and adapt without following explicit instructions, by using algorithms and statistical models to analyze and draw inferences from patterns in data. Some of the state-of-the-art models use Transformers, a more powerful and faster model than neural networks alone. Transformers originate from the field of natural language processing (NLP), but can be used in computer vision and many other fields. Neural networks process input in series and weight relationships by distance in the series. Transformers can process input in parallel and do not necessarily weigh by distance. For example, in natural language processing, neural networks process a sentence from beginning to end with the weights of words close to each other being higher than those further apart. This leaves the end of the sentence very disconnected from the beginning causing an effect called the vanishing gradient problem. Transformers look at each word in parallel and determine weights for the relationships to each of the other words in the sentence. These relationships are called hidden states because they are later condensed for use into one vector called the context vector. Transformers can be used in addition to neural networks. This architecture is described here.

Encoder-Decoder Architecture

Figure 14:
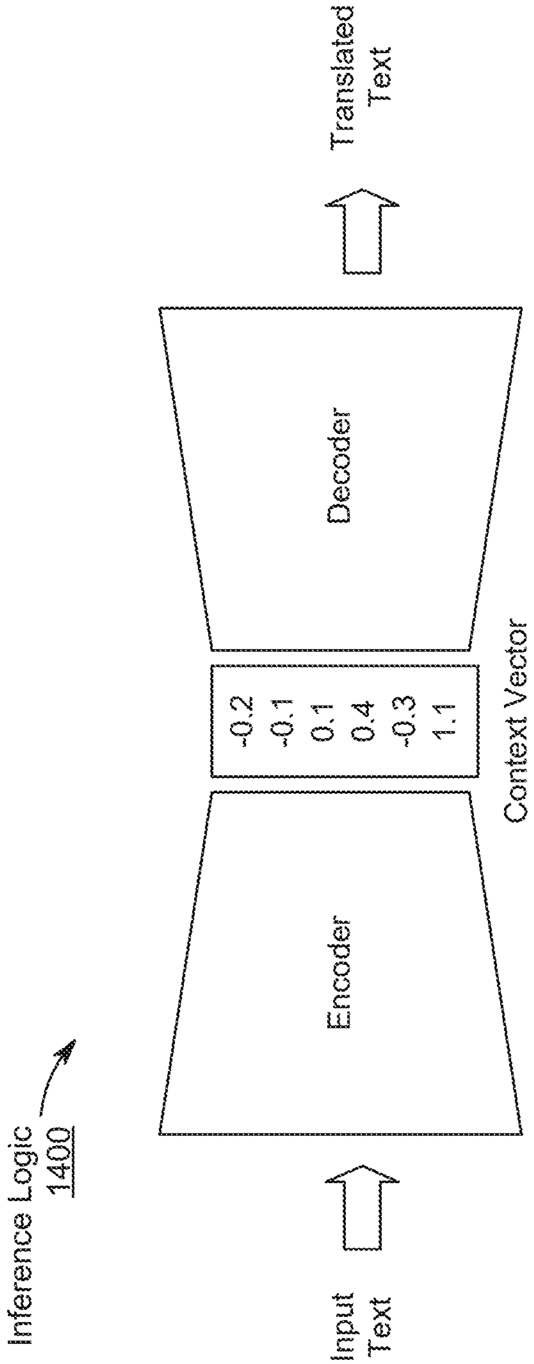
FIG. 14 is a schematic representation of an encoder-decoder architecture.

FIG. 14 is a schematic representation of an encoder-decoder architecture. This architecture is often used for NLP and has two main building blocks. The first building block is the encoder that encodes an input into a fixed-size vector. In the system we describe here, the encoder is based on a recurrent neural network (RNN). At each time step, t, a hidden state of time step, t-1, is combined with the input value at time step t to compute the hidden state at timestep t. The hidden state at the last time step, encoded in a context vector, contains relationships encoded at all previous time steps. For NLP, each step corresponds to a word. Then the context vector contains information about the grammar and the sentence structure. The context vector can be considered a low-dimensional representation of the entire input space. For NLP, the input space is a sentence, and a training set consists of many sentences.

The context vector is then passed to the second building block, the decoder. For translation, the decoder has been trained on a second language. Conditioned on the input context vector, the decoder generates an output sequence. At each time step, t, the decoder is fed the hidden state of time step, t-1, and the output generated at time step, t-1. The first hidden state in the decoder is the context vector, generated by the encoder. The context vector is used by the decoder to perform the translation.

The whole model is optimized end-to-end by using backpropagation, a method of training a neural network in which the initial system output is compared to the desired output and the system is adjusted until the difference is minimized. In backpropagation, the encoder is trained to extract the right information from the input sequence, the decoder is trained to capture the grammar and vocabulary of the output language. This results in a fluent model that uses context and generalizes well. When training an encoder-decoder model, the real output sequence is used to train the model to prevent mistakes from stacking. When testing the model, the previously predicted output value is used to predict the next one.

When performing a translation task using the encoder-decoder architecture, all information about the input sequence is forced into one vector, the context vector. Information connecting the beginning of the sentence with the end is lost, the vanishing gradient problem. Also, different parts of the input sequence are important for different parts of the output sequence, information that cannot be learned using only RNNs in an encoder-decoder architecture.

Attention Mechanism

Figure 15:
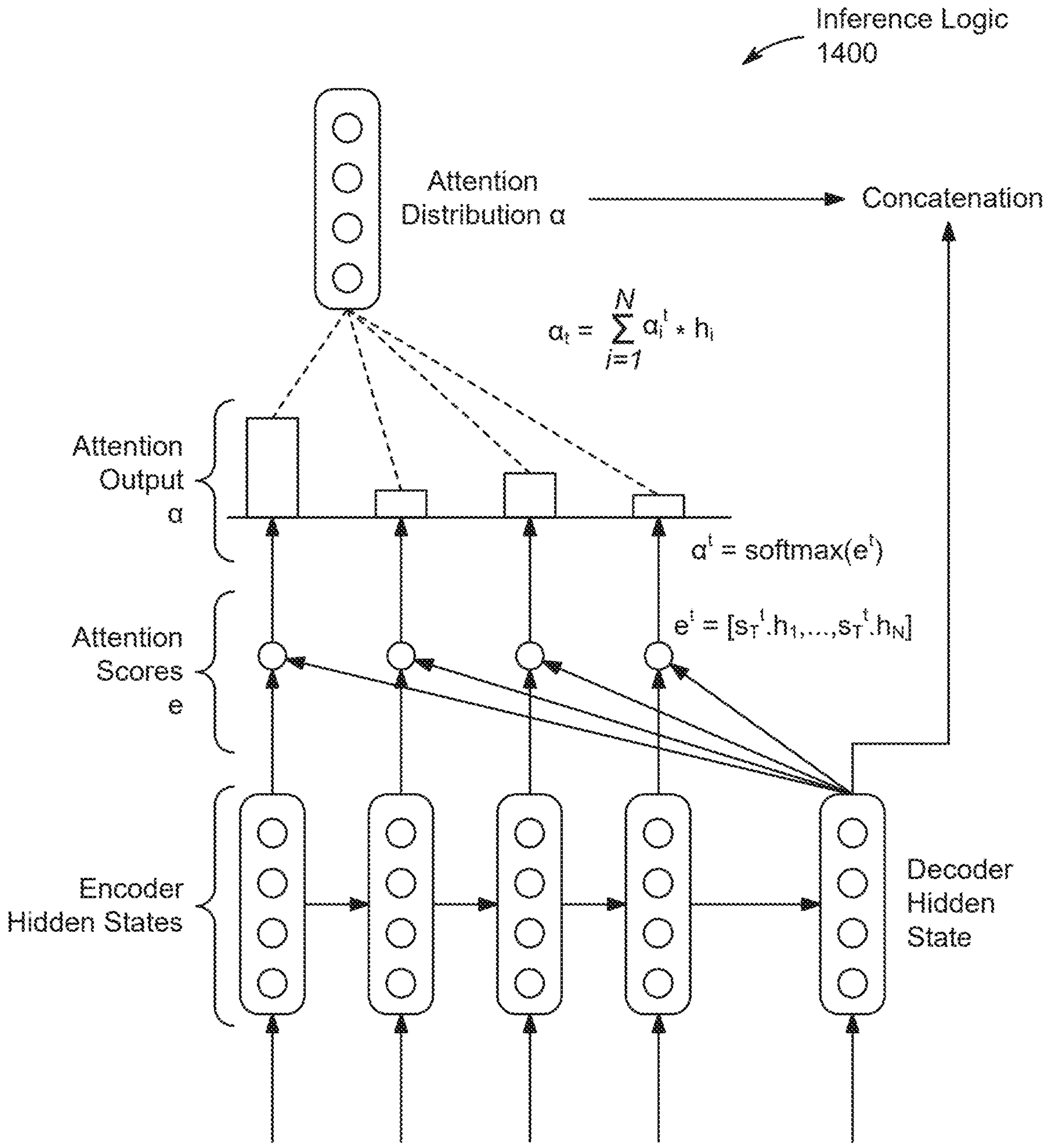
FIG. 15 shows an overview of an attention mechanism added onto a Recurrent Neural Network (RNN) encoder-decoder architecture.

Attention mechanisms distinguish Transformers from other machine learning models. The attention mechanism provides a solution for the vanishing gradient problem. FIG. 15 shows an overview of an attention mechanism added to an RNN encoder-decoder architecture. At every step, the decoder is given an attention score, e, for each encoder hidden state. In other words, the decoder is given weights for each relationship between words in a sentence. The decoder uses the attention score concatenated with the context vector during decoding. The output of the decoder at time step t is based on all encoder hidden states and the attention outputs. The attention output captures the relevant context for time step t from the original sentence. Thus, words at the end of a sentence may now have a strong relationship with words at the beginning of the sentence. In the sentence "The quick brown fox, upon arriving at the doghouse, jumped over the lazy dog," fox and dog can be closely related despite being far apart in this complex sentence.

To weight encoder hidden states, a dot product between the decoder hidden state of the current time step, and all encoder hidden states, is calculated. This results in an attention score for every encoder hidden state. The attention scores are higher for those encoder hidden states that are similar to the decoder hidden state of the current time step. Higher values for the dot product indicate the vectors are pointing more closely in the same direction. The attention scores are converted to fractions that sum to one using the SoftMax function.

The SoftMax scores provide an attention distribution. The x-axis of the distribution is position in a sentence. The y-axis is attention weight. The scores show which encoder hidden states are most closely related. The SoftMax scores specify which encoder hidden states are the most relevant for the decoder hidden state of the current time step.

The elements of the attention distribution are used as weights to calculate a weighted sum over the different encoder hidden states. The outcome of the weighted sum is called the attention output. The attention output is used to predict the output, often in combination (concatenation) with the decoder hidden states. Thus, both information about the inputs, as well as the already generated outputs, can be used to predict the next outputs.

By making it possible to focus on specific parts of the input in every decoder step, the attention mechanism solves the vanishing gradient problem. By using attention, information flows more directly to the decoder. It does not pass through many hidden states. Interpreting the attention step can give insights into the data. Attention can be thought of as a soft alignment. The words in the input sequence with a high attention score align with the current target word. Attention describes long-range dependencies better than RNN alone. This enables analysis of longer, more complex sentences.

The attention mechanism can be generalized as: given a set of vector values and a vector query, attention is a technique to compute a weighted sum of the vector values, dependent on the vector query. The vector values are the encoder hidden states, and the vector query is the decoder hidden state at the current time step.

The weighted sum can be considered a selective summary of the information present in the vector values. The vector query determines on which of the vector values to focus. Thus, a fixed-size representation of the vector values can be created, in dependence upon the vector query.

The attention scores can be calculated by the dot product, or by weighing the different values (multiplicative attention).

Embeddings

For most machine learning models, the input to the model needs to be numerical. The input to a translation model is a sentence, and words are not numerical. multiple methods exist for the conversion of words into numerical vectors. These numerical vectors are called the embeddings of the words. Embeddings can be used to convert any type of symbolic representation into a numerical one.

Embeddings can be created by using one-hot encoding. The one-hot vector representing the symbols has the same length as the total number of possible different symbols. Each position in the one-hot vector corresponds to a specific symbol. For example, when converting colors to a numerical vector, the length of the one-hot vector would be the total number of different colors present in the dataset. For each input, the location corresponding to the color of that value is one, whereas all the other locations are valued at zero. This works well for working with images. For NLP, this becomes problematic, because the number of words in a language is very large. This results in enormous models and the need for a lot of computational power. Furthermore, no specific information is captured with one-hot encoding. From the numerical representation, it is not clear that orange and red are more similar than orange and green. For this reason, other methods exist.

A second way of creating embeddings is by creating feature vectors. Every symbol has its specific vector representation, based on features. With colors, a vector of three elements could be used, where the elements represent the amount of yellow, red, and/or blue needed to create the color. Thus, all colors can be represented by only using a vector of three elements. Also, similar colors have similar representation vectors.

For NLP, embeddings based on context, as opposed to words, are small and can be trained. The reasoning behind this concept is that words with similar meanings occur in similar contexts. Different methods take the context of words into account. Some methods, like GloVe, base their context embedding on co-occurrence statistics from corpora (large texts) such as Wikipedia. Words with similar co-occurrence statistics have similar word embeddings. Other methods use neural networks to train the embeddings. For example, they train their embeddings to predict the word based on the context (Common Bag of Words), and/or to predict the context based on the word (Skip-Gram). Training these contextual embeddings is time intensive. For this reason, pre-trained libraries exist. Other deep learning methods can be used to create embeddings. For example, the latent space of a variational autoencoder (VAE) can be used as the embedding of the input. Another method is to use 1D convolutions to create embeddings. This causes a sparse, high-dimensional input space to be converted to a denser, low-dimensional feature space.

Self-Attention: Queries (Q), Keys (K), Values (V)

Transformer models are based on the principle of self-attention. Self-attention allows each element of the input sequence to look at all other elements in the input sequence and search for clues that can help it to create a more meaningful encoding. It is a way to look at which other sequence elements are relevant for the current element. The Transformer can grab context from both before and after the currently processed element.

When performing self-attention, three vectors need to be created for each element of the encoder input: the query vector (Q), the key vector (K), and the value vector (V). These vectors are created by performing matrix multiplications between the input embedding vectors using three unique weight matrices.

After this, self-attention scores are calculated. When calculating self-attention scores for a given element, the dot products between the query vector of this element and the key vectors of all other input elements are calculated. To make the model mathematically more stable, these self-attention scores are divided by the root of the size of the vectors. This has the effect of reducing the importance of the scalar thus emphasizing the importance of the direction of the vector. Just as before, these scores are normalized with a SoftMax layer. This attention distribution is then used to calculate a weighted sum of the value vectors, resulting in a vector z for every input element. In the attention principle explained above, the vector to calculate attention scores and to perform the weighted sum was the same, in self-attention two different vectors are created and used. As the self-attention needs to be calculated for all elements (thus a query for every element), one formula can be created to calculate a Z matrix. The rows of this Z matrix are the z vectors for every sequence input element, giving the matrix a size length sequence dimension QKV.

Figure 16:
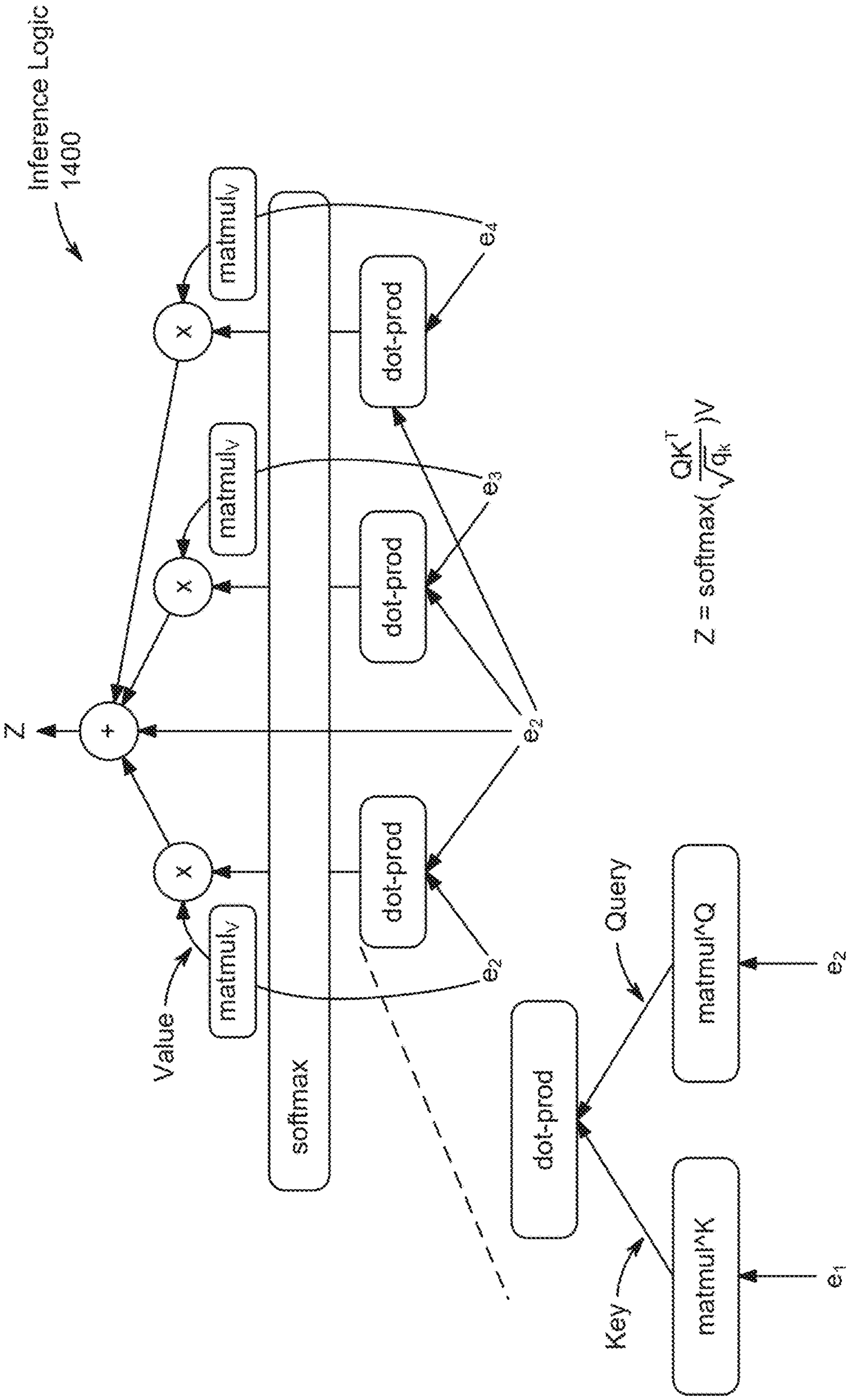
FIG. 16 is a schematic representation of the calculation of self-attention showing one attention head.

Multi-headed attention is executed in the Transformer. FIG. 16 is a schematic representation of the calculation of self-attention showing one attention head. For every attention head, different weight matrices are trained to calculate Q, K, and V. Every attention head outputs a matrix Z. Different attention heads can capture different types of information. The different Z matrices of the different attention heads are concatenated. This matrix can become large when multiple attention heads are used. To reduce dimensionality, an extra weight matrix W is trained to condense the different attention heads into a matrix with the same size as one Z matrix. This way, the amount of data given to the next step does not enlarge every time self-attention is performed.

When performing self-attention, information about the order of the different elements within the sequence is lost. To address this problem, positional encodings are added to the embedding vectors. Every position has its unique positional encoding vector. These vectors follow a specific pattern, which the Transformer model can learn to recognize. This way, the model can consider distances between the different elements.

As discussed above, in the core of self-attention are three objects: queries (Q), keys (K), and values (V). Each of these objects has an inner semantic meaning of their purpose. One can think of these as analogous to databases. We have a user-defined query of what the user wants to know. Then we have the relations in the database, i.e., the values which are the weights. More advanced database management systems create some apt representation of its relations to retrieve values more efficiently from the relations. This can be achieved by using indexes, which represent information about what is stored in the database. In the context of attention, indexes can be thought of as keys. So instead of running the query against values directly, the query is first executed on the indexes to retrieve where the relevant values or weights are stored. Lastly, these weights are run against the original values to retrieve data that is most relevant to the initial query.

Figure 17:
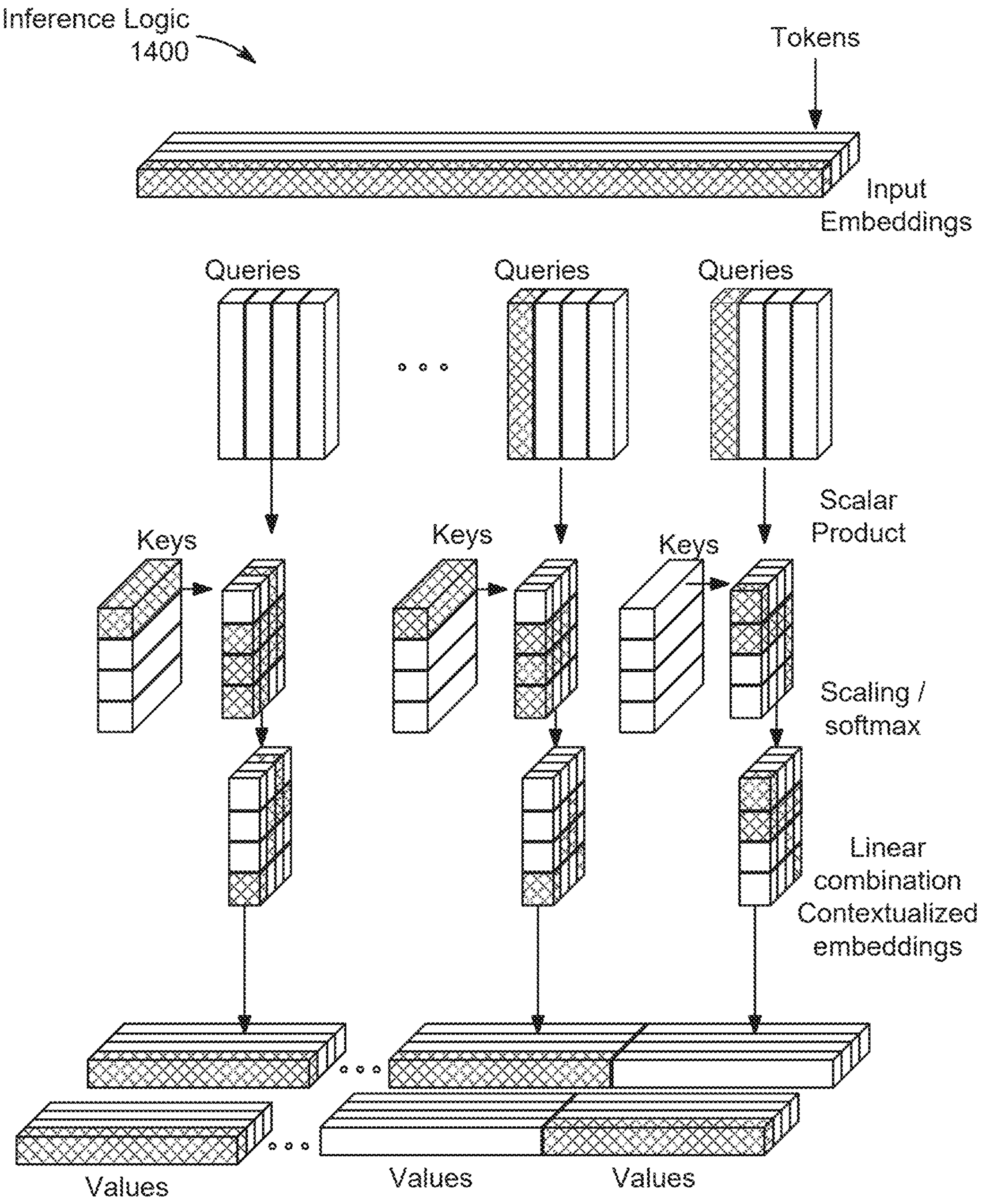
FIG. 17 is a depiction of several attention heads in a Transformer block.

FIG. 17 depicts several attention heads in a Transformer block. We can see that the outputs of queries and keys dot products in different attention heads are differently colored. This depicts the capability of the multi-head attention to focus on different aspects of the input and aggregate the obtained information by multiplying the input with different attention weights.

Examples of attention calculation include scaled dot-product attention and additive attention. There are several reasons why scaled dot-product attention is used in the Transformers. Firstly, the scaled dot-product attention is relatively fast to compute, since its main parts are matrix operations that can be run on modern hardware accelerators. Secondly, it performs similarly well for smaller dimensions of the K matrix, dk, as the additive attention. For larger dk, the scaled dot-product attention performs a bit worse because dot products can cause the vanishing gradient problem. This is compensated via the scaling factor, which is defined as $\sqrt{dk}$.

As discussed above, the attention function takes as input three objects: key, value, and query. In the context of Transformers, these objects are matrices of shapes (n, d), where n is the number of elements in the input sequence and d is the hidden representation of each element (also called the hidden vector). Attention is then computed as:

$$\text{Attention}(Q, K, V) = \text{SoftMax}\left(\frac{QK^T}{\sqrt{dk}}\right)V$$

where Q, K, V are computed as:

$$X \cdot W_Q, X \cdot W_K, X \cdot W_V$$

X is the input matrix and $W_Q$, $W_K$, $W_V$ are learned weights to project the input matrix into the representations. The dot products appearing in the attention function are exploited for their geometrical interpretation where higher values of their results mean that the inputs are more similar, i.e., pointing in the geometrical space in the same direction. Since the attention function now works with matrices, the dot product becomes matrix multiplication. The SoftMax function is used to normalize the attention weights into the value of 1 prior to being multiplied by the values matrix. The resulting matrix is used either as input into another layer of attention or becomes the output of the Transformer.

Multi-Head Attention

Czxdcds Transformers become even more powerful when multi-head attention is used. Queries, keys, and values are computed the same way as above, though they are now projected into h different representations of smaller dimensions using a set of h learned weights. Each representation is passed into a different scaled dot-product attention block called a head. The head then computes its output using the same procedure as described above.

Formally, the multi-head attention is defined as:

$$\text{MultiHeadAttention}(Q, K, V) = [\text{head}_1, \ldots, \text{head}_h]W_0 \text{ where}$$

$$\text{head}_i = \text{Attention}\left(QW_i^Q, KW_i^K, VW_i^V\right)$$

The outputs of all heads are concatenated together and projected again using the learned weights matrix Wo to match the dimensions expected by the next block of heads or the output of the Transformer. Using the multi-head attention instead of the simpler scaled dot-product attention enables Transformers to jointly attend to information from different representation subspaces at different positions.

Figure 18:
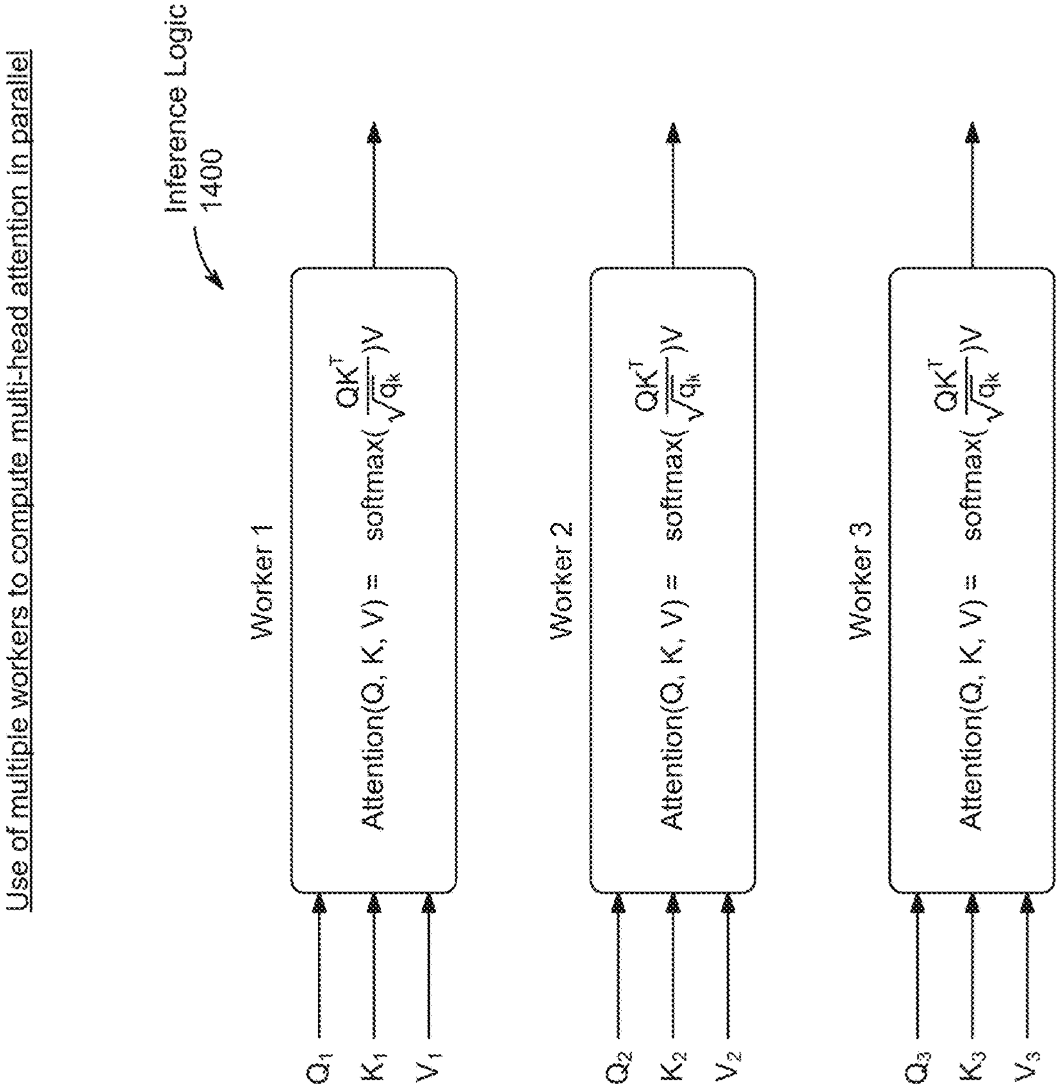
FIG. 18 is an illustration that shows how one can use multiple workers to compute the multi-head attention in parallel, as the respective heads compute their outputs independently of one another.

As shown in FIG. 18, one can use multiple workers to compute the multi-head attention in parallel, as the respective heads compute their outputs independently of one another. Parallel processing is one of the advantages of Transformers over RNNs.

Assuming the naive matrix multiplication algorithm which has a complexity of:

$$a \cdot b \cdot c$$

For matrices of shape (a, b) and (c, d), to obtain values Q, K, V, we need to compute the operations:

$$X \cdot W_Q, X \cdot W_K, X \cdot WV$$

The matrix X is of shape (n, d) where n is the number of patches and d is the hidden vector dimension. The weights $W_Q$, $W_K$, $W_v$ are all of shape (d, d). Omitting the constant factor 3, the resulting complexity is:

$$n \cdot d^2$$

We can proceed to the estimation of the complexity of the attention function itself, i.e., of SoftMax $$\left(\frac{QK^T}{\sqrt{dk}}\right)V.$$

The matrices Q and K are both of shape (n, d). The transposition operation does not SoftMax influence the asymptotic complexity of computing the dot product of matrices of shapes (n, d)· (d, n), therefore its complexity is:

$$n^2 \cdot d$$

Scaling by a constant factor of $\sqrt{dk}$, where dk is the dimension of the keys vector, as well as applying the SoftMax function, both have the complexity of a·b for a matrix of shape (a, b), hence they do not influence the asymptotic complexity. Lastly the dot product SoftMax $$\left(\frac{QK^T}{\sqrt{dk}}\right) \cdot V$$

is between matrices of shapes (n, n) and (n, d) and so its complexity is:

$$n^2 \cdot d$$

The final asymptotic complexity of scaled dot-product attention is obtained by summing the complexities of computing Q, K, V, and of the following attention function:

$$n \cdot d^2 + n^2 \cdot d$$

The asymptotic complexity of multi-head attention is the same since the original input matrix X is projected into h matrices of shapes $$\left(n, \frac{d}{h}\right),$$

where h is the number of heads. From the point of view of asymptotic complexity, h is constant, therefore we would arrive at the same estimate of asymptotic complexity using a similar approach as for the scaled dotproduct attention.

Transformer models often have the encoder-decoder architecture, although this is not necessarily the case. The encoder is built out of different encoder layers which are all constructed in the same way. The positional encodings are added to the embedding vectors. Afterward, self-attention is performed.

Encoder Block of Transformer

Figure 19:
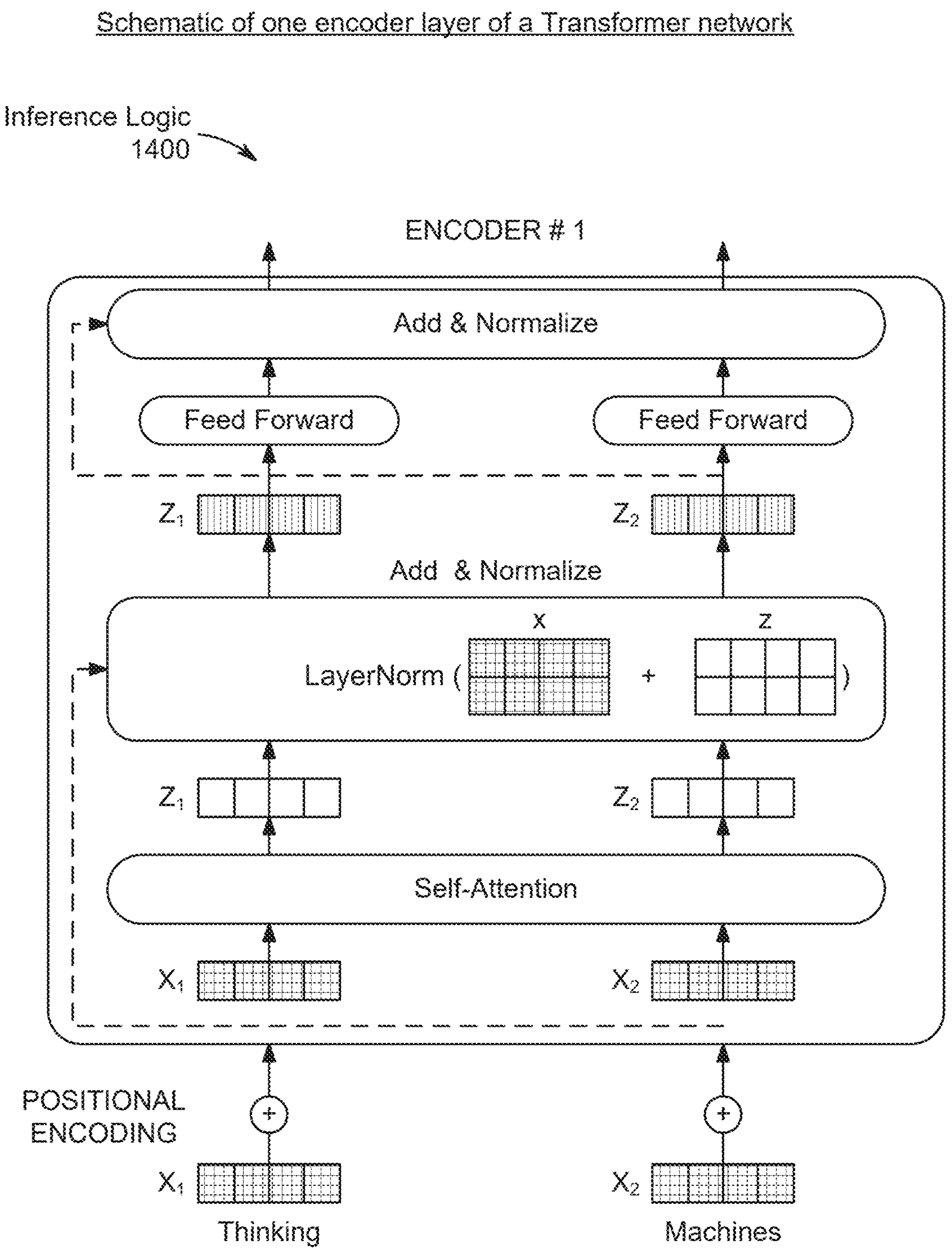
FIG. 19 is a portrayal of one encoder layer of a Transformer network.

FIG. 19 portrays one encoder layer of a Transformer network. Every self-attention layer is surrounded by a residual connection, summing up the output and input of the self-attention. This sum is normalized, and the normalized vectors are fed to a feed-forward layer. Every z vector is fed separately to this feed-forward layer. The feed-forward layer is wrapped in a residual connection and the outcome is normalized too. Often, numerous encoder layers are piled to form the encoder. The output of the encoder is a fixed-size vector for every element of the input sequence.

Just like the encoder, the decoder is built from different decoder layers. In the decoder, a modified version of self-attention takes place. The query vector is only compared to the keys of previous output sequence elements. The elements further in the sequence are not known yet, as they still must be predicted. No information about these output elements may be used.

Encoder-Decoder Blocks of Transformer

Figure 20:
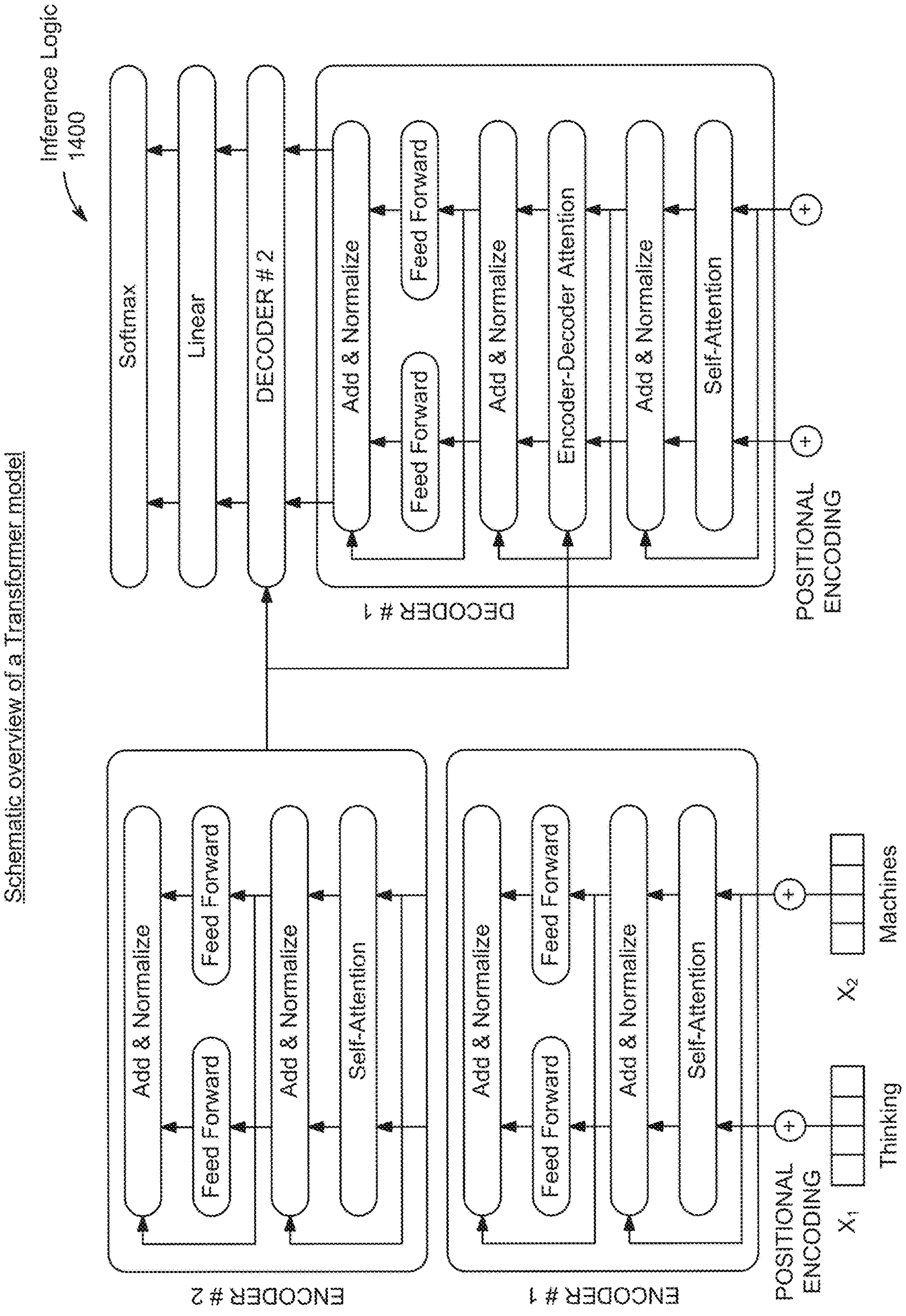
FIG. 20 shows a schematic overview of a Transformer model.

FIG. 20 shows a schematic overview of a Transformer model. Next to a self-attention layer, a layer of encoder-decoder attention is present in the decoder, in which the decoder can examine the last Z vectors of the encoder, providing fluent information transmission. The ultimate decoder layer is a feed-forward layer. All layers are packed in a residual connection. This allows the decoder to examine all previously predicted outputs and all encoded input vectors to predict the next output. Thus, information from the encoder is provided to the decoder, which could improve the predictive capacity. The output vectors of the last decoder layer need to be processed to form the output of the entire system. This is done by a combination of a feed-forward layer and a SoftMax function. The output corresponding to the highest probability is the predicted output value for a subject time step.

For some tasks other than translation, only an encoder is needed. This is true for both document classification and name entity recognition. In these cases, the encoded input vectors are the input of the feed-forward layer and the SoftMax layer. Transformer models have been extensively applied in different NLP fields, such as translation, document summarization, speech recognition, and named entity recognition. These models have applications in the field of biology as well for predicting protein structure and function and labeling DNA sequences.

Vision Transformer

There are extensive applications of transformers in vision including popular recognition tasks (e.g., image classification, object detection, action recognition, and segmentation), generative modeling, multi-modal tasks (e.g., visual-question answering, visual reasoning, and visual grounding), video processing (e.g., activity recognition, video forecasting), low-level vision (e.g., image super-resolution, image enhancement, and colorization) and 3D analysis (e.g., point cloud classification and segmentation).

Figure 21:
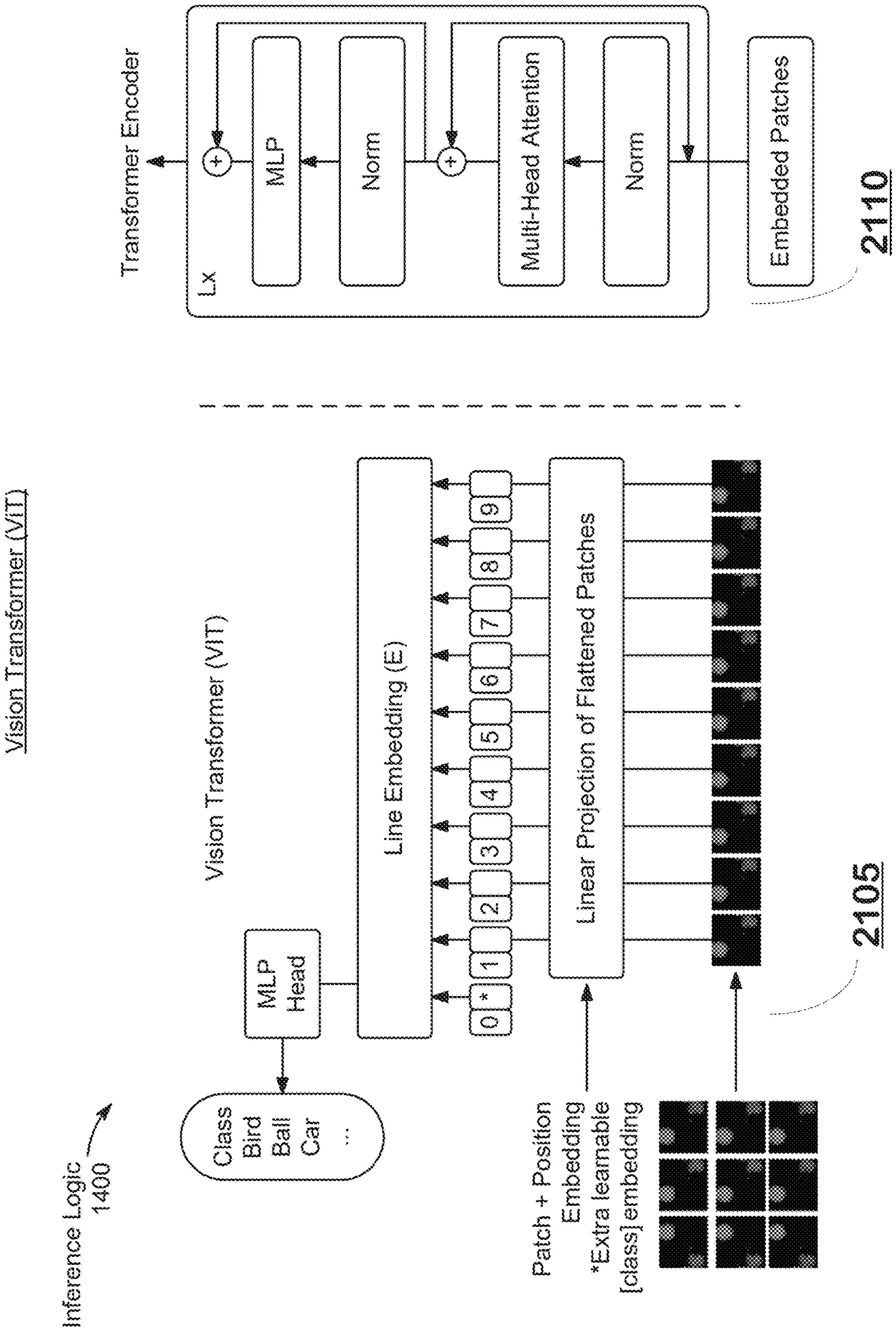
FIG. 21 is a depiction of a Vision Transformer (ViT).
Figure 22:
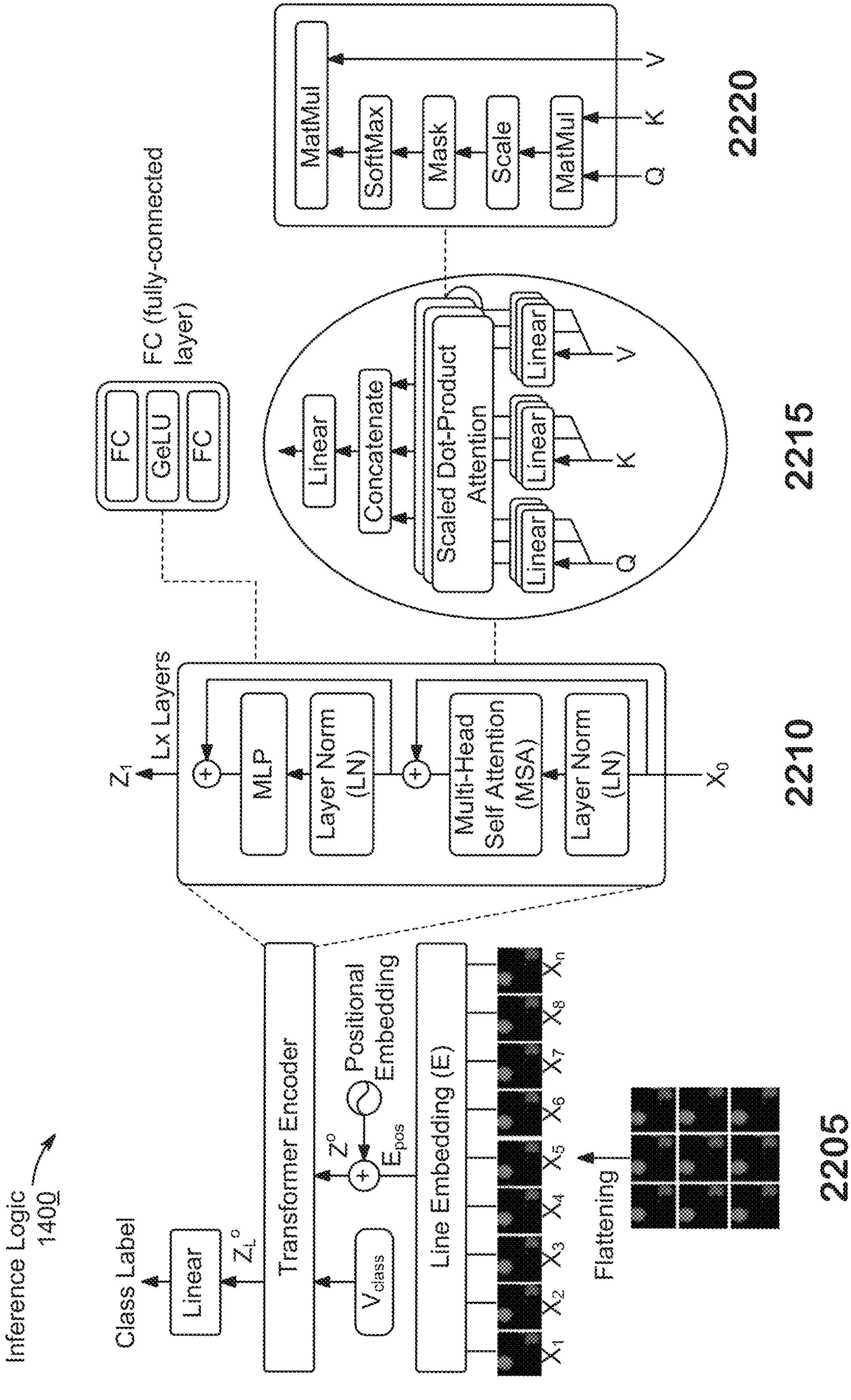
FIG. 22 illustrates a processing flow of the Vision Transformer (ViT).

Transformers were originally developed for NLP and worked with sequences of words. In image classification, we often have a single input image in which the pixels are in a sequence. To reduce the computation required, Vision Transformers (ViTs) cut the input image into a set of fixed-sized patches of pixels. The patches are often 16×16 pixels. They are treated much like words in NLP Transformers. ViTs are depicted in FIGS. 21 (2105 and 2110) and FIGS. 22 (2205, 2210, 2215 and 2220). Unfortunately, important positional information is lost because image sets are position-invariant. This problem is solved by adding a learned positional encoding into the image patches.

The computations of the ViT architecture can be summarized as follows. The first layer of a ViT extracts a fixed number of patches from an input image (2105 in FIG. 21). The patches are then projected to linear embeddings. A special class token vector is added to the sequence of embedding vectors to include all representative information of all tokens through the multi-layer encoding procedure. The class vector is unique to each image. Vectors containing positional information are combined with the embeddings and the class token. The sequence of embedding vectors is passed into the Transformer blocks. The class token vector is extracted from the output of the last Transformer block and is passed into a multilayer perceptron (MLP) head whose output is the final classification. The perceptron takes the normalized input and places the output in categories. It classifies the images. This procedure directly translates into the Python Keras code shown in FIG. 23.

When the input image is split into patches, a fixed patch size is specified before instantiating a ViT. Given the quadratic complexity of attention, patch size has a large effect on the length of training and inference time. A single Transformer block comprises several layers. The first layer implements Layer Normalization, followed by the multi-head attention that is responsible for the performance of ViTs. In the depiction of a Transformer block (2110) in FIG. 21, we can see two arrows. These are residual skip connections. Including skip connection data can simplify the output and improve the results. The output of the multi-head attention is followed again by Layer Normalization. And finally, the output layer is an MLP (Multi-Layer Perceptron) with the GELU (Gaussian Error Linear Unit) activation function.

ViTs can be pretrained and fine-tuned. Pretraining is generally done on a large dataset. Fine-tuning is done on a domain specific dataset.

Domain-specific architectures, like convolutional neural networks (CNNs) or long short-term memory networks (LSTMs), have been derived from the usual architecture of MLPs and suffer from so-called inductive biases that predispose the networks towards a certain output. ViTs stepped in the opposite direction of CNNs and LSTMs and became more general architectures by eliminating inductive biases. A ViT can be seen as a generalization of MLPs because MLPs, after being trained, do not change their weights for different inputs. On the other hand, ViTs compute their attention weights at runtime based on the particular input.

CLAUSES

The technology disclosed can be practiced as a system, method, or article of manufacture. One or more features of an implementation can be combined with the base implementation. Implementations that are not mutually exclusive are taught to be combinable. One or more features of an implementation can be combined with other implementations. This disclosure periodically reminds the user of these options. Omission from some implementations of recitations that repeat these options should not be taken as limiting the combinations taught in the preceding sections—these recitations are hereby incorporated forward by reference into each of the following implementations.

One or more implementations and clauses of the technology disclosed, or elements thereof can be implemented in the form of a computer product, including a non-transitory computer readable storage medium with computer usable program code for performing the method steps indicated. Furthermore, one or more implementations and clauses of the technology disclosed, or elements thereof can be implemented in the form of an apparatus including a memory and at least one processor that is coupled to the memory and operative to perform exemplary method steps. Yet further, in another aspect, one or more implementations and clauses of the technology disclosed or elements thereof can be implemented in the form of means for carrying out one or more of the method steps described herein; the means can include (i) hardware module(s), (ii) software module(s) executing on one or more hardware processors, or (iii) a combination of hardware and software modules; any of (i)-(iii) implement the specific techniques set forth herein, and the software modules are stored in a computer readable storage medium (or multiple such media).

The clauses described in this section can be combined as features. In the interest of conciseness, the combinations of features are not individually enumerated and are not repeated with each base set of features. The reader will understand how features identified in the clauses described in this section can readily be combined with sets of base features identified as implementations in other sections of this application. These clauses are not meant to be mutually exclusive, exhaustive, or restrictive; and the technology disclosed is not limited to these clauses but rather encompasses all possible combinations, modifications, and variations within the scope of the claimed technology and its equivalents.

Other implementations of the clauses described in this section can include a non-transitory computer readable storage medium storing instructions executable by a processor to perform any of the clauses described in this section. Yet another implementation of the clauses described in this section can include a system including memory and one or more processors operable to execute instructions, stored in the memory, to perform any of the clauses described in this section.

We disclose the following clauses.

1. A system including one or more processors coupled to memory, the memory loaded with computer instructions to analyze and visualize multi-participant deliberative interactions, the instructions, when executed on the processors, implement actions comprising:
   - receiving audio data representing a deliberative interaction involving a plurality of participants;
   - processing the audio data through a speech recognition pipeline to generate diarized speech segments, each diarized speech segment associated with a participant identifier and a temporal marker;
   - classifying, using a machine learning model, each diarized speech segment into at least one of a plurality of valence categories representing positions on a deliberative issue;
   - generating a bidirectional stream-graph visualization comprising: (i) a first portion representing contributions classified with a first valence category, (ii) a second portion representing contributions classified with a second valence category opposite to the first valence category, and (iii) a midline separating the first portion and the second portion;
   - wherein each participant is represented within the stream-graph visualization as a distinct visual band, and wherein the visual band for each participant varies in magnitude along a temporal axis based on the classified contributions of that participant.
2. A system including one or more processors coupled to memory, the memory loaded with computer instructions to generate deliberation insights from multi-participant conversational data, the instructions, when executed on the processors, implement actions comprising:
   - executing a speech processing module that receives conversational audio from a deliberation involving a plurality of participants and generates participant-attributed temporal speech segments;
   - executing a classification module comprising a machine learning model trained to classify each temporal speech segment into at least a valence category indicating support for one of at least two opposing deliberative positions;
   - executing a visualization generator that produces a stream-graph representation wherein: (a) each participant is rendered as a distinct visual element, (b) the stream-graph is divided into at least two portions corresponding to the at least two opposing deliberative positions, and (c) the visual element for each participant appears in the portion corresponding to the valence category of that participant's classified contributions; and executing a recommendation engine configured to analyze patterns within the stream-graph representation and generate at least one actionable recommendation based on identified deliberation dynamics.

3. A system including one or more processors coupled to memory, the memory loaded with computer instructions to visually represent group decision-making dynamics, the instructions, when executed on the processors, implement actions comprising:

receiving input data representing a multi-party interaction wherein the plurality of parties discuss at least one matter having a first position and a second position;

segmenting the input data into discrete temporal units, each temporal unit attributed to one of the plurality of parties;

applying a trained classification model to each temporal unit to determine a position indicator representing alignment with the first position or the second position;

constructing a visualization data structure mapping each temporal unit to: (a) a horizontal coordinate corresponding to a time of the temporal unit, (b) a vertical coordinate corresponding to the position indicator, wherein positive vertical coordinates represent the first position and negative vertical coordinates represent the second position, and (c) a magnitude value corresponding to a contribution measure of the temporal unit; and rendering the visualization data structure as a stacked area graph wherein each party is displayed as a visually distinguishable layer having variable thickness based on the magnitude value across the horizontal coordinate.

4. A method for visualizing deliberative dynamics among a plurality of participants, the method comprising:

receiving, by one or more processors, audio data of a deliberative interaction involving the plurality of participants;

generating, by the one or more processors, diarized speech segments from the audio data, wherein each diarized speech segment is associated with a participant identifier from the plurality of participants and a temporal position;

classifying, by the one or more processors using a trained classification model, each diarized speech segment according to a valence dimension representing opposing positions on a deliberative matter;

constructing, by the one or more processors, a stream-graph data structure comprising temporal coordinates and magnitude values for each participant, wherein the magnitude values are derived from the classified diarized speech segments;

rendering a bidirectional visualization from the stream-graph data structure, the bidirectional visualization comprising: (a) a first visual region depicting contributions supporting a first position, and (b) a second visual region depicting contributions supporting a second position opposed to the first position;

wherein contributions from each participant are displayed as visually distinguishable bands within the first and second visual regions.

5. A method for analyzing group interaction patterns, the method comprising:

capturing conversational data from an interaction involving a plurality of participants engaged in discussion of an issue having at least two opposing viewpoints;

processing the conversational data to identify individual participant contributions and associate each contribution with a timestamp;

classifying each participant contribution according to viewpoint alignment using a machine learning classification system;

mapping each classified contribution to a position within a two-dimensional coordinate system wherein: (a) a first axis represents temporal progression of the interaction, and (b) a second axis represents viewpoint alignment, with a first direction indicating support for a first viewpoint and a second direction indicating support for a second viewpoint;

generating a layered area visualization wherein each participant is represented as a distinct layer, and wherein the area of each layer at each temporal position corresponds to a measure of that participant's contribution at that temporal position.

6. A method for generating actionable insights from deliberative interactions, the method comprising:

receiving audio data from a deliberation session involving multiple participants;

processing the audio data to generate speaker-attributed speech segments with temporal markers;

classifying each speech segment using a trained model to determine: (a) a stance classification indicating support for one of at least two deliberative positions, and (b) an engagement measure indicating intensity of contribution;

generating a visual representation of the deliberation comprising a bidirectional graph structure with opposing positions represented on opposite sides of a central reference line;

analyzing the visual representation to compute derived metrics comprising at least one of: (i) participant dominance indicators based on cumulative contribution measures, (ii) stance consistency indicators based on changes in stance classifications over time, or (iii) influence indicators based on patterns of influence between contributions of different participants; and generating at least one recommendation based on the derived metrics.

7. A non-transitory computer-readable medium storing instructions that, when executed by one or more processors, cause the one or more processors to perform operations comprising:

receiving audio input representing a multi-participant deliberative interaction;

processing the audio input to generate participant-attributed temporal segments;

classifying each temporal segment according to a position category using a machine learning model;

generating a bidirectional stream-graph visualization representing the deliberative interaction, wherein: (a) the stream-graph visualization comprises a first region and a second region separated by a reference line, (b) the first region represents contributions classified with a first position category, (c) the second region represents contributions classified with a second position category opposite to the first position category, (d) each participant is represented as a visually distinct band within the stream-graph visualization, and (e) the band for each participant varies in size along a temporal axis based on classified contributions of that participant.

8. The system of clause 1, the machine learning model comprising a language model trained on deliberative interaction data.

9. The system of clause 1, the plurality of valence categories comprising at least two categories including a first position category and a second position category.

10. The system of clause 1, the distinct visual band for each participant being rendered with a unique color selected from a predefined color palette.

11. The system of clause 1, the magnitude of the visual band being determined based on at least one of: duration of the diarized speech segment or a classified intensity score.

12. The system of clause 1, the bidirectional stream-graph visualization further comprising a timeline indicator along the temporal axis marking discrete time intervals.

13. The system of clause 2, the recommendation engine being configured to identify at least one dominant participant based on cumulative contribution measures within the stream-graph representation.

14. The system of clause 2, the recommendation engine being configured to identify pivotal moments in the deliberation based on detected shifts in aggregate valence balance.

15. The system of clause 2, the actionable recommendation comprising at least one of: identification of shifts in conversation dynamics, suggestion for procedural intervention, or prediction of deliberation outcome.

16. The method of clause 4, further comprising computing a consistency metric for each participant based on changes in valence classifications across temporal positions.

17. The method of clause 4, further comprising identifying position shift events wherein a participant's predominant valence classification changes from one temporal period to another.

18. The method of clause 6, the influence indicators comprising a measure indicating the degree to which stance changes by other participants follow contributions by a particular participant based on identified patterns of influence.

19. The system of clause 1, further comprising a data privacy module configured to apply anonymization to the participant identifiers while preserving the structure of the bidirectional stream-graph visualization.

20. The system of clause 3, the stacked area graph being rendered with visual annotations indicating detected events comprising at least one of: interruptions, simultaneous speech, or extended pauses.

21. A system including one or more processors coupled to memory, the memory loaded with computer instructions to perform AI-driven visualization of group deliberation dynamics, the instructions, when executed on the processors, implement actions comprising:

receiving audio input data from a deliberative conversation involving a plurality of participants discussing at least one issue having opposing positions;

processing the audio input data using speaker diarization to generate a plurality of timestamped speech segments, each timestamped speech segment attributed to a specific participant from the plurality of participants;

converting each timestamped speech segment to text using automatic speech recognition;

classifying, using a generative artificial intelligence model, each text segment into a plurality of interaction categories comprising at least: (a) a valence category indicating support for one of the opposing positions, (b) an argument type category selected from a predefined set of argument types, and (c) an engagement intensity metric;

mapping each classified text segment to coordinates in a bidirectional stream-graph structure wherein: (i) a Y-axis positive direction represents a first opposing position, (ii) a Y-axis negative direction represents a second opposing position, (iii) an X-axis represents temporal progression of the deliberation, and (iv) an area magnitude for each participant at each temporal position is determined by the engagement intensity metric;

rendering the bidirectional stream-graph structure as a dynamic visualization displaying participant contributions as color-coded stacked bands that vary in thickness over the temporal progression.

22. A system including one or more processors coupled to memory, the memory loaded with computer instructions to perform multimodal deliberation analysis, the instructions, when executed on the processors, implement actions comprising:

receiving multimodal input data comprising audio data and video data from a deliberative interaction involving a plurality of participants;

processing the audio data to generate diarized speech segments with participant attribution and temporal markers;

processing the video data to extract non-verbal cues comprising at least one of: facial expression indicators, gesture indicators, or body posture indicators, wherein each non-verbal cue is temporally aligned with the diarized speech segments;

classifying, using a machine learning classification system, the diarized speech segments into verbal valence categories indicating argumentative position;

classifying, using the machine learning classification system, the non-verbal cues into non-verbal engagement categories;

generating a unified stream-graph visualization wherein: (a) verbal contributions are represented as primary visual bands varying in magnitude along a temporal axis, (b) non-verbal engagement indicators are represented as secondary visual elements associated with corresponding temporal positions within the primary visual bands, and (c) the stream-graph visualization is divided into a first portion and a second portion representing opposing argumentative positions separated by a midline.

23. A system including one or more processors coupled to memory, the memory loaded with computer instructions to perform privacy-aware deliberation visualization, the instructions, when executed on the processors, implement actions comprising:

receiving conversational input data from a deliberative interaction involving a plurality of participants, the deliberative interaction being associated with a privacy classification level selected from a plurality of predefined privacy levels;

generating, based on the conversational input data, diarized speech segments attributed to individual participants;

classifying each diarized speech segment according to a valence category representing a position on a deliberated issue;

applying, based on the privacy classification level, a data handling protocol selected from: (a) full retention with participant identification preserved, (b) pseudonymized retention with participant identifiers replaced by pseudonymous identifiers while maintaining relational consistency, or (c) aggregated retention wherein individual participant contributions are combined into aggregate position contributions without individual attribution;

generating a stream-graph visualization from the processed data according to the applied data handling protocol, wherein the stream-graph visualization comprises a bidirectional structure depicting opposing deliberative positions with participant contributions represented according to the data handling protocol.

24. A system including one or more processors coupled to memory, the memory loaded with computer instructions to perform real-time deliberation visualization and analysis, the instructions, when executed on the processors, implement actions comprising:

receiving streaming audio data from an ongoing deliberative interaction involving a plurality of participants;

processing the streaming audio data in real-time to perform: (a) speaker identification to attribute audio segments to individual participants, (b) speech-to-text conversion to generate text representations of audio segments, and (c) incremental classification using a trained model to assign valence categories to text representations as they are generated;

maintaining a dynamic stream-graph data structure that is updated incrementally as new classified segments are received;

rendering, on a display device, a real-time bidirectional stream-graph visualization that updates as the deliberative interaction progresses, wherein: (i) the visualization comprises a first portion representing contributions supporting a first position and a second portion representing contributions supporting a second position, (ii) each participant is represented as a color-coded band, and (iii) the visualization scrolls or compresses along a temporal axis as the deliberation continues;

computing real-time analytics comprising at least one of: current position balance, speaking time distribution, or detected momentum shifts.

25. A system including one or more processors coupled to memory, the memory loaded with computer instructions to perform deliberation analysis with derived metrics computation, the instructions, when executed on the processors, implement actions comprising:

receiving audio data from a deliberative interaction involving a plurality of participants;

processing the audio data to generate participant-attributed speech segments with temporal markers;

classifying each speech segment using a trained classification model to determine a valence classification;

generating a bidirectional stream-graph visualization representing participant contributions organized by valence classification and temporal position;

computing from the stream-graph visualization a plurality of derived metrics comprising: (a) a dominance score for each participant computed based on a ratio of that participant's total contribution magnitude to aggregate contribution magnitude, (b) a position stability indicator for each participant computed based on changes in valence classifications across temporal positions, (c) a persistence score for each participant computed based on sustained contribution presence across consecutive temporal segments, and (d) an influence score for each participant computed based on identified patterns of influence between that participant's contributions and subsequent valence shifts in contributions by other participants;

generating a metrics summary associated with the stream-graph visualization.

26. A method for temporal analysis of deliberative interactions using generative AI, the method comprising:

receiving audio data of a deliberative interaction among a plurality of participants;

segmenting the audio data into a plurality of temporal segments using speaker diarization, wherein each temporal segment corresponds to a conversational turn by one of the plurality of participants;

for each temporal segment, performing: (a) automatic speech recognition to generate a text representation, (b) speaker identification to attribute the temporal segment to a participant identifier, and (c) classification using a generative AI model to determine a valence score indicating degree of support for a first deliberative position versus a second deliberative position, and an argument type classification;

mapping each temporal segment to a coordinate position within a stream-graph data structure, wherein: (i) a first axis coordinate is determined by the temporal position of the segment, (ii) a second axis coordinate is determined by the valence score, with positive values mapped to a first graph region representing the first deliberative position and negative values mapped to a second graph region representing the second deliberative position, and (iii) a magnitude value is determined based on at least one of segment duration or classified intensity;

computing derived metrics from the stream-graph data structure comprising at least one of: participant dominance scores based on cumulative magnitude values, position shift indicators based on valence score changes over time, subgroup identification based on participant valence patterns, or pivotal moment detection based on aggregate valence balance changes;

rendering a visualization of the stream-graph data structure with visual encoding of the derived metrics.

27. A method for multimodal analysis of deliberative interactions, the method comprising:

receiving audio data and video data from a deliberative interaction involving a plurality of participants;

processing the audio data to generate speaker-diarized speech segments with temporal markers;

processing the video data to extract temporally-marked non-verbal features comprising at least one of: facial expression classifications, gesture event detections, or gaze direction indicators;

aligning the non-verbal features with corresponding speech segments based on temporal markers;

classifying each speech segment according to a valence category using a trained classification model;

generating a combined feature representation for each temporal position comprising the valence category and associated non-verbal features;

generating a multimodal stream-graph visualization wherein: (a) a primary layer represents verbal contributions as participant-specific bands positioned according to valence category, (b) a secondary layer represents non-verbal engagement through visual annotations or modulation of the primary layer, and (c) the visualization is organized as a bidirectional graph with opposing valence categories on opposite sides of a midline.

28. A method for generating domain-specific recommendations from deliberation analysis, the method comprising: receiving audio data from a deliberative interaction associated with a specified domain selected from a plurality of supported domains;

processing the audio data to generate classified speech segments with participant attribution and valence classifications;

generating a bidirectional stream-graph representation of the deliberative interaction;

computing deliberation metrics from the stream-graph representation;

applying a domain-specific recommendation model corresponding to the specified domain to the deliberation metrics;

generating domain-specific recommendations, wherein: for a legal deliberation domain, the recommendations comprise at least one of: identification of influential deliberators, detection of potential procedural issues, or suggestions for deliberation facilitation; for a healthcare domain, the recommendations comprise at least one of: communication effectiveness indicators, patient engagement metrics, or care coordination suggestions; for an educational domain, the recommendations comprise at least one of: participation balance indicators, engagement level assessments, or pedagogical intervention suggestions; for a customer service domain, the recommendations comprise at least one of: satisfaction trajectory indicators, escalation risk assessments, or agent coaching suggestions.

29. A non-transitory computer-readable medium storing instructions that, when executed by one or more processors, cause the one or more processors to perform operations comprising:

receiving multimodal input comprising audio data and video data from a deliberative interaction;

processing the audio data using speaker diarization and speech recognition to generate participant-attributed text segments;

processing the video data to extract non-verbal indicators temporally aligned with the text segments;

classifying each text segment using a generative AI model to determine a valence classification and an argument type classification;

generating a unified bidirectional stream-graph visualization comprising: (a) a first portion representing contributions classified with a first valence category, (b) a second portion representing contributions classified with a second valence category, (c) participant-specific visual bands with magnitude corresponding to contribution intensity, and (d) non-verbal indicator annotations associated with corresponding temporal positions;

computing derived analytics comprising participant dominance metrics and influence metrics.

30. The system of clause 21, the generative artificial intelligence model comprising a large language model fine-tuned on a corpus of deliberative interaction transcripts with human-annotated valence labels.

31. The system of clause 21, the predefined set of argument types comprising at least: opinion statement, question, suggestion, answer, and rebuttal.

32. The system of clause 21, the engagement intensity metric being computed based on a combination of speech segment duration and engagement indicators derived from the text.

33. The system of clause 22, the facial expression indicators comprising classifications selected from: agreement, disagreement, confusion, surprise, or neutral.

34. The system of clause 22, the secondary visual elements comprising at least one of: icons positioned at temporal locations corresponding to detected non-verbal events, or modulation of band color saturation based on non-verbal engagement intensity.

35. The system of clause 23, the privacy classification level being automatically determined based on a domain classification of the deliberative interaction.

36. The system of clause 23, further comprising an audit logging module that records data access events and applied privacy protocols.

37. The system of clause 24, the real-time analytics further comprising a predicted outcome indicator based on current position balance and historical deliberation patterns.

38. The system of clause 24, the visualization further comprising alert indicators triggered when detected momentum shifts exceed a predefined threshold.

39. The system of clause 25, the influence score being computed based on identified patterns of influence between the temporal contribution series of different participants.

40. The method of clause 26, the subgroup identification comprising analyzing participant valence patterns to identify participants with similar position trajectories.

41. The method of clause 26, the pivotal moment detection comprising identifying temporal positions where the aggregate valence balance crosses a threshold from favoring the first deliberative position to favoring the second deliberative position or vice versa.

42. The method of clause 27, aligning the non-verbal features comprising applying temporal alignment techniques to accommodate temporal offsets between audio and video streams.

43. The method of clause 28, the domain-specific recommendation model being selected from a plurality of trained models, each trained on domain-specific deliberation data.

44. The system of clause 21, further comprising an export module configured to generate a report document comprising the bidirectional stream-graph visualization and computed metrics.

45. The system of clause 22, further comprising a calibration module configured to adjust non-verbal feature extraction parameters based on environmental factors comprising lighting conditions or camera positioning.

46. A system including one or more processors coupled to memory, the memory loaded with computer instructions to visualize jury deliberation dynamics, the instructions, when executed on the processors, implement actions comprising:

receiving audio recordings from a jury deliberation session involving a panel of jurors deliberating on a legal case having a plaintiff position and a defense position;

performing speaker diarization on the audio recordings to identify individual juror speech segments and associate each speech segment with a juror identifier and a timestamp indicating when the speech segment occurred within the deliberation session;

converting each juror speech segment to text using automatic speech recognition;

classifying, using a generative artificial intelligence model trained on legal deliberation data, each text segment into one of: (a) a pro-plaintiff valence when the text segment contains argumentation supporting the plaintiff position, or (b) a pro-defense valence when the text segment contains argumentation supporting the defense position;

generating a bidirectional jury deliberation stream-graph comprising: (i) a top portion positioned above a horizontal midline and representing pro-plaintiff contributions from the jurors, (ii) a bottom portion positioned below the horizontal midline and representing pro-defense contributions from the jurors, (iii) an X-axis representing deliberation time divided into discrete deliberation segments numbered sequentially from a beginning of the deliberation session, (iv) a distinct color code assigned to each juror from the panel such that each juror's contributions are visually distinguishable from contributions of other jurors, (v) stacked area bands for each juror within the top portion and the bottom portion, wherein the vertical extent of each band at each deliberation segment corresponds to a magnitude of that juror's classified contributions during that segment, and (vi) a legend associating each color code with a corresponding juror identifier; displaying the bidirectional jury deliberation stream-graph on a graphical user interface;

computing jury deliberation metrics comprising: a juror dominance ranking based on cumulative contribution magnitudes, a position shift indicator for each juror based on changes in valence classifications, and identification of pivotal deliberation segments where aggregate position balance shifted;

generating a jury deliberation analysis report comprising the stream-graph and computed metrics.

47. A system including one or more processors coupled to memory, the memory loaded with computer instructions to analyze customer support interaction dynamics, the instructions, when executed on the processors, implement actions comprising:

receiving audio data from a customer support conversation between at least one customer and at least one support agent conducted via a telephone or voice-over-IP channel;

segmenting the audio data into participant-attributed speech segments using speaker diarization, distinguishing between customer speech segments and agent speech segments;

converting each speech segment to text using automatic speech recognition;

classifying each text segment using a trained sentiment and issue classification model to determine: (a) a sentiment indicator selected from positive sentiment, negative sentiment, and neutral sentiment, (b) an issue category selected from a predefined set of support issue categories, and (c) a resolution progress indicator;

generating a bidirectional customer interaction stream-graph comprising: (i) an upper portion representing positive customer sentiment indicators and successful resolution progress, (ii) a lower portion representing negative customer sentiment indicators and unresolved issue indicators, (iii) distinct visual representations for customer contributions and agent contributions distinguished by color, (iv) a temporal axis showing progression of the conversation from initiation to conclusion, and (v) magnitude indicators reflecting intensity of sentiment or contribution duration;

computing customer interaction metrics comprising: time-to-resolution measurement, sentiment trajectory score indicating change in customer sentiment over the conversation, agent responsiveness score based on response timing patterns, and escalation risk indicator based on detected negative sentiment patterns;

generating agent coaching recommendations based on identified patterns in the stream-graph;

storing the stream-graph and metrics in a customer interaction database for aggregate analysis.

48. A system including one or more processors coupled to memory, the memory loaded with computer instructions to perform educational discussion analysis and assessment, the instructions, when executed on the processors, implement actions comprising:

receiving audio recordings from an educational discussion session involving an instructor and a plurality of students discussing an academic topic;

performing speaker diarization to identify individual participant speech segments and associate each segment with a participant identifier distinguishing the instructor from each student;

converting each speech segment to text;

classifying each text segment using a trained educational interaction model to determine: (a) a contribution type selected from: substantive contribution, question, response, procedural statement, and off-topic contribution, (b) a quality indicator based on relevance and depth of contribution, and (c) for substantive contributions, a position indicator when the discussion involves debatable topics;

generating an educational discussion stream-graph comprising: (i) for discussions involving debatable topics, a bidirectional structure with opposing positions represented in upper and lower portions, (ii) for general discussions, a unidirectional structure with contribution quality mapped to vertical position, (iii) distinct color codes for each student participant, (iv) a separate visual treatment for instructor contributions, and (v) temporal segmentation corresponding to discussion phases;

computing educational metrics comprising: participation balance indicators showing distribution of contributions among students, engagement trajectory showing changes in participation patterns over the discussion, quality distribution showing spread of contribution quality levels, and individual student assessment scores based on contribution frequency and quality;

generating an educational discussion report suitable for instructor review and student feedback.

49. A system including one or more processors coupled to memory, the memory loaded with computer instructions to perform medical team communication analysis, the instructions, when executed on the processors, implement actions comprising:

receiving audio and video recordings from a medical team meeting involving healthcare providers discussing patient care decisions;

performing speaker diarization to identify individual provider speech segments;

extracting non-verbal communication indicators from the video recordings, including attention indicators and agreement or disagreement expressions;

converting speech segments to text and classifying each segment to determine: (a) a clinical recommendation category indicating type of care recommendation, (b) a certainty indicator reflecting confidence level expressed in the recommendation, and (c) for decisions with alternatives, a position indicator reflecting support for different care options;

generating a medical team communication stream-graph comprising: (i) for decisions with alternatives, a bidirectional structure representing different care options, (ii) visual bands for each healthcare provider, (iii) non-verbal engagement indicators overlaid on verbal contribution bands, and (iv) temporal progression showing evolution of the discussion;

computing communication effectiveness metrics comprising: participation equity among team members, recommendation clarity scores, consensus progression indicators, and identified communication gaps or misalignments;

applying privacy protections compliant with healthcare privacy regulations before storing or transmitting the stream-graph;

generating a team communication report with recommendations for improving care coordination.

50. A system including one or more processors coupled to memory, the memory loaded with computer instructions to perform mediation session visualization, the instructions, when executed on the processors, implement actions comprising:

receiving audio recordings from a mediation session involving a mediator and at least two disputing parties;

performing speaker diarization to identify speech segments from each party and from the mediator;

classifying each party speech segment according to: (a) a position indicator reflecting support for that party's position versus accommodation of the opposing party's position, (b) an emotional intensity indicator, and (c) a negotiation behavior category selected from: positional statement, interest disclosure, proposal, concession, and rejection;

generating a mediation session stream-graph comprising: (i) a bidirectional structure with each disputing party's position represented on opposite sides of a midline, (ii) the midline representing accommodating statements, (iii) distinct visual treatment for mediator interventions shown as annotations or separate layer, (iv) temporal segmentation showing phases of the mediation, and (v) magnitude indicators reflecting emotional intensity and contribution duration;

computing mediation progress metrics comprising: position movement indicators showing shifts from initial positions, accommodation index measuring movement toward center, emotional trajectory for each party, and mediator intervention effectiveness based on subsequent position movements;

generating a mediation analysis report for the mediator with recommendations for facilitation strategies.

51. A method for end-to-end jury deliberation analysis, the method comprising:

capturing, via a microphone array positioned in a deliberation room, audio data from a jury deliberation session involving a panel of jurors deliberating on a legal matter;

transmitting the captured audio data to a processing server;

at the processing server, executing the following operations: performing speaker diarization on the audio data to segment the audio data into juror-attributed speech segments, each speech segment associated with a juror identifier and start and end timestamps; converting each speech segment to a text transcript using automatic speech recognition with speaker labels preserved; for each text transcript, invoking a generative AI classification service configured with a legal deliberation classification prompt to obtain: (a) a valence classification indicating whether the transcript supports a plaintiff position or supports a defense position, (b) an argument type classification selected from: evidence-based argument, credibility argument, legal standard argument, damages argument, and procedural statement, and (c) a contribution intensity score;

storing the classifications in a deliberation database with temporal indexing and juror attribution;

constructing a jury stream-graph data model from the stored classifications comprising: for each juror, a time series of valence values, argument types, and intensity scores indexed by deliberation segment, and aggregation functions for computing stacked area values representing contribution magnitudes at each segment;

rendering the jury stream-graph data model as a bidirectional visualization comprising: (i) a top region above a horizontal axis displaying pro-plaintiff contributions as stacked colored bands with each juror represented by a distinct color, (ii) a bottom region below the horizontal axis displaying pro-defense contributions as stacked colored bands, (iii) an X-axis labeled with deliberation segment numbers, (iv) a Y-axis indicating contribution magnitude, and (v) interactive elements enabling selection of individual jurors or segments for detailed view;

analyzing the jury stream-graph data model to identify: dominant jurors based on cumulative contribution magnitude and influence metrics, subgroup structures based on juror valence patterns, pivotal moments where aggregate valence balance crossed from pro-plaintiff to pro-defense or vice versa, and position shift events where individual jurors changed predominant valence;

generating a jury deliberation analysis report comprising the rendered visualization, identified dominant jurors and their characteristics, identified subgroups and their composition, timeline of pivotal moments with associated context, and recommendations for jury research applications.

52. A method for real-time customer support coaching, the method comprising:

receiving, at a processing system, streaming audio data from an ongoing customer support call between a customer and a support agent;

processing the streaming audio in real-time to perform: (a) speaker diarization distinguishing customer speech from agent speech, (b) speech-to-text conversion generating text segments with speaker labels, and (c) sentiment classification of customer text segments using a trained sentiment model;

maintaining a real-time interaction state comprising: current customer sentiment level, identified issue categories, resolution progress indicators, and cumulative interaction metrics;

generating a real-time bidirectional stream-graph displayed on an agent dashboard comprising: (i) an upper region showing positive sentiment indicators and resolution progress, (ii) a lower region showing negative sentiment indicators and unresolved issues, (iii) dynamic updating as the conversation progresses, and (iv) visual alerts when negative sentiment exceeds threshold levels;

computing real-time coaching signals comprising: escalation risk warnings when sentiment trajectory indicates deterioration, suggested responses based on detected issue categories and current sentiment, and pacing recommendations based on detected customer emotional state;

transmitting the coaching signals for display on the agent dashboard during the ongoing call;

upon call completion, storing the complete stream-graph and metrics for quality review and aggregate analysis.

53. A method for focus group analysis, the method comprising:

receiving audio and video recordings from a focus group session involving a moderator and a plurality of focus group participants discussing a product, service, or concept;

processing the recordings to generate participant-attributed speech segments with temporal markers;

extracting non-verbal reaction indicators from video including facial expression responses to stimuli or statements;

classifying each speech segment according to: (a) sentiment toward the discussed subject, (b) specific attribute references from a predefined attribute taxonomy, and (c) reaction type selected from: positive endorsement, negative criticism, suggestion, question, and observation;

generating a focus group analysis stream-graph comprising: (i) a bidirectional structure with positive reactions above a midline and negative reactions below, (ii) distinct visual representation for each participant, (iii) temporal alignment with discussion topics or stimulus presentations, and (iv) non-verbal reaction indicators overlaid on corresponding temporal positions;

computing focus group metrics comprising: net sentiment scores for discussed attributes, participant engagement levels, consensus indicators showing agreement levels among participants, and attribute importance rankings based on discussion volume and sentiment;

generating a focus group insights report comprising visualizations, metrics, and identified themes for market research applications.

The invention claimed is:

1. A computer-implemented system for generating a bidirectional stream-graph visualization of a multi-participant deliberative interaction, the system comprising:

one or more processors; and memory storing instructions that, when executed by the one or more processors, cause the system to perform operations comprising:

receiving audio data representing a deliberative interaction involving a plurality of participants, the deliberative interaction comprising discussion of at least one issue having a first position and a second position different than the first position;

executing a speech recognition pipeline to generate, from the audio data, a plurality of speaker-attributed speech segments, the speech recognition pipeline including:

performing speaker diarization to assign each speech segment to a participant identifier of the plurality of participants and to associate each speech segment with at least a start time and an end time, and performing automatic speech recognition to generate a text representation for each speech segment;

for each speech segment, applying a machine learning model to the text representation to determine a valence category from a plurality of valence categories including at least a first-position category and a second-position category;

determining a contribution magnitude for each speech segment;

constructing, in memory, a stream-graph data structure that maps, for each participant identifier, a time-indexed series of contribution magnitudes to an upper side or a lower side of a midline based on the determined valence categories; and rendering, on a display device based on the stream-graph data structure, a bidirectional stream-graph visualization.

2. The system of claim 1, wherein the machine learning model comprises a generative artificial intelligence model configured to output, for each text representation, a plurality of interaction labels comprising the valence category, an argument-type category selected from a predefined taxonomy of argument types, and an engagement measure indicating an extent of participation, and wherein the contribution magnitude is determined based on at least the engagement measure.

3. The system of claim 2, wherein the predefined taxonomy of argument types comprises at least: opinions, questions, answers, suggestions, and rebuttals.

4. The system of claim 1, wherein each participant-specific stacked area band is rendered with a unique visual attribute selected from a predefined palette, and wherein the bidirectional stream-graph visualization further comprises a legend mapping the unique visual attributes to corresponding participant identifiers.

5. The system of claim 1, wherein the contribution magnitude is determined based on at least one of: a duration of the speech segment or an engagement measure indicating an extent of participation.

6. The system of claim 1, wherein the bidirectional stream-graph visualization comprising:

an upper region and a lower region separated by the midline, a temporal axis corresponding to time, and a plurality of participant-specific stacked area bands positioned in the upper region or the lower region according to the determined valence categories, wherein, along the temporal axis, a thickness of each participant-specific stacked area band is proportional to the contribution magnitude for that participant at a corresponding time.

7. The system of claim 1, wherein the operations further comprise:

receiving video data corresponding to the deliberative interaction;

extracting, using a video processing module, non-verbal communication cues from the video data, the non-verbal communication cues comprising at least one of facial expressions, gestures, or body language indicators;

temporally aligning the non-verbal communication cues with corresponding speech segments based on time; and rendering at least a portion of the non-verbal communication cues as secondary visual elements that are temporally aligned with participant-specific stacked area bands.

8. The system of claim 1, wherein the operations further comprise computing, from the stream-graph data structure, a plurality of derived metrics comprising:

a dominance indicator for each participant based on cumulative contribution magnitudes for that participant, and an influence indicator for each participant based on identified patterns of influence between that participant's contributions and contributions by other participants.

9. The system of claim 8, wherein the operations further comprise generating at least one actionable recommendation based on the plurality of derived metrics, the at least one actionable recommendation comprising at least one of: identification of a dominant participant, identification of shifts in conversation dynamics, identification of a pivotal moment where an aggregate valence balance crosses the midline, or a predicted outcome for the deliberative interaction based on detected conversational patterns.

10. The system of claim 1, wherein the operations further comprise applying a privacy management protocol to at least one of the participant identifiers or the text representations based on a privacy classification level associated with the deliberative interaction, wherein the privacy management protocol comprises at least one of:

retaining participant identifiers in an unmodified form, replacing participant identifiers with pseudonymous identifiers while maintaining relational consistency within the bidirectional stream-graph visualization, or aggregating contributions across participants to suppress individual attribution.

11. The system of claim 1, wherein the operations further comprise:

dividing each speech segment into smaller time increments to capture a sequential order of communication cues within individual conversational turns, thereby enabling sub-turn granularity analysis of micro-interactions including at least one of interruptions or simultaneous speaking events.

12. A computer-implemented method for generating a bidirectional stream-graph visualization of deliberative dynamics among a plurality of participants, the method comprising:

receiving, by one or more processors, audio data of a deliberative interaction involving the plurality of participants, the deliberative interaction comprising discussion of a matter having a first position and a second position;

performing, by the one or more processors, speaker diarization on the audio data to generate a plurality of speaker-attributed speech segments, each speaker-attributed speech segment associated with a participant identifier and at least a start time and an end time;

generating, by the one or more processors, a text representation for each speaker-attributed speech segment using automatic speech recognition;

classifying, by the one or more processors using a machine learning model, each text representation to determine a valence category indicating support for the first position or support for the second position;

determining, by the one or more processors, a contribution magnitude for each speaker-attributed speech segment;

constructing, by the one or more processors, a stream-graph data structure that, for each participant identifier, maps a time-indexed series of the contribution magnitudes to an upper region or a lower region relative to a midline based on the valence category;

rendering, by the one or more processors on a display device based on the stream-graph data structure, a bidirectional stream-graph visualization comprising participant-specific stacked area bands that vary in thickness along a temporal axis according to the contribution magnitudes; and maintaining, by the one or more processors, an association between the participant-specific stacked area bands and corresponding ones of the speaker-attributed speech segments.

13. The method of claim 12, wherein the machine learning model is based on a generative artificial intelligence, and wherein classifying further comprises determining, for each text representation, an argument-type category selected from a predefined taxonomy comprising at least opinions, questions, answers, suggestions, and rebuttals, and an engagement measure indicating an extent of participation.

14. The method of claim 12, further comprising:

identifying at least one position-shift event in which a predominant valence category for a participant changes between the first position and the second position over time within the deliberative interaction.

15. The method of claim 12, wherein the contribution magnitude is determined based on at least one of: a duration of the speech segment or an engagement measure indicating an extent of participation.

16. The method of claim 12, further comprising:

computing a dominance indicator for each participant based on cumulative contribution magnitudes for that participant;

identifying patterns of influence among the plurality of participants based on the stream-graph data structure; and generating an analytics summary that includes the dominance indicators and the identified patterns of influence.

17. The method of claim 12, further comprising:

detecting a pivotal moment at a time at which an aggregate valence balance transitions from favoring the first position to favoring the second position or from favoring the second position to favoring the first position; and rendering a visual indicator of the pivotal moment on the bidirectional stream-graph visualization.

18. The method of claim 12, further comprising:

receiving video data corresponding to the deliberative interaction;

extracting non-verbal communication cues from the video data using a video processing module, the non-verbal communication cues comprising at least one of facial expressions or gestures;

temporally aligning the non-verbal communication cues with corresponding ones of the speaker-attributed speech segments; and rendering at least a portion of the non-verbal communication cues as secondary visual elements that are temporally aligned with the participant-specific stacked area bands.

19. The method of claim 12, further comprising:

generating, using an artificial intelligence based recommendation engine, at least one actionable insight based on the stream-graph data structure, the at least one actionable insight comprising at least one of:

feedback for improving communication strategies, recommendations based on identified conversational patterns, or a predicted outcome based on detected conversational patterns.

20. A non-transitory computer-readable medium storing instructions that, when executed by one or more processors, cause the one or more processors to perform operations comprising:

receiving an input representing a deliberative interaction involving a plurality of participants discussing a matter having a first position and a second position;

performing speaker diarization on the input to generate a plurality of speaker-attributed speech segments, each speaker-attributed speech segment associated with a participant identifier and at least a start time and an end time;

generating, using automatic speech recognition, a text representation for each speaker-attributed speech segment;

classifying each text representation using a trained machine learning model to determine a valence category indicating support for the first position or support for the second position;

determining a contribution magnitude for each speaker-attributed speech segment;

constructing a stream-graph data structure that maps, for each participant identifier, a time-indexed series of contribution magnitudes to an upper region or a lower region relative to a midline based on the valence category; and causing display, on a display device based on the stream-graph data structure, of a bidirectional stream-graph visualization comprising participant-specific stacked area bands that vary in thickness along a temporal axis according to the contribution magnitudes.

* * * * *